(12) United States Patent
Dimig et al.

(10) Patent No.: US 7,401,483 B2
(45) Date of Patent: Jul. 22, 2008

(54) RESIDUAL MAGNETIC DEVICES AND METHODS FOR AN IGNITION ACTUATION BLOCKAGE DEVICE

(75) Inventors: Steven J. Dimig, Plymouth, WI (US); Gregory J. Organek, Whitefish Bay, WI (US); Michael G. Feucht, Menomonee Falls, WI (US)

(73) Assignee: Strattec Security Corporation, Milwaukee, WI (US)

( * ) Notice: Subject to any disclaimer, the term of this patent is extended or adjusted under 35 U.S.C. 154(b) by 298 days.

(21) Appl. No.: 11/093,739

(22) Filed: Mar. 30, 2005

(65) Prior Publication Data

US 2006/0226939 A1    Oct. 12, 2006

(51) Int. Cl.
*E05B 47/00* (2006.01)
(52) U.S. Cl. ............. 70/277; 70/278.2; 70/278.3; 70/278.7; 335/285; 335/289; 335/296
(58) Field of Classification Search ........ 70/275–283.1; 335/285, 289, 296
See application file for complete search history.

(56) References Cited

U.S. PATENT DOCUMENTS

| | | | |
|---|---|---|---|
| 2,395,772 A | 2/1946 | Winther | |
| 2,447,632 A | 8/1948 | Bush | |
| 3,102,931 A | 9/1963 | Simmons et al. | |
| 3,224,540 A | 12/1965 | Straub | |
| 3,400,225 A | 9/1968 | Erwin | |
| 3,506,883 A | 4/1970 | Sugiyama | |
| 3,543,547 A | 12/1970 | Sugiyama | |
| 3,569,890 A | 3/1971 | Baratelli | |
| 3,683,239 A | 8/1972 | Sturman | |
| 3,743,898 A | 7/1973 | Sturman | |
| 3,763,968 A | 10/1973 | Noly | |
| 3,950,718 A | 4/1976 | Nagamoto | |
| 3,974,427 A | 8/1976 | Carson | |
| 4,114,648 A | 9/1978 | Nakajima et al. | |
| 4,409,638 A | 10/1983 | Sturman et al. | |
| 4,601,209 A | 7/1986 | Amata | |
| 4,643,009 A | 2/1987 | Sato | |
| 4,682,801 A | 7/1987 | Cook et al. | |
| 4,733,212 A | 3/1988 | Goodwin | |
| 4,854,146 A * | 8/1989 | O'Connell et al. ............ 70/277 |
| 4,916,927 A | 4/1990 | O'Connell et al. | |
| 5,029,301 A | 7/1991 | Nebon et al. | |
| 5,145,148 A | 9/1992 | Laurent | |

(Continued)

FOREIGN PATENT DOCUMENTS

DE          2504521          8/1976

(Continued)

OTHER PUBLICATIONS

Machinery's Handbook, p. 2106, 21st Edition, Industrial Press Inc., New York, USA, no date.

(Continued)

*Primary Examiner*—Ramon M Barrera
(74) *Attorney, Agent, or Firm*—Michael Best & Friedrich

(57) ABSTRACT

Residual magnetic locks, brakes, rotation inhibitors, clutches, actuators, and latches. The residual magnetic devices can include a core housing and an armature. The residual magnetic devices can include a coil that receives a magnetization current to create an irreversible residual magnetic force between the core housing and the armature.

59 Claims, 37 Drawing Sheets

U.S. PATENT DOCUMENTS

| | | | |
|---|---|---|---|
| 5,261,713 | A | 11/1993 | Fischbach |
| 5,460,329 | A | 10/1995 | Sturman |
| 5,479,890 | A | 1/1996 | Hu et al. |
| 5,479,901 | A | 1/1996 | Gibson et al. |
| 5,488,340 | A | 1/1996 | Maley et al. |
| 5,494,219 | A | 2/1996 | Maley et al. |
| 5,520,424 | A | 5/1996 | Hapke et al. |
| 5,554,961 | A | 9/1996 | McCulloch |
| 5,582,275 | A | 12/1996 | Arnold |
| 5,640,987 | A | 6/1997 | Sturman |
| 5,720,261 | A | 2/1998 | Sturman et al. |
| 5,735,375 | A | 4/1998 | Booth et al. |
| 5,752,308 | A | 5/1998 | Maley et al. |
| 5,753,988 | A | 5/1998 | Cipriani |
| 5,893,283 | A | 4/1999 | Evans et al. |
| 5,937,904 | A | 8/1999 | Wunder |
| 5,953,196 | A | 9/1999 | Zimmermann |
| 5,954,030 | A | 9/1999 | Sturman et al. |
| 5,959,517 | A | 9/1999 | Wieloch et al. |
| 5,967,274 | A | 10/1999 | Leone et al. |
| 6,000,489 | A | 12/1999 | Rick |
| 6,006,561 | A | 12/1999 | Hill et al. |
| 6,035,895 | A | 3/2000 | Grill et al. |
| 6,046,900 | A | 4/2000 | Massey et al. |
| 6,064,197 | A | 5/2000 | Lochmann et al. |
| 6,178,791 | B1 | 1/2001 | Hill et al. |
| 6,199,823 | B1 | 3/2001 | Dahlgren et al. |
| 6,227,060 | B1 | 5/2001 | Nicot et al. |
| 6,257,499 | B1 | 7/2001 | Sturman |
| 6,293,375 | B1 | 9/2001 | Chen |
| 6,298,938 | B1 | 10/2001 | Klaiber et al. |
| 6,308,690 | B1 | 10/2001 | Sturman |
| 6,321,883 | B1 | 11/2001 | Pfann et al. |
| 6,363,755 | B1 | 4/2002 | Hapke et al. |
| 6,364,084 | B1 | 4/2002 | Boyer et al. |
| 6,392,516 | B1 | 5/2002 | Ward et al. |
| 6,474,353 | B1 | 11/2002 | Sturman et al. |
| 6,481,689 | B2 | 11/2002 | Grill |
| 6,489,870 | B1 | 12/2002 | Ward et al. |
| 6,507,257 | B2 | 1/2003 | Mohler |
| 6,508,088 | B1 | 1/2003 | Barbier et al. |
| 6,516,508 | B1 | 2/2003 | Gandarillas |
| 6,516,640 | B2 | 2/2003 | Jacobs et al. |
| 6,564,653 | B2 | 5/2003 | Desbiolles |
| 6,571,587 | B2 | 6/2003 | Dimig et al. |
| 6,575,126 | B2 | 6/2003 | Sturman |
| 6,659,218 | B2 | 12/2003 | Thomas et al. |
| 6,681,732 | B2 | 1/2004 | Niethammer et al. |
| 6,685,160 | B2 | 2/2004 | Shinogle et al. |
| 6,705,422 | B2 | 3/2004 | Maekawa |
| 6,722,628 | B1 | 4/2004 | Seil |
| 6,761,662 | B2 | 7/2004 | Iwazaki et al. |
| 6,786,070 | B1 | 9/2004 | Dimig et al. |
| 6,820,856 | B2 | 11/2004 | Grill |
| 6,848,286 | B2 | 2/2005 | Dimig |
| 6,948,312 | B1 | 9/2005 | Goldasz et al. |
| 7,063,190 | B1 | 6/2006 | Sylvan et al. |
| 2001/0030589 | A1 | 10/2001 | Dahlgren et al. |
| 2002/0059839 | A1 | 5/2002 | Cheshmehdoost et al. |
| 2002/0073752 | A1 | 6/2002 | Dirnberger et al. |
| 2002/0100646 | A1 | 8/2002 | Maurice et al. |
| 2002/0104494 | A1 | 8/2002 | Ozawa et al. |
| 2003/0079948 | A1 | 5/2003 | Jolly et al. |
| 2003/0165395 | A1 | 9/2003 | Sekiya et al. |
| 2003/0184422 | A1 | 10/2003 | Matsusaka et al. |
| 2003/0233857 | A1 | 12/2003 | Chung |
| 2004/0025949 | A1 | 2/2004 | Wygnaski |
| 2004/0051066 | A1 | 3/2004 | Sturman |
| 2004/0069028 | A1 | 4/2004 | Dimig et al. |
| 2004/0074718 | A1 | 4/2004 | Takeda et al. |
| 2004/0084259 | A1 | 5/2004 | Carlson |
| 2004/0113492 | A1 | 6/2004 | Neuhoff et al. |
| 2004/0146417 | A1 | 7/2004 | Dunn |
| 2004/0154364 | A1 | 8/2004 | Dimig et al. |
| 2004/0169989 | A1 | 9/2004 | Babich |
| 2004/0189018 | A1 | 9/2004 | Geringer et al. |
| 2006/0219496 | A1 | 10/2006 | Dimig et al. |
| 2006/0219497 | A1 | 10/2006 | Organek et al. |
| 2006/0219498 | A1 | 10/2006 | Organek et al. |
| 2006/0219499 | A1 | 10/2006 | Organek |
| 2006/0219513 | A1 | 10/2006 | Organek |
| 2006/0220393 | A1 | 10/2006 | Dimig et al. |
| 2006/0225973 | A1 | 10/2006 | Dimig et al. |
| 2006/0225985 | A1 | 10/2006 | Dimig et al. |
| 2006/0226941 | A1 | 10/2006 | Dimig et al. |
| 2006/0226942 | A1 | 10/2006 | Dimig et al. |
| 2006/0227488 | A1 | 10/2006 | Dimig et al. |
| 2006/0237959 | A1 | 10/2006 | Dimig et al. |
| 2006/0238284 | A1 | 10/2006 | Dimig et al. |
| 2006/0238285 | A1 | 10/2006 | Dimig et al. |

FOREIGN PATENT DOCUMENTS

| | | |
|---|---|---|
| DE | 2918438 | 11/1980 |
| DE | 3013996 | 10/1981 |
| DE | 4034819 | 5/1992 |
| DE | 4116212 | 11/1992 |
| DE | 10315642 | 11/2004 |
| EP | 943508 | 9/1999 |
| EP | 1077359 | 2/2001 |
| EP | 1160400 | 12/2001 |
| EP | 1352772 | 10/2003 |
| FR | 2685411 | 6/1993 |
| JP | 2193871 | 7/1990 |
| JP | 8247276 | 9/1996 |
| JP | 2003137000 | 5/2003 |
| JP | 2003297623 | 10/2003 |
| SU | 640077 | 12/1978 |
| TW | 442608 | 6/2001 |
| WO | WO 0107301 | 2/2001 |

OTHER PUBLICATIONS

Rotors, Herbert, "49. Calculation of Magnetic Circuits Containing Permanent Magnets," Electromagnetic Devices, Chapter IV, pp. 106-109, 41st Edition, no date.

http://www.tlxtech.com/tlx_technologies_partnership.html, TLX Technologies Partnership, p. 1, no date.

http://www.tlxtech.com/tlx_technologies_products.html, TLX Technologies General Products and Custom Designs, pp. 1-2, no date.

http://www.tlxtech.com/clutch_brake_actuators.html, TLX Technologies Products—Electromechanical Clutches and Brakes Actuators, p. 1, no date.

http://www.tlxtech.com/latching_actuators.html, TLX Technologies Products—Latching Actuators, p. 1, no date.

http://www.epilogics.com/md/tekintro.htm, Epilogics Technology Introduction, pp. 1-4, no date.

* cited by examiner

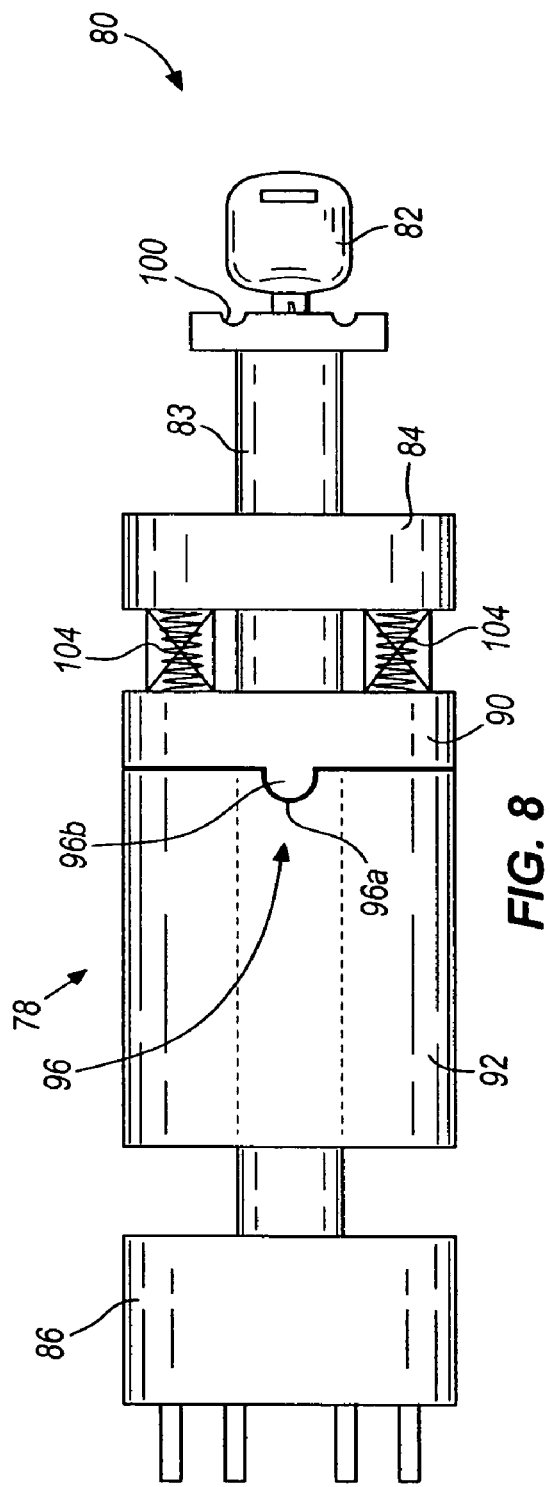
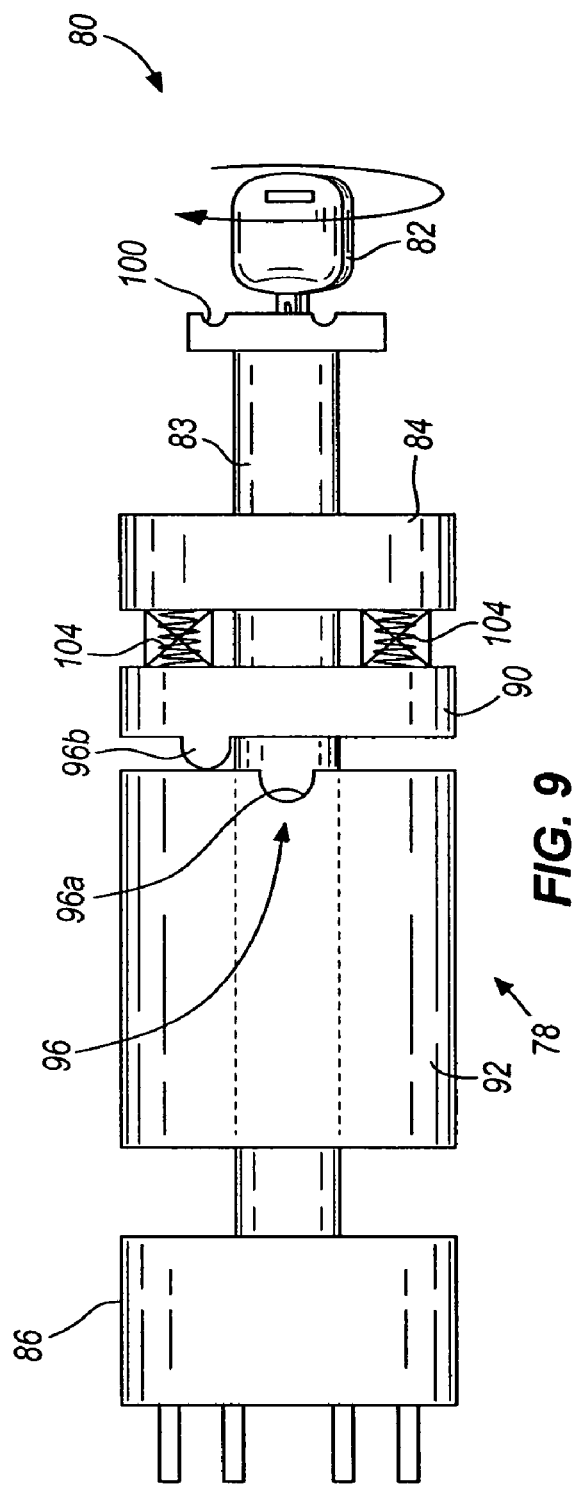

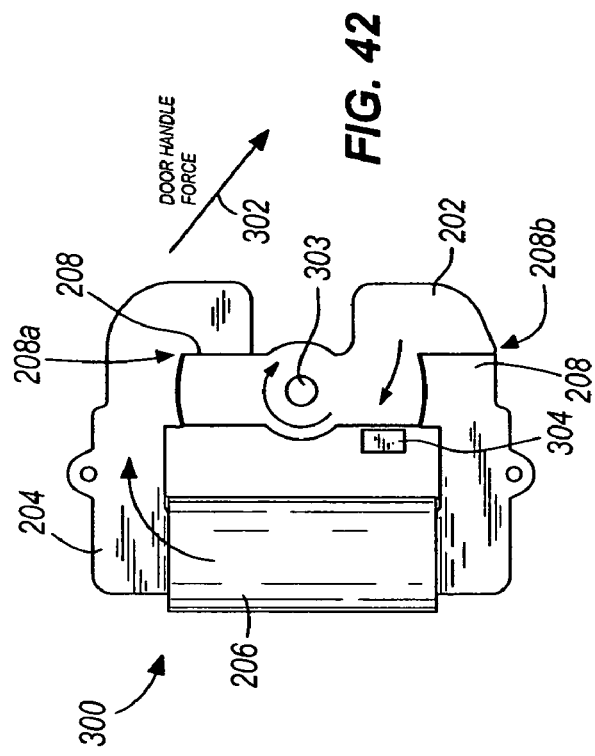
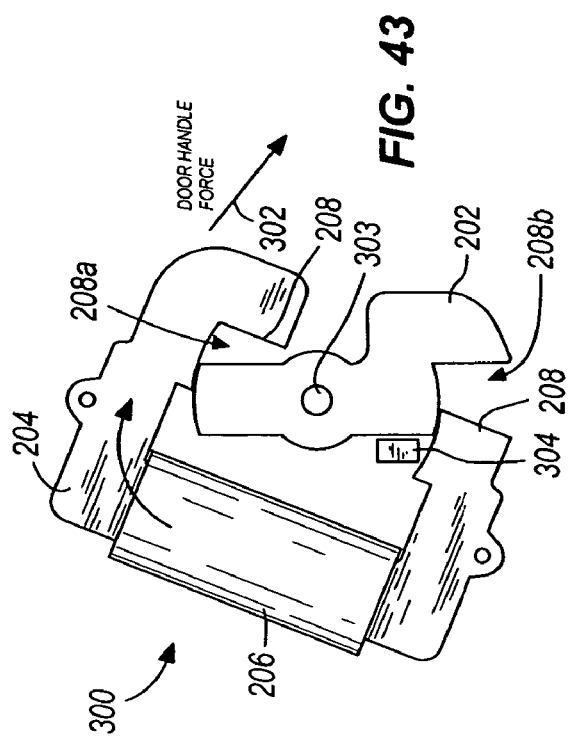
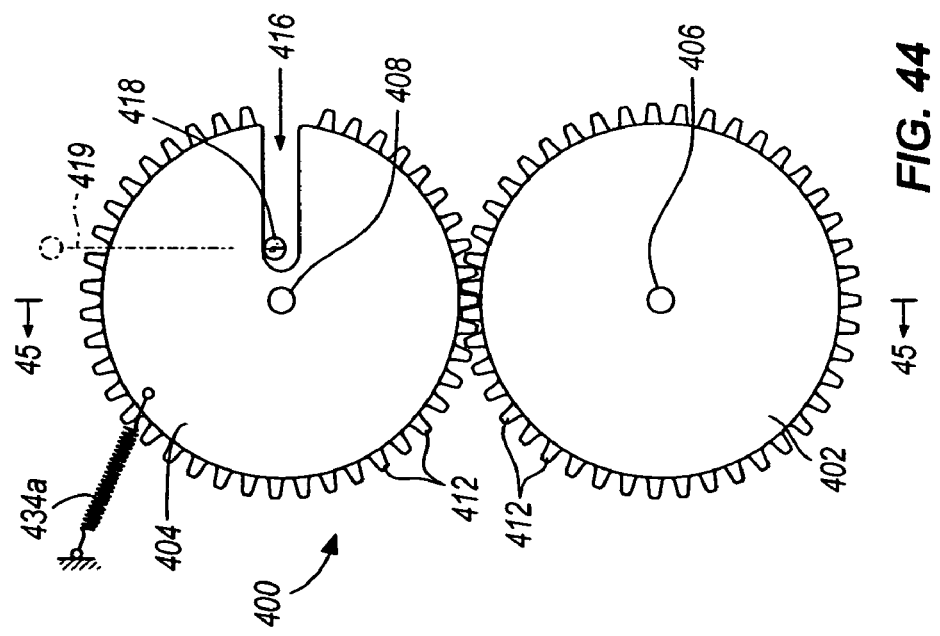

RESIDUAL MAGNETIC DEVICES AND METHODS FOR AN IGNITION ACTUATION BLOCKAGE DEVICE

BACKGROUND

Residual magnetism occurs in materials that acquire magnetic properties when placed in a magnetic field and retain magnetic properties even when removed from the magnetic field. Residual magnets are often created by placing steel, iron, nickel, cobalt, or other soft magnetic materials in a magnetic field. The magnetic field is often generated by running current through a coil of wire placed proximate to the material. The magnetic field generated by the coil orders and aligns the magnetic domains in the material, which is a building block for magnetic properties. Once the material is magnetized and the magnetic field is removed, the magnetic domains remain ordered, and thus, the material retains its magnetism. The magnetization retained in the material after the magnetic field is removed is called the residual or remanence of the material, which depends on the properties of the applied magnetic field and the properties of the material being magnetized. Residual magnets can be considered to be irreversible or reversible, depending on how easily the material can be demagnetized. The residual field of a permanent magnet cannot be easily demagnetized by applying a magnetic field. After a magnetic field is applied to a permanent magnet and then removed, the residual field of the permanent magnet will fully restore itself. Therefore, a permanent magnet is a reversible magnet. An irreversible magnet, also referred to as a residual magnet or a temporary permanent magnet, requires the form of a closed magnetic path (e.g., a ring) in order to set and maintain a residual magnetic field. The residual magnetic field is set by applying a magnetic field to the irreversible magnet. However, the residual magnetic field remains after the magnetic field is removed. The irreversible residual magnet can easily be demagnetized by a magnetic field. After a magnetic field is applied to the residual magnet and then removed, the residual field will not restore itself like the permanent magnet. Therefore, a residual magnet is an irreversible magnet. The irreversible residual magnet will also lose its residual field if its closed magnetic path is opened. Even when the magnetic path is closed again, the residual field of the irreversible residual magnet will not restore itself. Magnetic air gaps can exist to a certain size as part of the closed magnetic path of an irreversible residual magnet and still provide a useful amount of residual magnetic load. The smaller the magnetic air gap, the closer the residual load approaches that of an uninterrupted or completely closed magnet path. Herein, the residual magnetic devices described shall be considered irreversible residual magnets, as defined above.

SUMMARY OF THE INVENTION

Some embodiments of the invention provide a solution to retaining an armature engaged with a core housing without requiring current or power. Using a residual magnetic force, power can be provided to change the state of the armature and the core housing from an engaged state to a disengaged state, and a residual magnetic force can retain the state of the armature and the core housing without requiring power. In addition, some embodiments of the invention can release or disengage the armature from the core housing by providing a manual release mechanism. The manual release mechanism can increase a separation distance between the armature and the core housing that substantially nulls the residual magnetic force retaining the armature engaged with the core housing.

Some embodiments of the invention provide residual magnetic locks, brakes, rotation blocking devices, clutches, actuators, and latches. The residual magnetic devices can include a core housing and an armature. The residual magnetic devices can include a coil that receives a magnetization current to create an irreversible residual magnetic force between the core housing and the armature.

BRIEF DESCRIPTION OF THE DRAWINGS

FIGS. 8 and 9 are side views of a rotation blocking system with a residual magnetic device according to one embodiment of the invention.

FIG. 42 illustrates a variable reluctance rotary torque actuator with a residual magnetic latch in an engaged state under the influence of a door handle force according to one embodiment of the invention.

FIG. 43 illustrates the rotary torque actuator of FIG. 42 under the influence of a door handle force with the residual magnetic latch in a disengaged state.

FIG. 44 illustrates a front view of a gear-driven latch system with residual magnetic device in an engaged state according to one embodiment of the invention.

DETAILED DESCRIPTION

Figure 1:
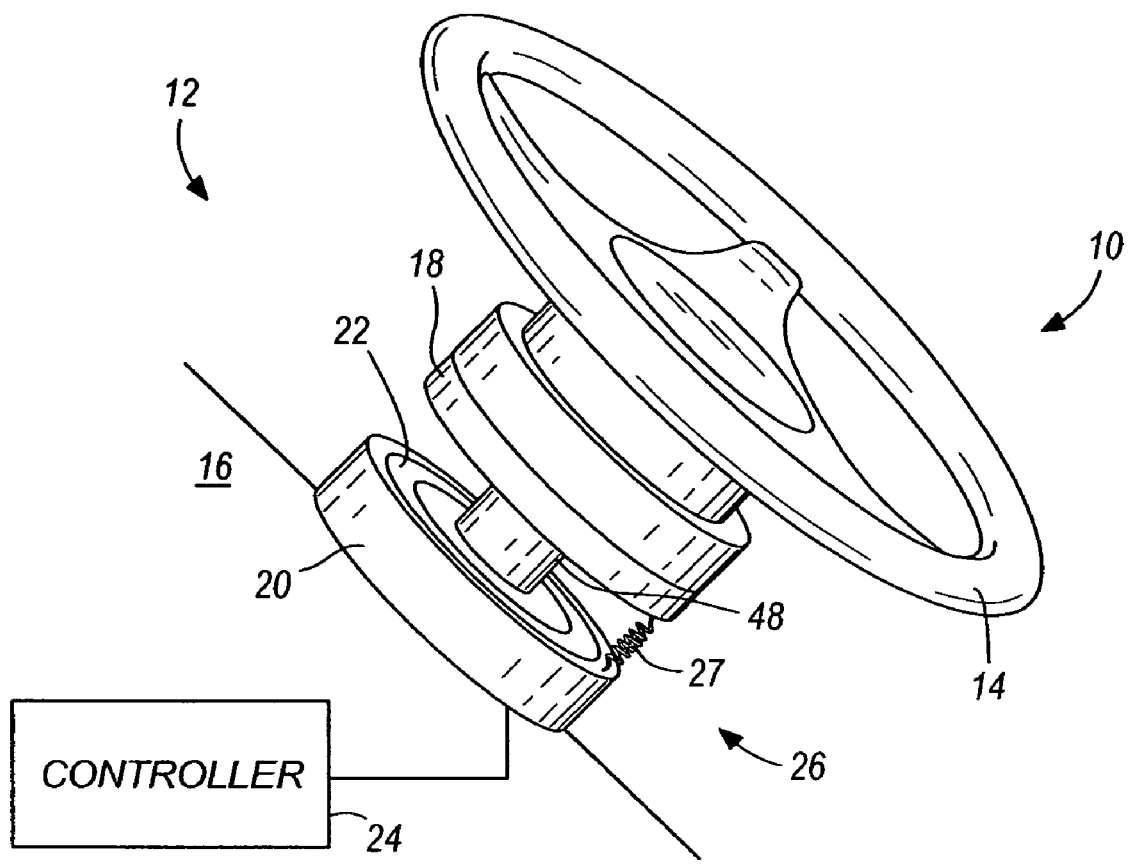
FIG. 1 illustrates a residual magnetic device according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

In addition, embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

FIG. 1 illustrates an application of residual magnetic technology to block the rotation of a device using a residual magnetic device 10 according to one embodiment of the invention. The residual magnetic device 10 includes a steering column lock 12 that can block the rotation of a steering wheel 14 or a steering yoke in a vehicle 16. In some embodiments, the steering column lock 12 can also be used to block the rotation of a handlebar on a bicycle or motorcycle. The steering column lock 12 includes an armature 18, a core housing 20, a coil 22, and a controller 24. The armature 18, the core housing 20, and the coil 22 form an electromagnetic assembly 26. The electromagnetic assembly 26 can be used in other applications besides the steering column lock 12, as shown and described with respect to FIGS. 8-60. The materials, control, and construction of the electromagnetic assembly 26 as described herein also applies to the embodiments shown and described with respect to FIGS. 8-60.

The steering column lock 12 can also include a biasing member 27 that applies a load or force to separate the armature 18 and the core housing 20. The biasing member 27 can include one or more compression springs, tension springs, elastomeric members, wedges, and/or foams.

The magnetic closed path structure formed by the armature 18 and the core housing 20 is constructed from a material that acquires magnetic properties when placed in a magnetic field and retains magnetic properties after the magnetic field is removed. In some embodiments, the armature 18 and the core housing 20 are constructed of SAE 52100 alloyed steel having a hardness of approximately 40 Rc, which can develop coercive forces $H_C$ of 20 to 25 Oersteds and residual magnetic flux densities $B_R$ as high as 13,000 Gauss when constructed with a closed magnetic path (e.g., a ring) and is exposed to a certain level of magnetic field. The armature 18 and the core housing 20 can also be constructed from other materials, such as various steel alloys, SAE 1002 steel, SAE 1018 steel, SAE 1044 steel, SAE 1060 steel, SAE 1075 steel, SAE 1080, SAE 52100 steel, various chromium steels, various tool steels, air hardenable (or A2) tool steel. One or more portions of the armature and the core housing (e.g., hard outer layers and soft inner portions) can have various hardness values, such as 20 Rc, 40 Rc, and 60 Rc. Most soft magnetic material displays a certain amount of residual or remanent magnetism (flux density). The coercive force (H axis) and residual flux density (B axis) determine whether the residual magnetic device 10 is appropriate for a particular application. In some embodiments, coercive force and flux density can vary. The greater the magnetic flux produced at the air gap and the magnetomotive force it maintains across the air gap, the greater the residual magnetic force will be for the residual magnetic device. The coercive forces can vary from 1.5 Oersteds for a soft, low-carbon steel (e.g., SAE 1002) to 53 Oersteds for a highly-alloyed steel (e.g., SAE 52100 with a hardness of 60 Rc). Other ranges of coercive forces and/or hardness values may be suitable for particular applications. Additional materials and related residual magnetic properties will be described below.

Generally, the higher the magnetic flux (Maxwells) and the magnetomotive force (Amp-Turns) that can be maintained across a given magnetic air gap, the less dependence on the size of the magnetic air gap. For example, the armature 18 and the core housing 20 are engaged when the armature 18 and the core housing 20 are magnetized by the magnetic field generated from the coil 22. The higher the coercive force and the flux density of the material of the armature 18 and the core housing 20, the stronger the engaging force between the armature 18 and the core housing 20. A large coercive force and a large flux density also provide increased tolerance with respect to separations or gaps between the components, while still providing an effective locking or braking force for a particular application. For example, components constructed of material with a high coercive force and a high flux density can be separated by a larger air gap and still provide the same residual force as components constructed of material with a low coercive force and a low flux density separated by a smaller air gap.

The material of the armature 18 and the core housing 20 can also be varied to change the weight and/or size of the steering column lock 12 or any other type of residual magnetic device. Whether the type of material can reduce the size and weight of the residual magnetic lock is dependant on the residual properties of the material $B_R$ and $H_C$. The higher the energy at the air gap provided by the material, the smaller the residual magnetic device can be. The size of the residual magnetic device can vary to accommodate weight requirements of specific applications. For example, some vehicles have weight and/or size restrictions that limit the dimensions and/or weight of the steering column lock 12. In some embodiments, the armature 18 and the core housing 20 are constructed of SAE 52100 with a hardness of 40 Rc, and the armature 18 and the core housing 20 together can weigh up to approximately 10 pounds. Other types of materials and hardness values can also be used in the steering column lock 12 to increase or decrease the size and/or weight of the steering column lock 12.

Figure 2:
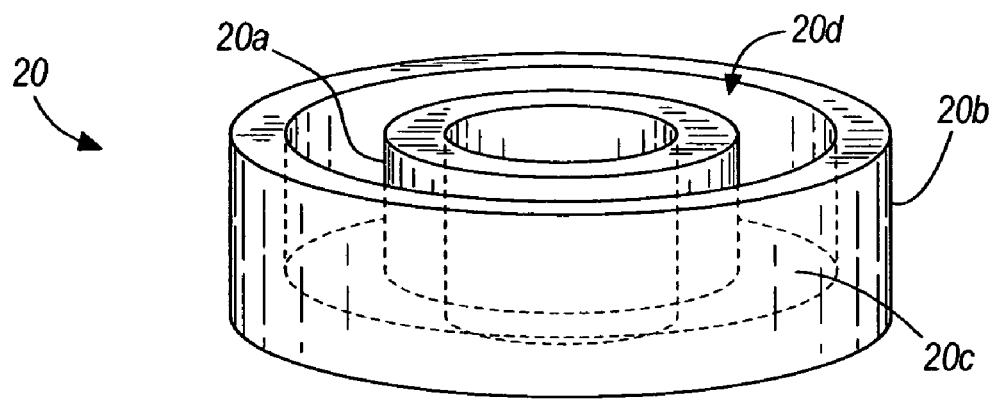
FIG. 2 illustrates a core housing for a residual magnetic device.
Figure 5:
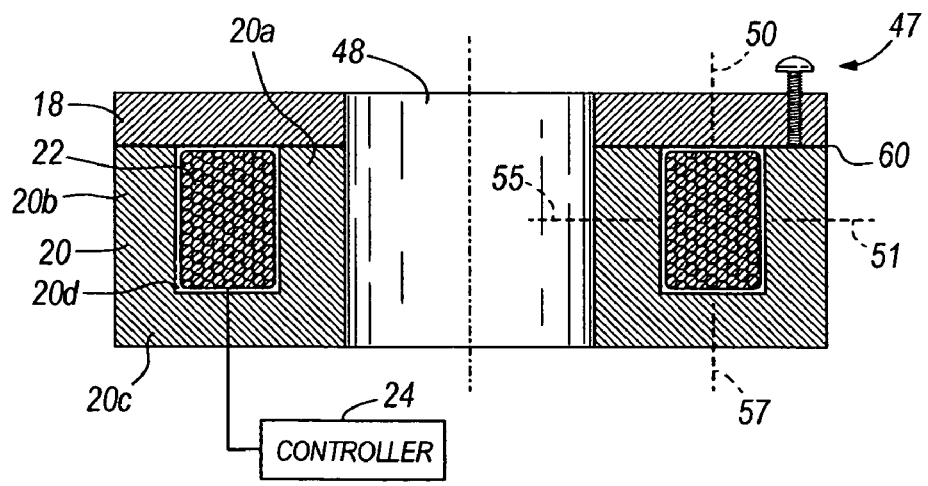
FIG. 5 is a cross-section view of an electromagnetic assembly according to one embodiment of the invention.

As shown in FIGS. 2 and 5, the core housing 20 includes an inner core 20a, an outer core 20b, and a yoke 20c (which supports the inner and outer cores), and a recession or opening 20d located between the inner core 20a and the outer core 20b. The recession 20d holds the coil 22. In some embodiments, the coil 22 includes 21 gauge copper wiring. Other conductive wiring or mediums can also be included in the coil 22. The current supplied and the number of turns in the coil 22 determines the magnetic field and flux applied to the material of the armature 18 and core housing 20 and the corresponding engaging force between the armature 18 and the core housing 20. In some embodiments, the coil 22 includes 265 turns, although fewer or more turns could be used depending on the specific application of the lock 12 and the current levels achievable.

Figure 3:
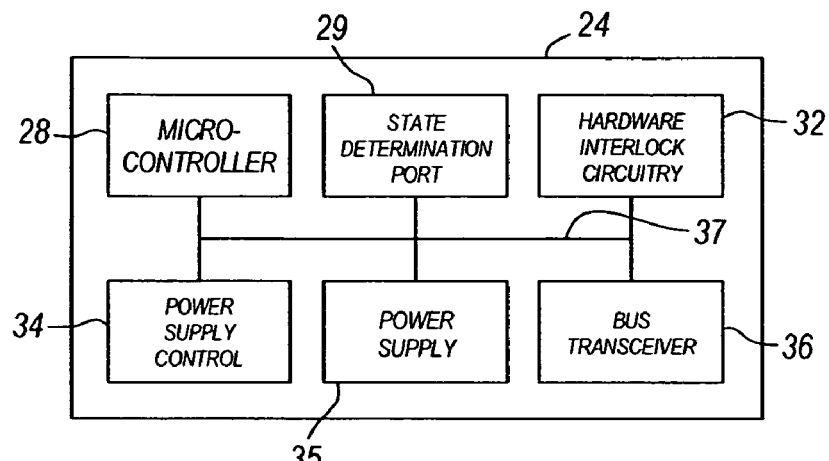
FIG. 3 schematically illustrates a controller for the residual magnetic device of FIG. 1.
Figure 4:
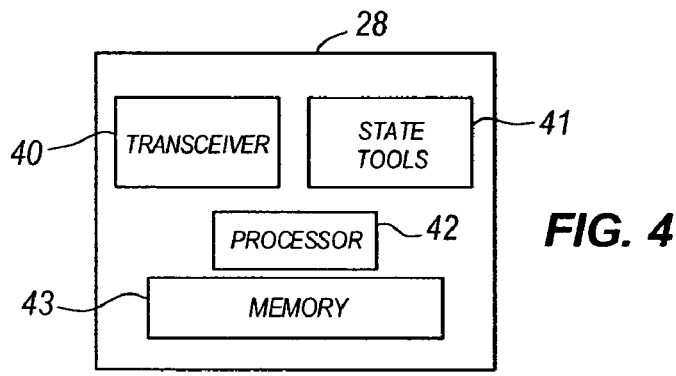
FIG. 4 schematically illustrates a microcontroller of the controller of FIG. 3.

The coil 22 is coupled to the controller 24. In some embodiments, the controller 24 does not include a microprocessor, but rather can include as few components as one or more sensors, one or more switches, and/or an analog circuit of discrete components. In some embodiments, the controller 24 can include one or more integrated circuits or programmable logic controllers. FIGS. 3 and 4 illustrate one embodiment of the controller 24. The controller 24 can include a microcontroller 28, a state determination port module 29, hardware interlock circuitry 32, a power supply control module 34, a power supply 35, a bus transceiver 36, and an internal bus or connection mechanism 37 that can connect all or a subset of the components of the microcontroller 28. In some embodiments, the bus transceiver 36 provides serial communication with other control systems included in a network, such as a local interconnect network ("LIN") or a controller area network ("CAN") that is traditionally used to connect vehicular control systems. The bus transceiver 36 can provide and receive status and control information to and from other vehicular control systems over the network.

The bus transceiver 36 can also provide and receive status and control information to and from the internal bus 37 of the controller 24. For example, the bus transceiver 36 can receive a control signal to lock or unlock the steering column lock 12 and can transmit the control signal to the microcontroller 28. The microcontroller 28 can process the control signal and transmit one or more control signals to the power supply 35 and/or the power supply control module 34. The power supply 35 can generate a magnetization or demagnetization current that will engage or disengage the armature 18 and the core housing 20 in order to lock or unlock the steering column lock 12. In some embodiments, the controller 24 can receive power from an external power supply (e.g., an ignition system) rather than including a separate power supply 35. The power supply 35 can also include a chemical or stored energy system, for example, a battery. In one embodiment, the power supply 35 can be generated by a user by spinning or otherwise moving a portion of a generator to create enough energy to supply a magnetization or demagnetization current to the coil 22. A piezoelectric device can also be used as a human-initiated power supply. Using human movement to create the power supply 35 for the electromagnetic assembly 26 can substantially or completely eliminate the need to include a readily available power source such as a battery, a direct current power source, or an alternating power source with the power supply 35. In other embodiments, the power supply 35 can include a solar power source, a static electricity power source, and/or a nuclear power source.

The power supply control module 34 can include an H-bridge integrated circuit, one or more transistors, or one or more relays that regulate the level, direction, and duration of the current applied to the coil 22. In some embodiments, the electromagnetic assembly 26 can include a single coil 22 and the power supply control module 34 can include an H-bridge integrated circuit, four transistors, or relays to provide a bipolar current drive circuit that provides forward and reverse polarity current to the coil 22. In other embodiments, the electromagnetic assembly 26 can include two coils 22 and the power supply control module 34 can include two transistors to provide two unipolar drive circuits. One unipolar drive circuit can provide a first current to one of the coils 22 and the other unipolar drive circuit can provide a second current, opposite in polarity to the first current, to the other coil 22.

In some embodiments, the state determination port 29 of the controller 24 can send and receive signals to determine the state of the electromagnetic assembly 26 (e.g., whether or not a residual magnetic force is present between the armature 18 and the core housing 20, such that the components are engaged or disengaged). The state of the electromagnetic assembly 26 can be used to control the lock 12. For example, the biasing member 27 can apply a biasing force that separates or disengages the armature 18 from the core housing 20, and the state of the electromagnetic assembly 26 can be used to determine when to apply the biasing force. The state of the electromagnetic assembly 26 can also be used to ensure that a demagnetization current is only applied when a corresponding magnetization current has previously been applied to protect the electromagnetic assembly 26 from damage or undesired operation.

In some embodiments, the controller 24 determines the state of the electromagnetic assembly 26 by determining the inductance of the electromagnetic assembly 26. Referring to FIG. 5, the inductance of the electromagnetic assembly 26 changes as a function of a magnetic air gap 60 between the armature 18 and the core housing 20. For example, with the armature 18 in substantial contact with the core housing 20, the inductance of the electromagnetic assembly 26 is approximately three times greater than the inductance of the electromagnet assembly 26 when the armature 18 is separated from the core housing 20 by approximately 1 millimeter. To determine the inductance of the electromagnetic assembly 26, the controller 24 can send a voltage pulse to the coil 22 and the state determination port 29 can measure the current rise. In some embodiments, the controller 24 can generate a voltage pulse approximately every 50 microseconds and measure the current rise in the electromagnetic assembly 26. When the armature 18 is substantially in contact with the core housing 20, the current rise is greater than the current rise when the armature 18 and the core housing 20 are separated (due to the resistance created by air between the components). Separation distances can be categorized as either a separation distance present when the lock 12 is engaged (due to the surfaces of the armature 18 and the core housing 20 not being perfectly smooth) or as a separation distance present when the armature 18 and core housing 20 are disengaged. A threshold separation distance (e.g., one or several millimeters) can divide the two categories of separation distances. The controller 24 can compute a separation distance based on the observed current rise and can compare the computed separation distance to the threshold separation distance to determine the state of the electromagnetic assembly 26.

The state determination port 29 of the controller 24 can also use other mechanisms for determining the state of the electromagnetic assembly 26. For example, the state determination port 29 can be connected to one or more sensors, such as a Hall effect sensor that determines at least a characteristic of the magnetic flux present in the electromagnetic assembly 26. A Hall effect sensor placed in a flux path of the electromagnetic assembly 26 can sense magnetic flux values and can transmit flux values to the state determination port 29. The state determination port 29 can use the flux values to determine whether the sensed magnetic flux corresponds to a flux present when the electromagnetic assembly 26 is engaged or disengaged.

The state determination port 29 or the microcontroller 28 of the controller 24 can store the current state of the electromagnetic assembly 26 and can update the state when it applies a magnetization current or a demagnetization reverse current. In one embodiment, the controller 24 can be configured to apply a precautionary magnetization current before applying a demagnetization current. The precautionary magnetization current can ensure that a residual magnetic force is present before applying a demagnetization current. The precautionary magnetization current does not damage the electromagnetic assembly 26, because, in most embodiments, the material of the armature 18 and the core housing 20 is already at a maximum magnetic saturation. In other embodiments, the state determination port 29 can monitor mechanical mechanisms, such as a strain gage, placed between the armature 18 and the core housing 20 to determine the amount of pressure present between the components and to determine whether the components are engaged or disengaged. In one embodiment, a mechanical switch that is moved by the movement of the armature 18 can be used to mechanically record the state of the lock 12. The switch can include, for example, a microswitch, a load pad, a membrane pad, a piezoelectric device, and/or a force-sensing resistor.

In some embodiments, the hardware interlock circuitry 30 of the controller 24 can provide safety features to help keep the lock 12 from inadvertently locking or unlocking. For example, the hardware interlock circuitry 30 can filter control signals received by the bus transceiver 36 or generated by the microcontroller 28 to ensure that invalid signals do not lock or unlock the lock 12. The hardware interlock circuitry 30 can prevent power surges or rapid control signals from unintentionally locking and/or unlocking the lock 12. Upon detecting an invalid signal, the hardware interlock circuitry 30 can disable operation of the lock 12 until the controller 24 is reset or repaired, if necessary. In some embodiments, when power is provided to the controller 24, the hardware interlock circuitry 30 can disable operation of the electromagnetic assembly 26 until operational checks are performed and passed (e.g., supplied voltage is within a valid range, an appropriate state of the electromagnetic assembly 26 is determined, etc.). In one embodiment, the hardware interlock circuitry 30 can be disabled during a set-up phase of the controller 24 and can later be initiated and set for operation.

The controller 24 is not limited to the components and modules illustrated and described above. The functionality provided by the components described above can also be combined in a variety of ways. In some embodiments, the controller 24 can provide tamper-proof functionality, such that unauthorized locking or unlocking of the lock 12 cannot be accomplished by modifying the stored state of the electromagnetic assembly 2b or the locking and unlocking process provided by the controller 24.

In some embodiments, as shown in FIG. 4, the microcontroller 28 can include a transceiver 40, a state tool module 41, a processor 42, and a memory module 43. The microcontroller 28 can also include more or fewer components and the functionality provided by the components listed above can also be combined and distributed in a variety of ways. The microcontroller 28 can receive and send signals through the transceiver 40. In some embodiments, the transceiver 40 includes a universal asynchronous receiver/transmitter that allows the microcontroller 28 to asynchronously receive and transmit control and/or status signals. The state tool module 41 can include amplifiers, converters (e.g., an analog to digital converter), or other tools for processing state determination signals sent and received over the state determination port 29. The processor 42 can include a microprocessor, an application specific integrated circuit or other mechanisms for receiving input and processing instructions. In some embodiments, the processor 42 can issue instructions or control signals that are output by the transceiver 40 and transmitted to the bus transceiver 36, the power supply 35, the power supply control module 34, state determination port 29, and/or the hardware interlock circuitry 30. The control signals can be used to report the state of the electromagnetic assembly 26, change the state of the electromagnetic assembly 26, and/or determine the state of the electromagnetic assembly 26.

The memory module 43 can include non-volatile memory, such as one of or combinations of ROM, disk drives, and/or RAM. In some embodiments, the memory module 43 includes flash memory. The memory module 43 can include instructions and data that has been obtained and/or executed by the processor 42. In some embodiments, the memory module 43 can include a variable, flag, register, or bit that designates the state of the electromagnetic assembly 26. In some embodiments, the memory module 43 can store operational information regarding the components of the controller 24. For example, the memory module 43 can store a range of voltage values that the power supply control module 34 can provide, the current state of the hardware interlock circuitry 30, threshold data for comparison against data received on the state determination port 29, etc.

In some embodiments, the controller 24 can supply voltage to the coil 22 to generate or eliminate a residual magnetic force between the armature 18 and the core housing 22. The voltage supplied by the controller 24 can range from approximately 8 Volts to approximately 24 Volts. Other specific voltages and ranges of voltages can also be used depending on the properties and particular applications. In some embodiments, the controller 24 can supply a magnetization current of up to approximately 10 Amps to the coil 22 that creates a magnetic field around the coil 22. The magnetic field created by the magnetization current applied to the coil 22 can create a residual magnetic force between the armature 18 and the core housing 20 that draws and holds the armature 18 to the core housing 20, even when the controller stops supplying the magnetization current.

The controller 24 can also supply a demagnetization current to the coil 22. The demagnetization current can have a polarity substantially opposite to the magnetization current and a current of up to approximately 2 Amps. Other demagnetization current levels can also be used. The demagnetization current can create a magnetic field around the coil 22 in an opposite direction as the field generated by the magnetization current. The opposite direction of the magnetic field generated by the demagnetization current balances or nullifies the direction of magnetic field previously-generated with the magnetization current to substantially eliminate the residual magnetic force between the armature 18 and the core housing 20. As previously described, in some embodiments, the electromagnetic assembly can include a single coil 22 and the controller 24 can include a bipolar drive circuit, such as an H-bridge integrated circuit or four transistors that provides the magnetization current and the demagnetization current to the coil 22. Alternatively, the electromagnetic assembly 26 can include two coils 22 and the controller 24 can include two drive circuits, each with two transistors. One of the drive circuits can provide the magnetization current to one coil 22 and the other drive circuit can provide the demagnetization current to the other coil 22.

During the demagnetization process, the controller 24 can apply alternate polarity currents (i.e., magnetization and demagnetization currents) in pulses that can, in some embodiments, decrease in duration to create a gradually-decreasing magnetic field. By decreasing the duration of each of the alternating polarity pulses, current levels in the coil 22, and thus, magnetic flux levels in the core housing 20 can gradually decrease until the hysteresis of the core housing 20 is minimal.

In some embodiments, the controller 24 can use pulse width modulation ("PWM") to provide an increasing demagnetization current to the coil 22 until the residual force of the core housing 20 is nullified. In some embodiments, the controller 24 can continue to apply an increasing demagnetization current to the coil 22 until a mechanism (e.g., a spring or other mechanical device) physically releases the armature 18 from the core housing 20. The controller 24 can sense the physical release of the armature 18 from the core housing 20 and can determine that a release point has been met and the demagnetization current is no longer needed. The release point can be where the residual force between the armature 18 and the core housing 20 is at or below a threshold where the armature 18 and core housing 20 are considered disengaged. In some embodiments, the controller 24 may not have established a release point for the armature 18 and core housing 20 before applying a demagnetization current. The controller 24 can use PWM to reach a release point.

Alternatively, in some embodiments, the controller 24 has previously established or been provided with a release point for the electromagnetic assembly 26 and can apply a calibrated pulsed width modulated power signal based on the supply voltage. The release point can have a tolerance of approximately 10%. The controller 24 can use the established release point along with the tolerance to determine a nominal release current. The controller 24 can apply a pulse width modulated power signal whose duty cycle is based on the supply voltage level supplied by the controller 24.

Also, because residual magnets are irreversible magnets, breaking the closed magnetic path or increasing an air gap between the armature 18 and the core housing 20 with a manual release mechanism 47 can cancel or neutralize the residual magnetism. In some embodiments, the ability to physically or manually release the armature 18 from the core housing 20 can provide a safety mechanism to unlock or disengage the lock in situations where a demagnetizing current cannot be provided (e.g., a power loss). The steering column 12 can include a manual release mechanism 47 that includes a jack screw (as shown in FIG. 5) placed on the armature 18, and the steering column 12 can be manually unlocked by screwing or turning the screw into the armature 18 until the screw makes contact with core housing 18 and separates the armature 18 and the core housing 20. Additional residual magnetic devices can also include manual release mechanisms 47 that include remote release mechanisms. For example, a cam or a wedge and an accessible lever or cable can be used to a manually release a trunk latch by operating the lever or cable to load the cam or wedge against an armature to create the separation necessary to neutralize the magnetic load.

Referring to FIG. 1 and the steering column lock 12, the core housing 20 and the coil 22 can be mounted firmly to the vehicle 16. The core housing 20 and the coil 22 can be mounted concentric with a steering wheel shaft 48. In some embodiments, the center axis of the core housing 20 and/or the coil 22 can be mounted off-center to the center axis of the steering wheel. The armature 18 can be rotateably constrained to the steering wheel shaft 48, but can move in the axial direction of the steering wheel shaft 48. The armature 18 can be mounted concentric with the steering wheel shaft 48. The center axis of the armature 18 can also be mounted off-center to the center axis of the steering wheel shaft 48. In some embodiments, gears, linkages, or other suitable components can be used to couple the armature and/or the core housing to the steering wheel shaft 48.

When voltage is applied to the coil 22 by the controller 24, a current draw occurs that is proportional to the electrical resistance of the coil 22. The current and the number of windings of the coil 20 determine the magnetic flux applied to the material of the core housing 20 and the armature 18. The magnetic flux applied to the material of the core housing 20 and the armature 18 can generate a normal (i.e., perpendicular to the surfaces of the core housing 20 and the armature 18) magnetic force between the core housing 20 and the armature 18. The amount of magnetic flux generated by the coil 22 and the flux density state of the material (i.e., whether the material is fully saturated) can determine the strength of the residual magnetic force between the core housing 20 and the armature 18. The air gap between the core housing 20 and the armature 18 can also influence the strength of the residual magnetic force between the core housing 20 and the armature 18.

In some embodiments, the magnetic flux levels in the materials and, subsequently, the residual magnetic force between the core housing 20 and the armature 18 increases until magnetic saturation of the core housing 20 and the armature 18 is reached. Magnetic saturation occurs when a material has reached its maximum magnetic potential. In some embodiments, the controller 24 provides current for approximately 50 milliseconds to approximately 100 milliseconds to bring the armature 18 and the core housing 20 to magnetic saturation. Once magnetic saturation is reached, further application of current adds little or nothing to the attractive or residual magnetic force of the material.

FIG. 5 illustrates a cross-sectional view of the armature 18, the core housing 20, and the coil 22, each of which is located concentric to the steering wheel shaft 48. In some embodiments, a first cross-sectional area 50 of the armature 18, a second cross-sectional area 51 the outer core 20b, a third cross-sectional area 55 of the inner core 20a, and a fourth cross-sectional area 57 of the yoke 20c are substantially equal in order to increase the probability that the core housing 2 and armature 18 reach magnetic saturation at approximately the same time. In some embodiments, reaching high or maximum saturation levels and all components reaching the levels at the same time can provide an optimal residual force. For example, magnetic saturation can provide a predetermined residual force that requires a predetermined demagnetization current for canceling the generated residual force. If one or both of the armature 18 and the core housing 20 are not brought to full magnetic saturation, the amount of demagnetization current needed to reverse the residual force can be more difficult to determine.

Once the desired residual magnetic force is created between the armature 18 and the core housing 20, the armature 18 and the core housing 20 are engaged and the steering wheel is locked by the steering column lock 12. The steering wheel 14 can be substantially blocked from rotating because the core housing 20 is mounted to the vehicle 16 such that the core housing 20 cannot rotate or move. The armature 18, which previously rotated with the steering wheel 14 before being residually magnetized, is held to the core housing 20 by the residual magnetic force generated between the armature 18 and the core housing 20.

Due to the hysteretic property of magnetic material, the controller 24 can stop supplying the magnetization current to the coil 22 once the lock 12 is engaged. In some embodiments, the hysteretic property of magnetic material limits the amount of power needed by the lock 12 because the controller 24 only supplies power to change the state of the lock 12, not to retain the state of the lock 12.

The optimum magnitude of the residual magnetic force created by the application of the voltage to the coil 22 can be determined with the cross-sectional areas of the core housing 20 and the armature 18 and by the magnetic air gap 60 (as shown in FIG. 5) between the armature 18 and the core housing 20. The smaller the magnetic air gap 60, the closer the electromagnetic assembly 26 comes to reaching the maximum residual force for the material being used. The highest residual force would be observed without any magnetic air gap 60 when the armature 18 and the core housing 20 are one integrated part or piece (e.g., a ring of material with a closed magnetic path).

Figure 6A:
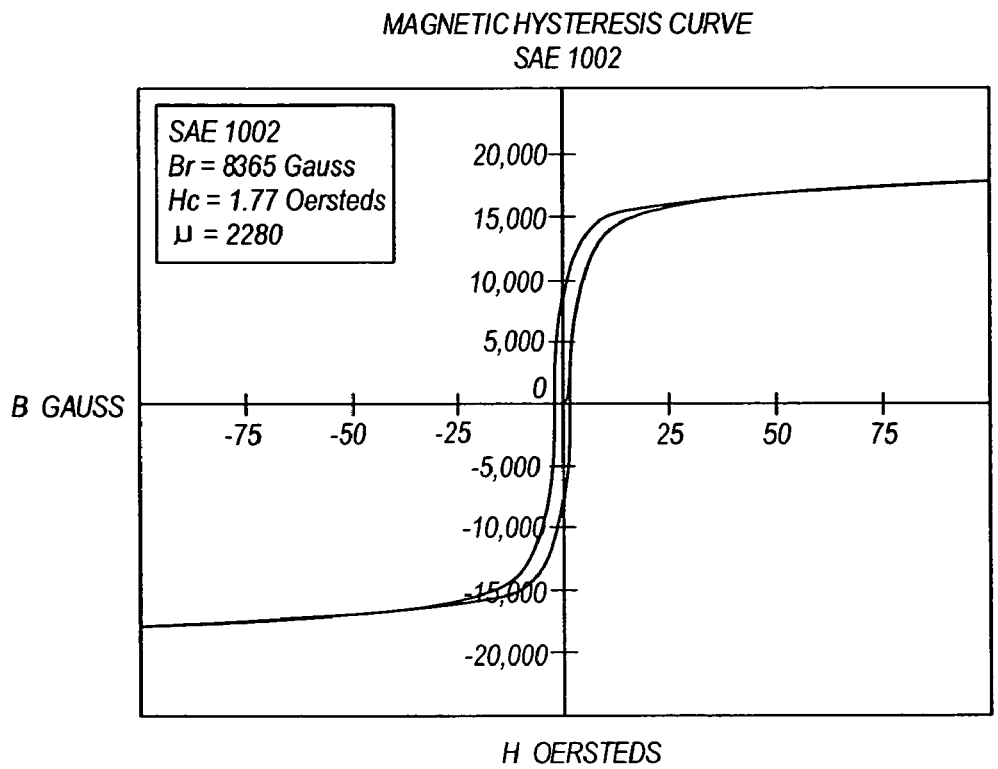
FIGS. 6a-6h are magnetic hysteresis curve graphs for various material characteristics.
Figure 6B:
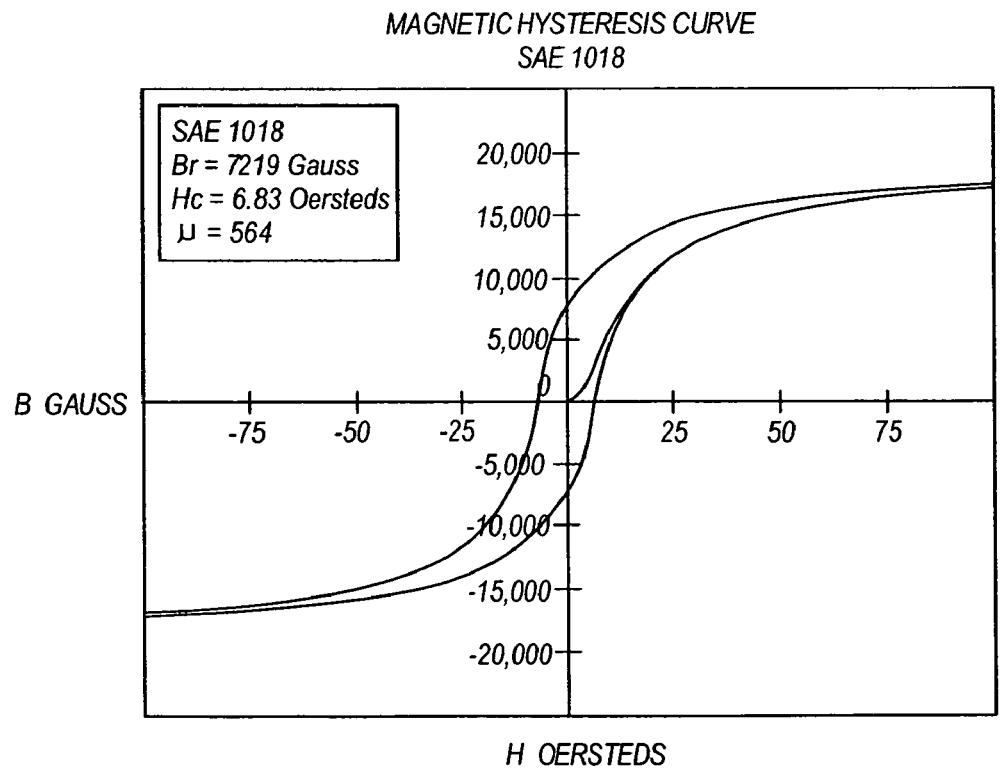
Figure 6C:
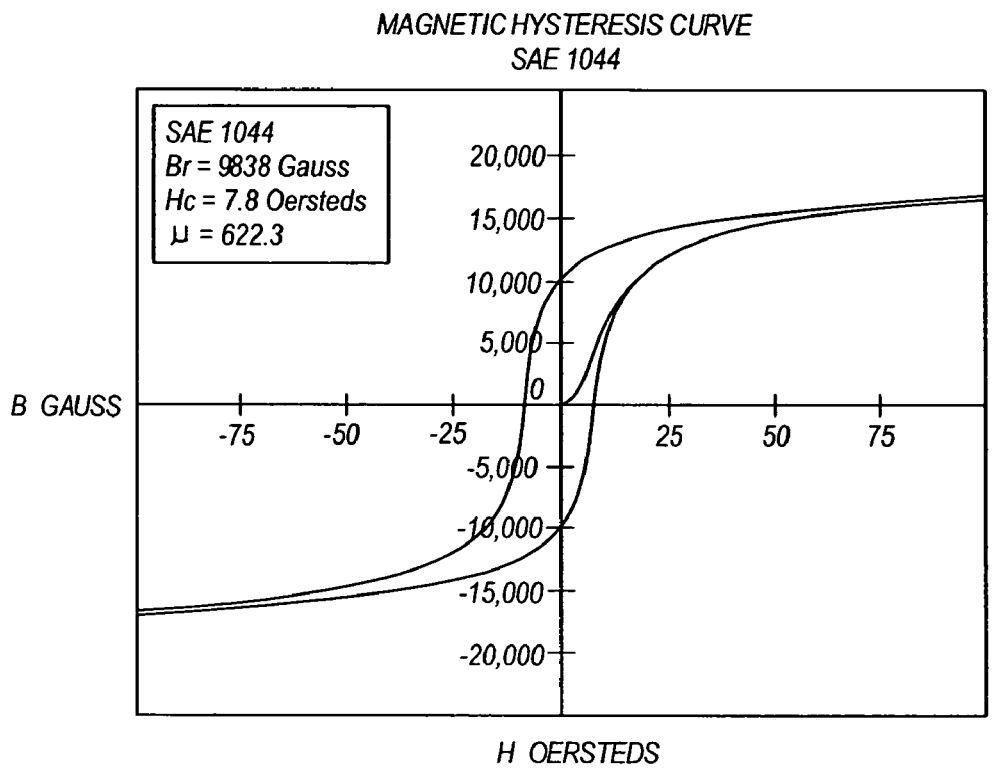
Figure 6D:
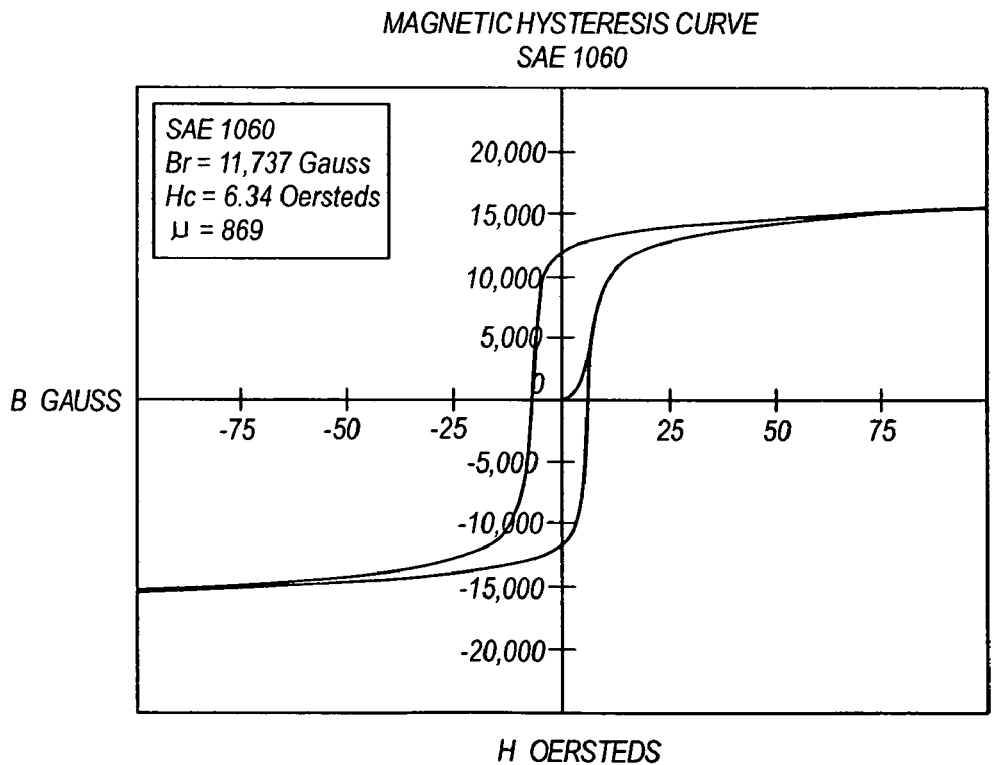
Figure 6E:
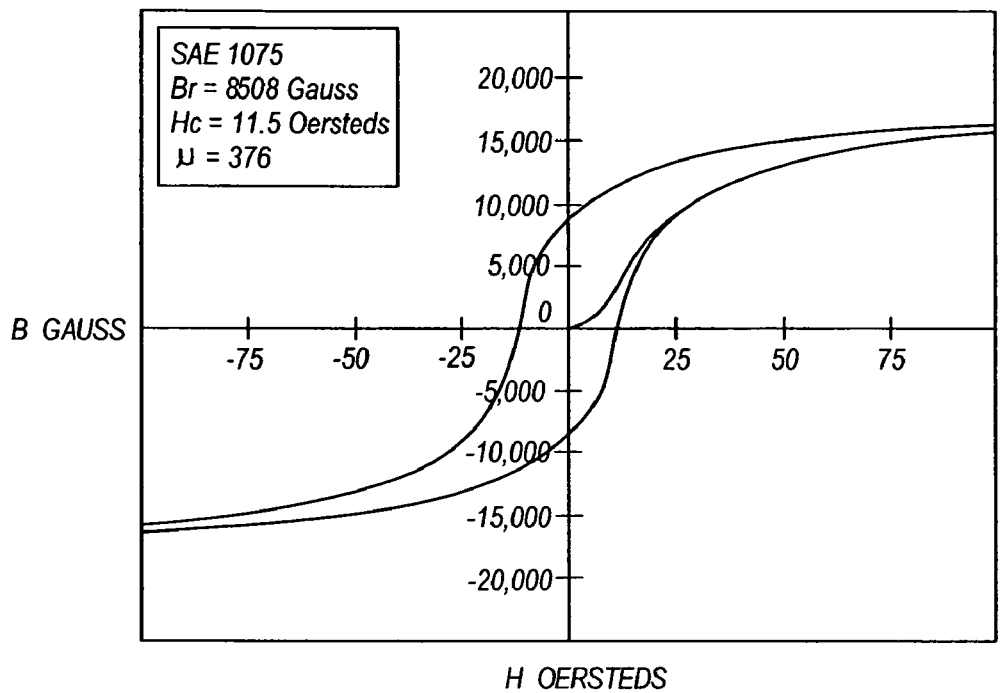
Figure 6F:
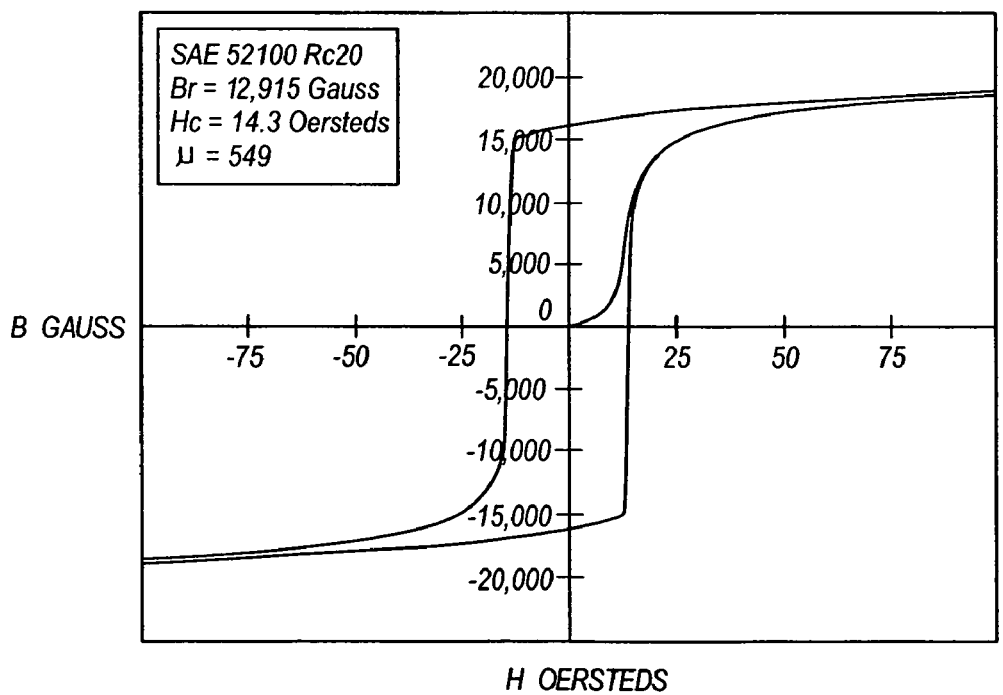
Figure 6G:
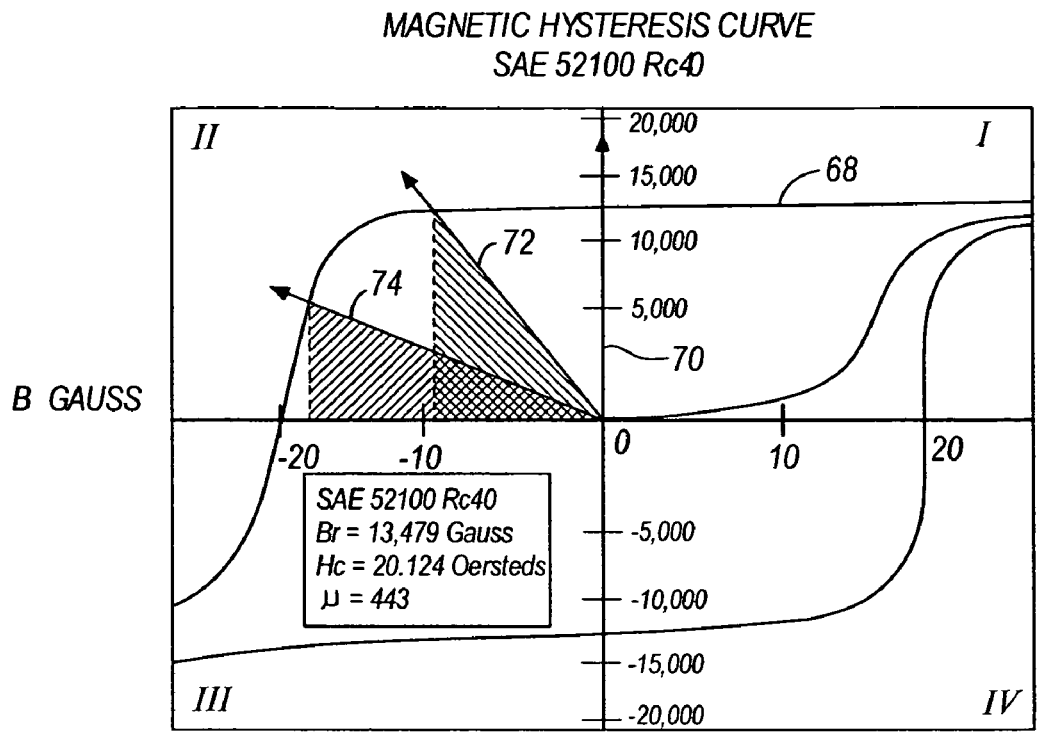
Figure 6H:
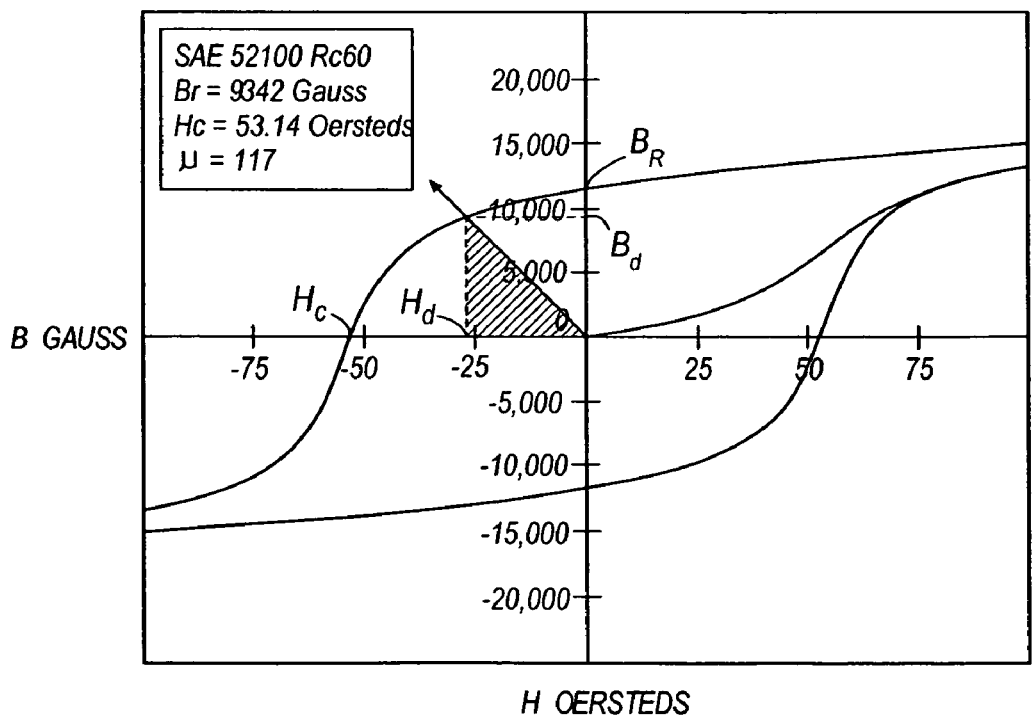

In certain embodiments, the properties of magnetic material needed to optimize residual magnetic load are high coercive force ($H_C$) and high residual flux density ($B_R$). The usefulness of residual magnetic load is measure by the quantity of flux (Maxwells) it can produce in the magnetic air gap, and the magnetomotive force (Amp–Turns) it can maintain across the magnetic air gap. One half times the area of these two quantities [½*(Total Air Gap Flux)*(Magnetomotive Force)], or the area under the air gap permeability line and the hysteresis curve (as shown in FIG. 6g), is the energy stored in the magnetic air gap. An optimum or maximum possible energy of the magnetic air gap per cubic centimeters of material is, therefore, a logical way to evaluate the magnetic efficiency of the material that will be used in a residual magnetic application.

FIGS. 6a-6h illustrate magnetic hysteresis curves or loops for several materials, such as steel, with carbon contents from 0.02% to 1.0% and hardnesses from fully annealed to 60 Rc. The curves are divided into four quadrants. The second quadrant represents the demagnetizing quadrant. The portion of the hysteresis loop included in the second quadrant is called the demagnetization curve. The residual flux density ($B_R$) exists in a closed path, such as a ring, and the total coercive intensity ($H_C$) is the force required to overcome the reluctivity of the material to establish a closed path.

The introduction of a magnetic air gap of the same size into all of the graphs illustrated in FIGS. 6a-6h reduces the flux density from ($B_R$) to ($B_d$), thereby reducing the reluctivity in the material from ($H_C$) to ($H_C$–$H_d$) and creating a magnetomotive force in the magnetic air gap equal to ($H_d$*the length of the closed path). The shaded rectangles, each having an area equal to ($B_d$*$H_d$), will therefore be equal to twice the energy of the magnetic air gap per unit volume of material. The optimum point of operation of the magnetic material will, therefore, be where the area ($B_d$*$H_d$) is a maximum for a given magnetic air gap.

FIG. 6g illustrates a magnetic hysteresis curve 68 for SAE 52100 alloyed steel material with a hardness of 40 Rc. The intersection of a magnetic air gap permeance line and the magnetic hysteresis curve for a magnetic material under consideration determines the flux density $B_d$ and the magnetic intensity $H_d$ at the air gap, which is useful to determine the residual magnetic force of the application being considered. The residual force of a magnetized armature 18 and core housing 20 without the magnetic air gap 60 is represented by line 70 located on the y-axis. In some embodiments, the magnetic air gap 60 when the lock 12 is engaged ranges from approximately 0.002 inches to 0.005 inches. Lines 72 and 74 represent the permeance of two possible air gaps [(Flux/(Amp–Turns)] between an armature and a core housing. In embodiments of the steering column lock 12, the lines 72 and 74 could represent the permeance of a 0.002 inches and a 0.005 inches air gap, respectively. When the cross-sectional areas of the pole faces of a desired design are determined, the flux densities can be determined by the intersections of the lines 72 and 74, and the material hysteresis curve can be useful in calculating the residual magnetic force. In some embodiments, a 0.002 inch magnetic air gap is generated with very smooth or finely-lapped surfaces (i.e., the smoothness or flatness or the surface is better than one light band and the surface finish is better than an "as ground" finish). A 0.005 inch magnetic air gap can be generated with flat, "as ground" finishes. In some embodiments, the magnetic air gap 60 can be reduced from 0.005 inch to 0.002 inch by lapping the "as ground" surface, which makes the surface more smooth and creates a tighter and closer engagement between the armature 18 and the core housing 20. In some embodiments, an air gap or separation distance between the armature 18 and the core housing 20 when the lock 12 is disengaged is magnitudes greater than a magnetic air gap when the lock 12 is engaged. For example, a disengaged air gap or separation distance can be approximately 0.05 inch or more.

Figure 7:
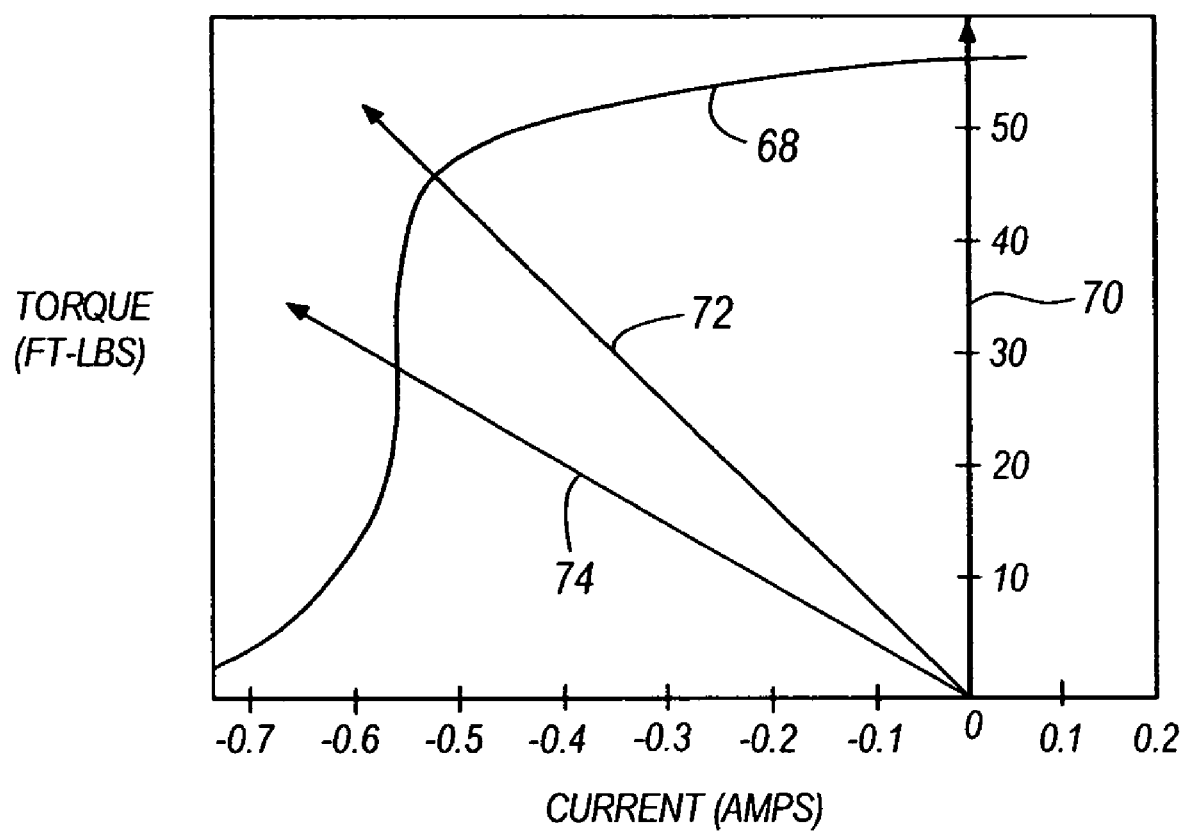
FIG. 7 is a demagnetization quadrant of the hysteresis curve graph of FIG. 6g.

FIG. 7 illustrates the demagnetization quadrant of the hysteresis curve 68 and converts the flux density (B) to torque and the magnetic intensity (H) to electrical current related to the physical characteristics of the electromagnetic assembly 26. FIG. 7 illustrates the calculated torque loads for SAE 52100 alloyed steel with a hardness of 40 Rc, and with a zero inch magnetic air gap, an 0.002 inch magnetic air gap, and an 0.005 magnetic inch air gap, as indicated by lines 70, 72, and 74 respectively.

Table 1 lists several magnetic materials, such as steels, that may be used in various residual magnetic applications. In some embodiments, the materials are selected for a particular residual magnetic application, such as latching force, response time, magnetic response (permeability), etc. Some requirements may require a tighter latching force but may not require quick response time. Other applications may require a lower latching force but may require a higher magnetic response (permeability). Table 1 lists the properties of the various steels, and provides the magnetic air gap energy for each material given a particular magnetic air gap magnetization curve. A magnetic air gap magnetization curve has a negative slope that is drawn from the origin in the second quadrant and intersects with the material demagnetization curve. The intersection determines ($B_d$), ($H_d$), and the energy of the magnetic air gap per unit volume of the material.

TABLE 1

Permeability, flux density, coercive force, and magnetic air gap energy for magnetic materials.

| Material | $\mu_{max}$ | $B_R$ Gauss line/cm² | $H_c$ Oersteds amp-turn/cm | $B_d$ Gauss line/cm² | $H_d$ Oersteds amp-turn/cm | Magnetic Air Gap Energy ($B_d$ * $H_d$)/2 *(line-amp-turn)/cm³ |
|---|---|---|---|---|---|---|
| SAE 1002 | 2,280 | 8,365 | 1.77 | 2,000 | 1.2 | 955 |
| SAE 1018 | 564 | 7,219 | 6.83 | 4,211 | 3.97 | 6,652 |
| SAE 1044 | 622 | 9,838 | 7.8 | 6,966 | 4.287 | 11,883 |
| SAE 1060 | 869 | 11,737 | 6.34 | 6,337 | 5.072 | 12,789 |
| SAE 1075 | 376 | 8,508 | 11.5 | 4,694 | 6.1837 | 11,546 |
| SAE 52100 Rc 20 | 549 | 12,915 | 14.3 | 11,740 | 12.510 | 58,439 |
| SAE 52100 Rc 40 | 443 | 13,479 | 20.124 | 12,599 | 14.535 | 72,865 |
| SAE 52100 Rc 60 | 117 | 9,342 | 53.14 | 8,759 | 11.81 | 41,160 |

*1 joule = $10^8$ line-amp-turns/cm³

As shown in Table 1, SAE 52100 Rc 40 alloyed steel has the highest magnetic air gap energy for the particular magnetic air gap size. The high magnetic air gap energy suggests that 52100 Rc 40 alloyed steel has the highest residual magnetic latching or engaging force among the materials listed in Table 1. The maximum permeability ($\mu_{max}$) of SAE 52100 Rc 40 alloyed steel, however, is at 443, which is lower than some of the other materials listed in Table 1. The lower the permeability, the slower the rate of magnetization. Generally, the residual magnetic force increases and the permeability (magnetization rate) decreases as the alloying or hardness of a material increases.

When the lock 12 is engaged, the magnetic air gap 60 generally results in a continuous residual force, even if the armature 18 slips due to a torque force being applied. Conventional steering column locks include a bolt that drops into a channel to lock the steering wheel and aid as an anti-theft device. Remotely-operated control systems are often used in combination with the bolt-and-channel mechanical mechanism and are fairly complex due to various motors, cams, and sensors. The bolt used in conventional steering column locks could be sheared by brute force or by a back load generated by movement of the tires. Once the bolt was sheared, the steering wheel shaft 48, the lock bolt housing, or the lock bolt itself could be damaged. The sheared bolt could also become locked in the channel and could permanently lock the steering column until the bolt was removed.

Rather than damaging or permanently locking components of the steering column, the magnetic air gap 60 enables the lock 12 to provide a continuous force even if some slip occurs. The slip allowed by the magnetic air gap 60 protects the steering column from being damaged. The greater the magnetic air gap 60, the easier it is to produce rotational slipping. For example, an engaged lock 12 (e.g., constructed of SAE 52100 alloyed steel with a hardness of 40 Rc) with a 0.005 inch magnetic air gap can begin to experience rotational slip when a torque of approximately 50 percent of the highest possible residual force of the lock 12 is exerted on the steering wheel shaft 48. However, an engaged lock 12 (e.g., constructed of SAE 52100 alloyed steel with a hardness of 40 Rc) with an 0.002 inch magnetic air gap begins to experience rotational slipping only after an application of torque equal to approximately 80 percent of the highest possible residual force of the lock 12 is exerted on the steering wheel shaft 48. In some embodiments, the applied torque required to cause rotational slipping ranges from approximately 20 foot pounds to 80 foot pounds, depending on the size and material of the armature 18 and the core housing 20 and the size of the magnetic air gap 60 when the lock 12 is engaged.

In some embodiments, the core housing 20 and the armature 18 are not brought to magnetic saturation and, if slippage is detected, the residual magnetic force between the core housing 20 and the armature 18 can be increased by powering an additional magnetization current to the coil 22. In some embodiments where the material has not saturated fully, the residual magnetic force between the core housing 20 and the armature 18 can be increased when slipping is detected. The residual magnetic force can also be increased to a predetermined force, such as approximately 90 foot pounds. In addition, the residual magnetic force can be increased by incrementing or modulating additional levels of current to the coil until saturation has been reached.

In some embodiments, the core housing 20 and the armature 18 are brought to magnetic saturation and, if slippage is detected, additional current is applied to the coil 22 to increase an electromagnetic force (e.g., doubling the force with SAE 52100 steel at a hardness of 40 Rc) between the core housing 20 and the armature 18. When the additional current is stopped, however, the additional electromagnetic force is not retained since the core housing 20 and the armature 18 were already magnetically saturated, and the prior residual magnetic force remains.

The slipping can cause increased friction between the armature 18 and the core housing 20. For example, slipping under relatively high forces can cause the steel surfaces of the core housing 20 and the armature 18 to begin to seize up as would most non-lubricated steel surfaces. In relatively soft materials, surface galling occurs due to particles of the surface material rolling. Surface galling can increase the magnetic air gap 60 between the core housing 20 and the armature 18. An increased air gap or separation distance can cause a loss of residual magnetic force, and thus, a loss of braking or locking force. High alloyed steels, such as SAE 52100 bearing steel, can provide tough and hard surfaces that limit the amount of seizing or surface galling between the armature 18 and the core housing 20.

In some embodiments, the material of the armature 18 and the core housing 20 can be surface treated to provide an outer shell with increased hardness. In some embodiments, a thermochemical diffusion process, referred to as nitriding, is used to create a nitride shell on the armature 18 and/or the core housing 20. Nitriding generates a surface composition consisting of a "white layer" or "compound zone," which is usually only a few micro-inches thick, and an outer, nitrogen diffusion zone, which is often approximately 0.003 inches thick or less to allow for demagnetization.

In some embodiments, the nitriding process can be performed on fully-annealed SAE 52100 steel with a martensitic structure. A martensitic structure can be achieved by heat treating the steel and cooling it with a marquench or rapid quench. Creating a martensitic structure within the steel can increase the hardness of the steel. For example, SAE 52100 steel with an original hardness of 20 Rc can have an increased hardness up to 60 Rc after the heat treatment.

The material can also be prepared for nitriding by grinding the surfaces flat to within a 0.005 inch variance and sandblasting the surface to provide a clean base for the nitride shell. As described above, the flatter and smoother the surfaces, the smaller the magnetic air gap 60 and the greater the residual force between the armature 18 and the core housing 20. The surfaces of the armature 18 and the core housing 20 can also be cleaned by sandblasting or other conventional cleaning processes before beginning the nitriding process.

During the nitriding process, nitrogen can be introduced to the surface of the steel while heating the surface of the steel. In some embodiments, the surface can be heated to approximately 950° F. to approximately 1,000° F. The nitrogen alters the composition of the surface and creates a harder outer surface or shell that is more resistant to wear (i.e., surface galling), corrosion, and temperature. Although the nitrided portions of the armature 18 and the core housing 20 have increased hardness, the high temperature used during the nitriding process can lower the overall hardness of the steel. In some embodiments, the nitriding process lowers the hardness of SAE 52100 steel with a hardness of approximately 50 Rc to a hardness of approximately 40 Rc.

The "white layer" generated during the nitriding process can also help mitigate any residual magnetic stick after demagnetization. This feature is similar to using a brass shim to prevent armature stick in solenoid applications. Although the "white layer" generally consists of about 90 percent iron and about 10 percent nitrogen and carbon, it provides a cleaner release for highly-alloyed steels such as SAE 52100. The thickness of the diffusion zone also aids the release of the demagnetized components. In some embodiments, the residual magnetic stick increases as the depth of the diffusion zone increases.

To nullify the residual force, or demagnetize the material of the armature 18 and the core housing 20, a magnetic field or flux is applied to the material of the armature 18 and core housing 20 in an opposite direction as previously applied by the magnifying current. To generate an opposite magnetic field the controller 24 can reverse the direction of the current previously sent through the coil 22. The controller 24 can apply constant current, a variable and/or a pulsed current in reverse in order to nullify the residual force. In some embodiments, when the armature 18 and the core housing 20 are brought to full magnetic saturation, the strength of the residual force is known and the controller 24 can generate a demagnetization current to cancel the known residual force. However, the residual force can be unknown or variable, and the controller 24 can apply a variable demagnetization current. In some embodiments, the controller 24 can use sensors to determine if the armature 18 and/or the core housing 20 are demagnetized and, if not, how much additional demagnetization current should be supplied to ensure full demagnetization.

The material of the armature 18 and the core housing 20 determines the potential residual magnetic force and, consequently, the demagnetization current needed to cancel or nullify the residual force. The magnitude of the demagnetization current can be determined from a graph including a magnetic hysteresis curve for the material of the armature 18 and the core housing 20, where the curve crosses the magnetic field intensity axis (as shown in FIGS. 6 and 7). In some materials, there is a small amount of residual magnetic recoil after demagnetization. To balance out this magnetic recoil, additional demagnetization current can be used to drive the residual flux density levels into the third quadrant (as shown in FIG. 6*g*), or to slightly negative flux density levels, which will cause the flux to recoil to a zero net. In some embodiments, the demagnetization current can have a value of approximately 700 milliamps to approximately 800 milliamps applied for approximately 60 milliseconds. Once the demagnetization current reaches the level indicated on the magnetic hysteresis curve graph, the magnetic field generated by the demagnetization current cancels the magnetic field generated by the magnetization current and substantially eliminates the residual magnetic force between the armature 18 and the core housing 20. Once the residual force is canceled, the armature 18 is no longer engaged with the core housing 20 by a residual magnetic force. For the steering column lock 12, with the armature 18 disengaged from the core housing 20, the armature 18 is allowed to rotate again with the steering wheel 14 and steering wheel shaft 48.

In some embodiments, the biasing member 27 aids the release of the armature 18 from the core housing 20. During the demagnetization process, a force applied by the biasing member 27 can become greater than the decreasing residual magnetic force between the armature 18 and the core housing 20. The biasing member 27 can be used to ensure a clean release between the armature 18 and the core housing 20. The biasing member 27 can also be used to control the separation of the armature 18 and core housing 20 to ensure a quiet or smooth release. The force applied by the biasing member 27 can be a constant force that releases the armature 18 and core housing 20 once the residual force has been sufficiently reduced or nullified, and thus, has become less than the force applied by the biasing member 27. Alternatively, the biasing member 27 can apply a variable releasing force between the armature 18 and the core housing 20. The functionality provided by the steering column lock 12 can be used in keyed or lever systems, key fob systems, and/or keyless systems. The configuration of the steering column lock 12 can alternatively be used in door locks and/or latch release systems (i.e., glove box latches, convertible cover latches, middle console latches, steering wheel or column locks, gas door latches, fasteners, ball or roller bearings, etc.).

FIGS. 8 and 9 illustrate one embodiment of the invention including a rotation blocking system that uses residual magnetism to block rotation of a mechanism at predetermined starting and stopping positions. In some embodiments, a residual magnetic device can use both rotary and axial movement to maximize torque blocking capabilities. FIGS. 8 and 9 illustrate a residual magnetic rotation blocking device 78 included in a vehicle ignition assembly 80. In some embodiments, the residual magnetic rotation blocking device 78 blocks the rotation of a vehicle ignition assembly 80. The residual magnetic rotation blocking device 78 can block the starting or forward rotation of the vehicle ignition assembly 80 to prevent a vehicle from starting. The residual magnetic rotation blocking device 78 can also be used to block the return rotation of the vehicle ignition assembly 80 to provide a park interlock function that blocks the rotation of the vehicle ignition assembly 80 until the vehicle is in park. The residual magnetic rotation blocking device 78 can be used with keyed vehicle ignition assemblies 80 (as shown in FIG. 8) where a key can be inserted and turned to operate the vehicle ignition assembly 80. The residual magnetic rotation blocking device 78 can also be used with vehicle ignition assemblies 80 in which a user turns a knob or presses a button to operate, rotate, or otherwise actuate the vehicle ignition assembly 80. The residual magnetic rotation blocking device 78 can also be used with other rotational-transfer systems configured to start and stop, open or close, select or deselect, or lock or unlock components.

Conventional vehicle ignition assemblies include a solenoid or other power actuators to block rotation. Replacing solenoids or power actuators with the residual magnetic rotation blocking device 78 simplifies vehicle ignition assemblies 80 by having fewer moveable parts that can be broken or damaged. The residual magnetic rotation blocking device 78 also requires less power to change states and requires no power to maintain state. Additionally, the residual magnetic rotation blocking device 78 offers quick state changes and quiet operation.

The vehicle ignition assembly 80 illustrated in FIGS. 8 and 9 includes an input device 82 (such as a key or a knob), an ignition cylinder 83, a driver 84, an ignition switch 86, and the residual magnetic rotation blocking device 78. The input device 82 can be inserted into or otherwise coupled to the ignition cylinder 83. The ignition cylinder 83 is rotatably coupled to the driver 84, and the driver 84 is rotateably coupled to the ignition switch 86. The input device 82 can be used to transfer rotation to the ignition switch 86 in order to operate a vehicle ignition to start the vehicle. In some embodiments, the input device 82, the ignition cylinder 83 and/or the driver 84 can be an integral unit.

The residual magnetic rotation blocking device 78 includes an armature 90, a core housing 92, and a coil (not shown). The residual magnetic rotation blocking device 78 can also include a controller (not shown) than supplies voltage to the coil. In some embodiments, the constructions, properties, and operations of the armature 90, the core housing 92, the coil, and/or the controller are similar to the armature 18, the core housing 20, the coil 22, and the controller 24 described above with respect to the steering column lock 12. The armature 90 of the residual magnetic rotation blocking device 78 can be mounted concentric and/or adjacent to the driver 84 and can be rotatably coupled to the driver 84 such that rotation of the driver 84 rotates the armature 90. Conversely, if the armature 90 is blocked from rotating, the driver 84 will also not be able to rotate.

In some embodiments, the core housing 92 can be mounted to a housing (not shown) of the vehicle ignition assembly 80 that can prevent the core housing 92 from moving in a rotational or an axial direction relative to the housing. The ignition cylinder 83, which can rotate with the driver 84, can pass through the core housing 92 and can be allowed to rotate substantially freely through an opening of the core housing 92.

In a locked state, as shown in FIG. 8, the vehicle ignition assembly 80 can block rotation due to a residual magnetic force between the armature 90 and the core housing 92 of the residual magnetic rotation blocking device 78. If an operator attempts to rotate the input device 82 without proper authorization, the residual magnetic force between the armature 90 and the core housing 92 can prevent rotational motion of the input device 82, and thus, the ignition switch 86.

The residual magnetic rotation blocking device 78 can include a detent configuration 96 on the armature 90 and the core housing 92. The detent configuration 96 can force the armature 90 to move axially away from the core housing 92, for example, before significant rotational movement can occur. The detent configuration 96 can include at least one female recess 96a on the core housing 92 and at least one corresponding male protrusion 96b on the armature 90. Multiple female recesses 96a and/or multiple male protrusions 96b can also be included to indicate one or more operation settings to the operator as he or she turns the input device 82. For example, the core housing 92 can include an off recess, an accessory recess, and a run recess. The core housing 92 can include the male protrusions 96b and the armature can include the corresponding female recesses 96a. The camming action necessary to force the protrusions out of engagement with the recesses adds to the torsional braking action of the residual magnetic rotation blocking device 78. In other words, the axial residual magnetic force between the armature 90 and the coil housing 92 along with the detent configuration 96 increases the amount of torque required to forcibly rotate the input device 82.

In some embodiments, the vehicle ignition assembly 80 can include a break-away mechanism 100 built into the ignition cylinder 83 or input device 82. The break-away mechanism 100 can limit the maximum torque that can be applied to the input device 82 or the ignition cylinder 83 by shearing rather than transferring a particular amount of torque to the vehicle ignition assembly 80. Since the residual magnetic rotation blocking device 78 has a finite ability to resist torque, the break-away mechanism 100 can prevent the residual magnetic rotation blocking device 78 from failing. In some embodiments, the torque required to shear the break-away mechanism 100 can be lower than the maximum torque that the residual magnetic rotation blocking device 78 can resist. In addition, to prevent the break-away mechanism 100 from breaking unnecessarily, the torque required to shear the break-away mechanism 100 can be higher than the torque generated by an operator's hand in normal use.

Figure 10:
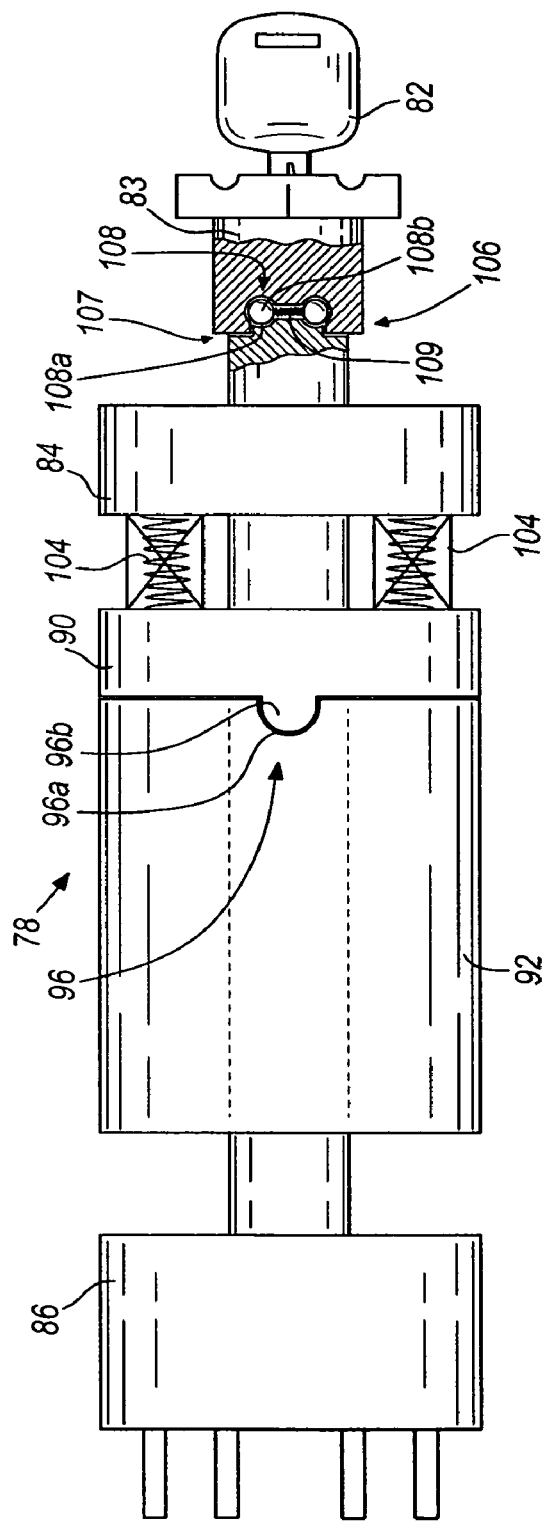
FIG. 10 is a side view of a rotation blocking system with a residual magnetic locking device with a break-over mechanism according to one embodiment of the invention.

The vehicle ignition assembly 80 can include other safety or precautionary mechanisms to restrict unauthorized rotation. In some embodiments, the ignition cylinder 83 or the input device 82 includes a break-over mechanism 106, as shown in FIG. 10. When the armature 90 and the core housing 92 are engaged and the vehicle ignition assembly 80 is in a locked state, excess torque can be dissipated by the break-over mechanism 106. The break-over mechanism 106 can include a separation break 107 that creates a gap or break along the rotation transfer path of the vehicle ignition assembly 80. The separation break 107 can include a detent configuration 108 with one or more female recesses 108a and one or more male protrusions 108b. In some embodiments, the male protrusions 108b can include a free-moving ball bearing or circular component that can rest or engage with the female recesses 108a. During normal operation, the male protrusions 108a can engage the female recesses 108a such that they move and rotate together. Torque applied to the input device 82 when the vehicle ignition assembly 80 is in the locked state can cause the male protrusions 108b to disengage from the female recesses 108a. For example, if the male protrusions 108b include ball bearings, applying torque can force the ball bearings out of the female recesses 108a. In some embodiments, the detent configuration 108 can become disengaged when approximately 2 foot-pounds of torque is applied to the input device 82 or the ignition cylinder 83. When the vehicle ignition assembly 80 is locked and the detent configuration is disengaged, female recesses 108a can remain stationary while the male protrusions 108b can rotate. The detent configuration 108 of the break-over mechanism 106 allow excess torque to be dissipated by the input device 82 or the ignition cylinder 83 without damaging the vehicle ignition assembly 80 or transferring a force that allows unauthorized access to or operation of the vehicle. The break-over mechanism 106 can also include a biasing member 109 that can return the detent configuration 108 to a starting or predetermined position (e.g., a position where the female recesses 108a are engaged with the male recesses 108b). The biasing member 109 can include one or more compression springs, tension springs, elastomeric members, wedges, and/or foams.

In the unlocked condition, as shown in FIG. 9, the residual magnetic rotation blocking device 78 is demagnetized after proper authorization is received (i.e., the insertion of an accepted key, the shifting of the vehicle transmission into park, passive identification received by a sensor, etc.). The residual magnetic force between the armature 90 and the core housing 92 is removed and the armature 90 is substantially free to rotate relative to the core housing 92. The detent configuration 96 can also provide a momentary "snap" feel when rotating the vehicle ignition assembly 80 from one position to another. The feel from the detent configuration 96 can be used to indicate to the operator the various states of the vehicle ignition assembly 80, such as "Off," "Accessory," or "Run." The vehicle ignition assembly 80 can also include one or more biasing members 104, such as one or more compression springs, tension springs, elastomeric members, wedges, and/or foams, located between the armature 90 and the driver 84 to bias the male protrusions 96b to engage the female recesses 96a. The biasing member 104 can alternatively provide a separation force between the armature 90 and the core housing 92 when the residual magnetic rotation blocking device 78 is disengaged.

The vehicle ignition assembly 80 includes a controller as described with respect to the steering column lock 12. The controller can provide magnetization and demagnetization currents to the coil in the core housing 92 to lock and unlock the vehicle ignition assembly 80. The controller can also determine the state of the residual magnetic rotation blocking device 78 using one or more of the methods described above with respect to the steering column lock 12 (i.e., a switch, Hall effect sensor, etc.).

The vehicle ignition systems 80 described above provide a locked state in which the armature 90 is engaged with the core housing 92 such that neither can rotate. In another embodiment, disengaging or uncoupling an armature and a core housing in order to prevent the transfer of rotational movement can block rotational motion of a vehicle ignition system. By disengaging an armature and core housing, an input device can be rotated freely in a locked state preventing transfer of rotation to a vehicle ignition system or other component. Allowing free rotation of an input device can eliminate a need for the break-away mechanism 100 or the break-over mechanism 106.

Figure 11:
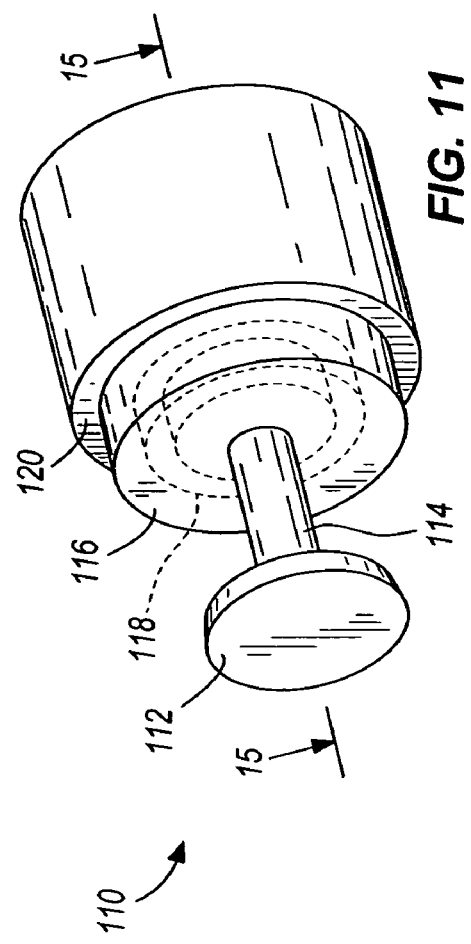
FIG. 11 is a perspective view of a rotation blocking system with a residual magnetic device according to another embodiment of the invention.

FIG. 11 illustrates another vehicle ignition assembly 110 according to one embodiment of the invention. The vehicle ignition assembly 110 can include a key head or input device 112, a shaft 114, a core housing 116, a coil 118, and a splined coupler 120. The input device 112 can operate as a handle or mechanism for accessing, rotating, releasing, or opening a component, such as a vehicle ignition system, a door, or a latch. The shaft 114 can extend from the input device 112 and through a center opening of the core housing 116. In some embodiments, the constructions, properties, and operations of the core housing 116 and the coil 118 are similar to the core housing 20 and the coil 22 described above with respect to the steering column lock 12. The vehicle ignition assembly 110 can also include a controller (not shown) as described above with respect to the steering column lock 12.

The core housing 116 can be positioned within a center opening of the splined coupler 120. In some embodiments, the core housing 116 can be mounted to the splined coupler 120 such that the core housing 116 can move rotationally with the splined coupler 120. The rotation of the splined coupler 120 can be transferred to drive components such as ignition contacts, steering column locks, latch releases, etc. The functionality provided by the vehicle ignition assembly 110 can be used in keyed or lever systems, key fob systems, and/or keyless systems. The configuration of the vehicle ignition assembly 110 can alternatively be used in door locks and/or latch release systems (i.e., glove box latches, convertible cover latches, middle console latches, steering wheel or column locks, gas door latches, fasteners, ball or roller bearings, etc.).

Figure 12:
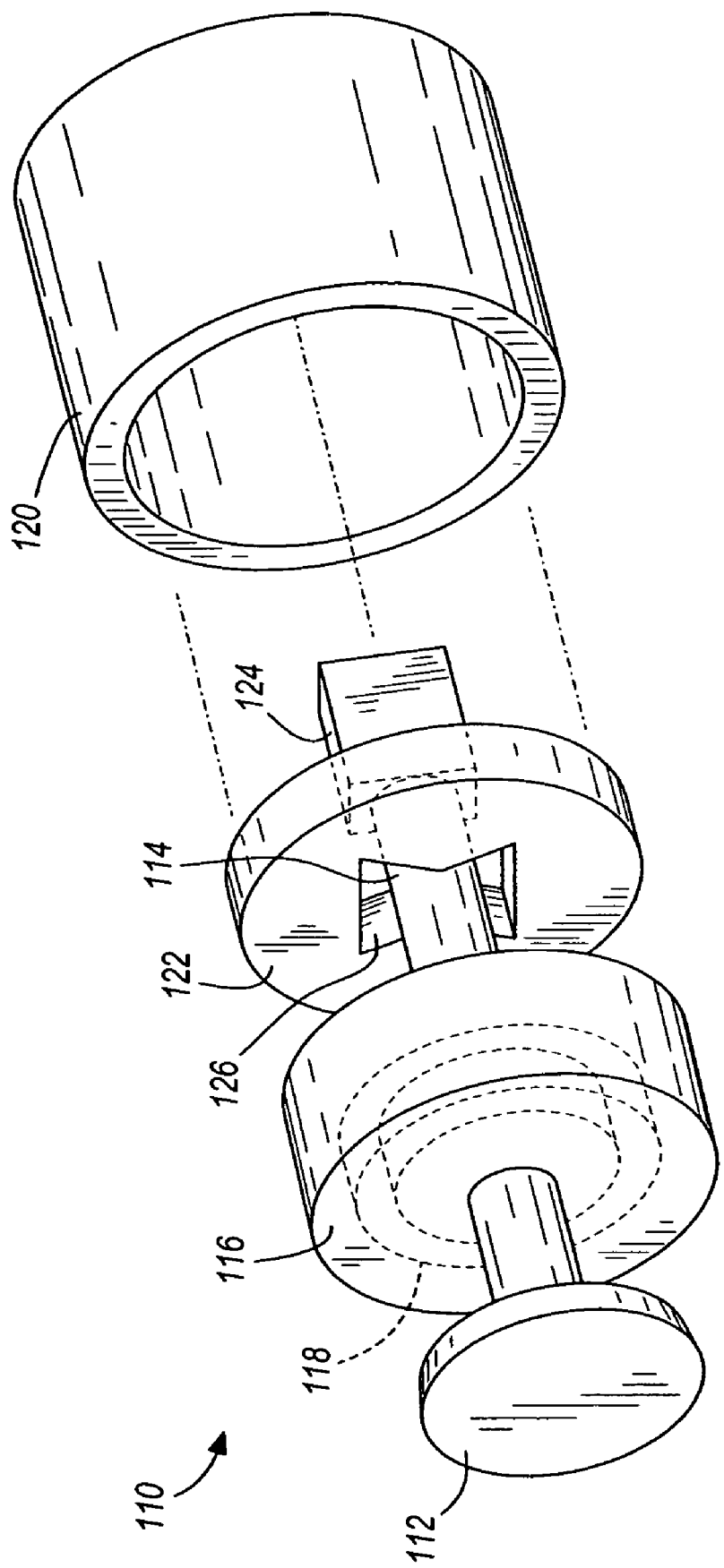
FIG. 12 is an exploded view of the rotation blocking system of FIG. 11.

FIG. 12 illustrates an exploded view of the vehicle ignition assembly 110. The vehicle ignition assembly 110 can include the input device 112, the shaft 114, the core housing 116, the coil 118, an armature 122, and the splined coupler 120. The input device 112 can be attached to the shaft 114 that extends through the center of the core housing 116 and the armature 122. In some embodiments, the constructions, properties, and operations of the armature 122 are similar to the armature 18 described with respect to the steering column lock 12.

The end of the shaft 114 can include a shaft driver 124 that is configured to engage with the armature 118. In some embodiments, the armature 122 can include a center opening 126 that accepts or receives the shaft 114 and the driver 124. The armature 122 can be positioned inside the splined coupler 120, such that when the armature 122 rotates, the splined coupler 120 also rotates. The armature 122 and the splined coupler 120 can also be configured to allow the armature 122 to move axially within the splined coupler 120 to allow the shaft 114 and the shaft driver 124 to engage with the center opening 126 of the armature 122.

Figure 13:
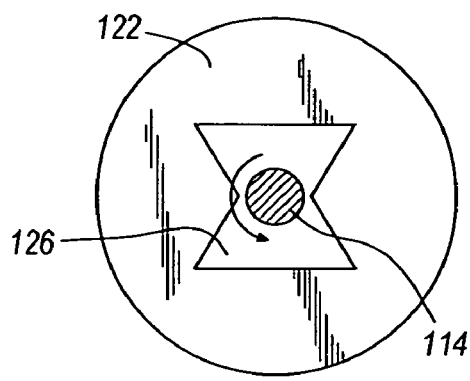
FIGS. 13 and 14 are front views of an armature of the rotation blocking system of FIG. 12.
Figure 14:
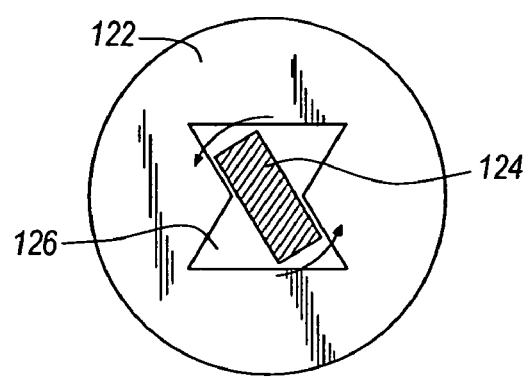

In some embodiments, the center opening 126 includes a bow-tie shape as shown in FIGS. 12, 13, and 14. FIG. 13 illustrates the shaft 114, which can have a generally cylindrical shape, positioned within the center opening 126 of the armature 122. The size and shape of the shaft 114 and the center opening 126 allows the shaft 114 to freely rotate within the center opening 126 without transferring rotation to the armature 122.

In contrast, FIG. 14 illustrates the shaft driver 124, which has a generally rectangular shape, positioned within the center opening 126 of the armature 122. The shape and size of the shaft driver 124 engages opposing edges with the center opening 126 such that the rotation of the shaft driver 124 is transferred to the armature 122, and thus, the splined coupler 120.

The bow-tie shape of the opening 126 can also provide a degree of error-correction by engaging the armature 122 even when the shaft driver 124 and armature 122 are not completely aligned. In some embodiments, the vehicle ignition assembly 110 can perform access authentication before unlocking. An access controller (not shown) can verify a passive or mechanical input device 112 before unlocking the vehicle ignition assembly 110. The bow-tie shape can provide a lost-motion function in order to provide time for authentication. If an operator rotates the input device 112 faster than the access controller can perform the authentication, the operator may have to turn back the input device 112 to reengage the shaft driver 124 with the center opening 126 of the armature 122 before attempting to rotate the input device 112 again. In some embodiments, the access controller, the shaft 114, the shaft driver 124, and the armature 122 are constructed to minimize the authorization time and the probability of beating the access controller by introducing sufficient lost motion. A variety of rotary and/or linear lost motion devices can be used with other embodiments to provide sufficient time for authentication.

Figure 15:
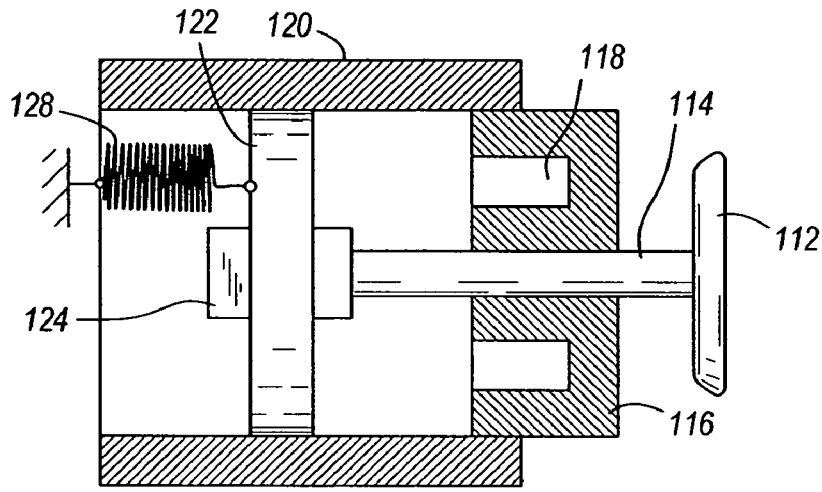
FIG. 15 is a cross-sectional view of the rotation blocking system of FIG. 11 in an unlocked state.

FIG. 15 illustrates a cross-sectional view of the vehicle ignition assembly 110 (taken along reference line 15 illustrated in FIG. 11) in an unlocked state. In the unlocked stated, the armature 122 is disengaged with the core housing 116 and is engaged with the shaft driver 124. Rotating the input device 112 transfers rotation down the shaft 114 to the shaft driver 124 and from the shaft driver 124 to the armature 122. The armature 122 can be positioned such that the rotation of the armature 122 can be transferred to the splined coupler 120, which can drive the ignition system or another system. A biasing member 128 can apply a force to the armature 122 that, in the absence of a greater force (i.e., a residual magnetic force), keeps the armature 122 engaged with the shaft driver 124. The biasing member 128 can include one or more compression springs, tension springs, elastomeric members, wedges, and/or foams. With the armature 122 disengaged with the core housing 116 and engaged with the shaft driver 124, a path is created to transfer rotation applied to the input device 112 to the splined coupler 120.

Figure 16:
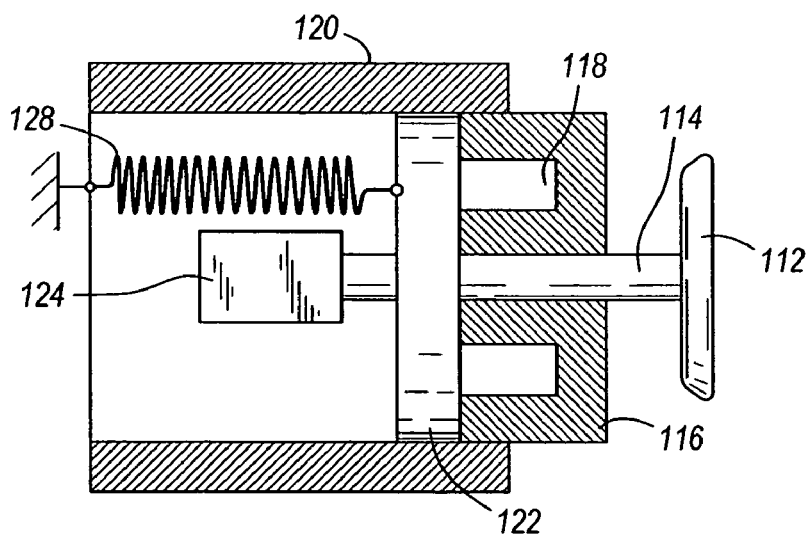
FIG. 16 is a cross-sectional view of the rotation blocking system of FIG. 11 in a locked stated.

FIG. 16 illustrates a cross-sectional view of the vehicle ignition assembly 110 (taken along reference line 15 shown on FIG. 11) in a locked state. To block access to the vehicle ignition assembly 110, a residual magnetic force is generated between the core housing 116 and armature 122 by providing a magnetization current or pulse to the coil 118. The resulting residual magnetic force can overcome the biasing force of the spring 128 and can draw the armature 122 toward the core housing 116. As the armature 122 is pulled to the core housing 116, the center opening 126 can be disengaged from the shaft driver 124. Also, the shaft 114 can become engaged with the center opening 126 of the armature 122, rather than the shaft driver 124. With the shaft driver 124 disengaged from the center opening 126 of the armature 122, rotation is not transferred to the armature 122 or the splined coupler 120 and the rotation cannot be used to operate or initiate the vehicle ignition assembly 110.

To unlock the vehicle ignition assembly 110, a demagnetization current can be provided or pulsed to the coil 118 to reduce or substantially eliminate the residual magnetic force between the core housing 116 and the armature 122. With the residual magnetic force reduced, the force provided by the biasing member 128 can pull the armature 122 back into engagement with the shaft driver 124. With the shaft driver 124 engaged within the center opening 126, rotational movement of the input device 112 can be transferred to the armature 122 and the splined coupler 120.

Figure 36A:
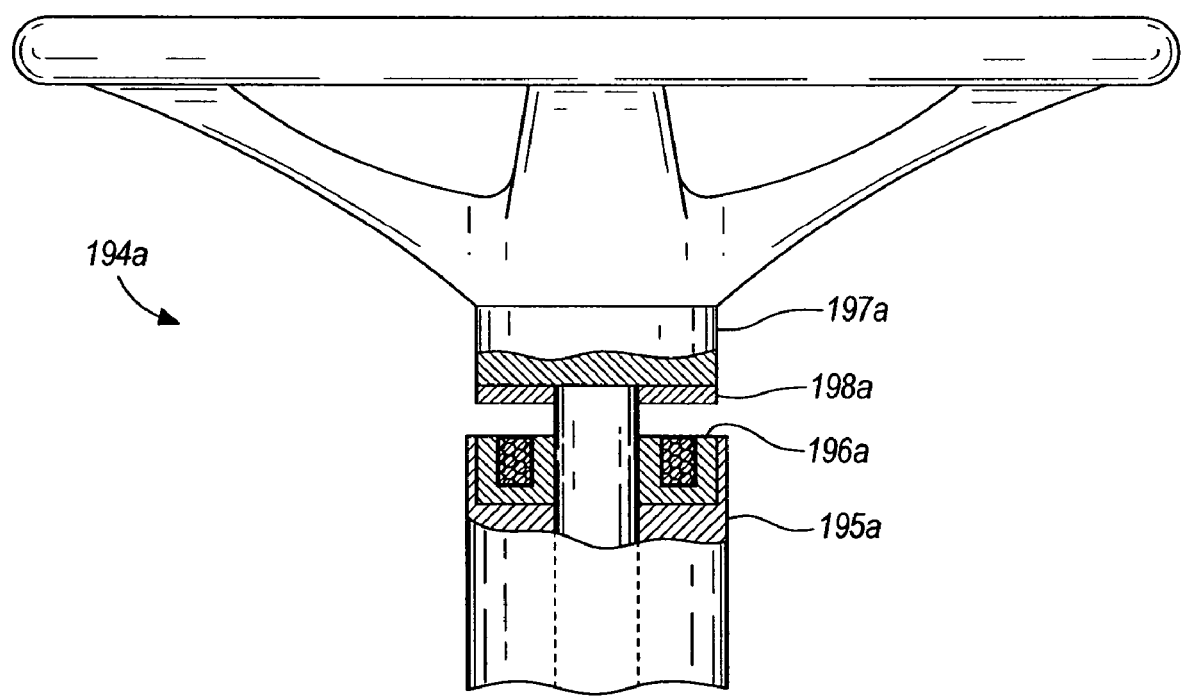
Figure 37:
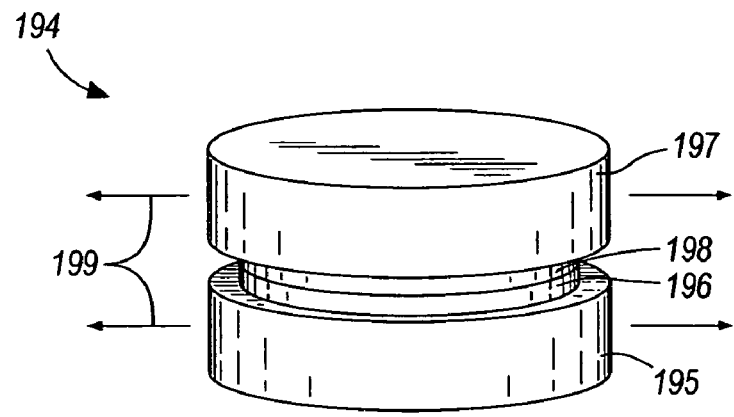
FIG. 37 schematically illustrates the clutch system of FIG. 36 in an engaged state.
Figure 37A:
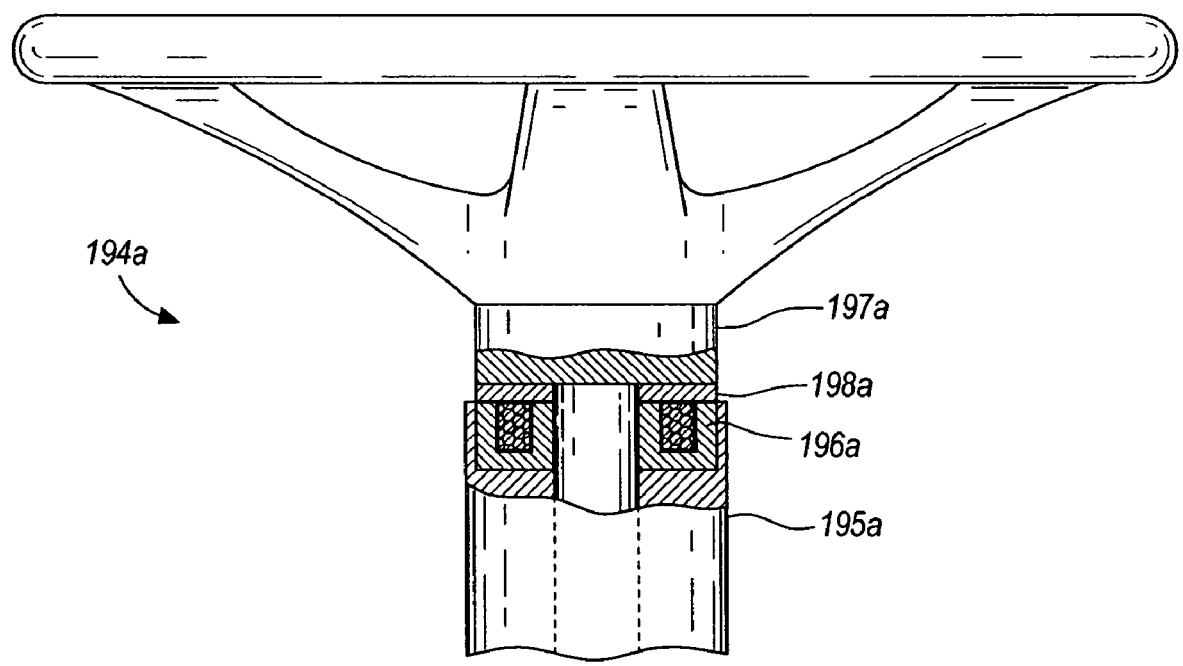

The vehicle ignition assembly 110 described above further includes a controller as described with respect to the steering column lock 12. The controller can provide magnetization and demagnetization currents to the coil 118 in order to lock and unlock the vehicle ignition assembly 110. The controller can determine the state of the residual magnetic force using one or more of the methods described above with respect to the steering column lock 12 (i.e., a switch, Hall effect sensor, etc.). In some embodiments, a steering column block-out device (as shown in FIGS. 36A and 37A) can be created using a clutch device similar to the vehicle ignition assembly 110.

Figure 17:
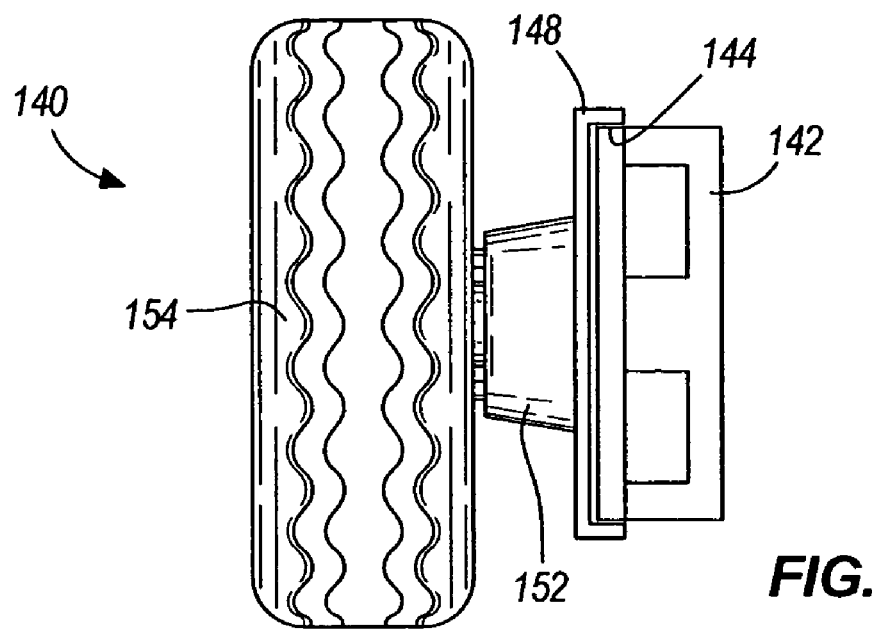
FIG. 17 illustrates a tire braking system with a residual magnetic device according to one embodiment of the invention.

FIG. 17 illustrates a residual magnetic rotational braking system 140 for a tire braking system of a vehicle according to another embodiment of the invention. The rotational braking system 140 can include a core housing 142 including a coil that is substantially grounded to the vehicle, a rotor-armature 148, a coupler 144 that is integrated to a hub 152, and a tire or wheel 154. It should be understood that the constructions, properties, and operations of the core housing 142, the coil, and the armature of the rotational braking system 140 can be similar to the core housing 20, the coil 22, and the armature 18 described above for the steering column lock 12. The residual magnetic tire braking system 140 can also include a controller as described with respect to the steering column lock 12.

The tire 154 can be attached to the hub 152 such that the rotational movement of rotor-armature 148 can be transferred through the coupler 144 to the hub 152 and to the tire 154. The rotation of the rotor-armature 148 that is transferred to coupler 144 can be prohibited by the application of a magnetically induced force between the core housing 142 and the rotor-armature 148. The rotor-armature 148 can move linearly toward and contact core housing 142 under magnetic attraction to cause friction. The friction converts the kinetic energy of the rotating rotor-armature 148 into thermal energy and stops rotation of the rotor-armature 148.

The magnetically induced force of the above rotational braking system 140 can be generated by a magnetization current pulsed to the coil included in the core housing 142. The initiation of a regulated current pulse could be associated with a human generated load applied to a lever or a pedal such that the load magnitude would be proportional to the magnetization current pulse. The rate and strength of the magnetization current provided to the coil can be varied to progressively reduce the rotational speed of the rotor-armature 148. Progressively larger magnetization currents can create subsequent larger residual magnetic loads until the material in the core housing 142 and the rotor-armature 148 is fully saturated.

To release the braking system 140 the polarity of the magnetization current can be reversed (i.e., a demagnetization current) and applied at a predetermined current level to demagnetize the material of the core housing 142 and rotor-armature 148. In some embodiments, the braking system 140 can be released in a progressive manner by progressively increasing the reversed polarity current until the full predetermined demagnetization current level is reached.

The above rotational braking system 140 can also be used as a zero power residual magnetic parking brake system. The residual magnetic parking brake system 140 can include a controller as described with respect to the steering column lock 12 to create the braking force. The controller can provide magnetization and demagnetization currents to the coil within the core body to apply and release the rotational braking system 140. For example, the residual magnetic parking brake can be engaged by pulsing a regulated magnetizing current level to the coil embedded in core body 142 to create a magnetic field with the capability to fully saturate the material of the core body and rotor-armature. Once the current pulse is complete, a high residual magnetic force will be set and the parking brake is engaged, there will be no need for further electrical interaction with the residual magnetic parking brake until the desired time to release it. The controller can also determine the state of the residual magnetic force between the armature and the core housing using one or more of the methods described above (i.e., a switch, a Hall effect sensor, etc.). To release the above RM parking brake system, a demagnetization current can be pulsed to the coil within the core housing and the residual magnetic force can be reduced or substantially eliminated. A biasing member, such as one or more compression springs, tension springs, elastomeric members, wedges, and/or foams, can be used to bias the rotor-armature 148 away from the core body 142.

The residual magnetic rotational braking and locking devices described above can be used in various systems and applications other than those described above. For example, residual magnetic braking devices, residual magnetic locking devices, and residual magnetic rotation blocking devices as described above can be used to operate rear compartment or trunk latches and accessory latches such as fuel filler door latches, glove box latches, and console latches. Residual magnetic braking, locking, and/or rotation blocking devices can also be used to operate door latches, window latches, hood latches, seat mechanisms (e.g., angular and linear seat and headrest position adjusters), door checks, clutch engagement actuators, and steering wheel position adjusters.

The functionality provided by the rotational braking system 140 can also be applied to angular and linear systems. In some embodiments, a residual magnetic axial latch can include a core housing attached to a generally stationary element or panel (e.g., a vehicle frame or body panel, a door frame, a console or compartment, a trunk frame, a hood frame, a window frame, a seat, etc.) and an armature attached to a moveable element or panel (e.g., a vehicle entrance door, a fuel filler door, a glove compartment door, a console or storage compartment door, a convertible roof, spare tire crank, a trunk lid, a rear compartment door, a hood, a window, a headrest, etc.). When a residual magnetic force is created, the armature on the moveable element can be retained to the core housing on the frame in order to lock the moveable element to the stationary element. The positions of the core housing and the armature can be interchanged, such that the core housing is attached to the moveable element and the armature is attached to the stationary element.

Figure 18:
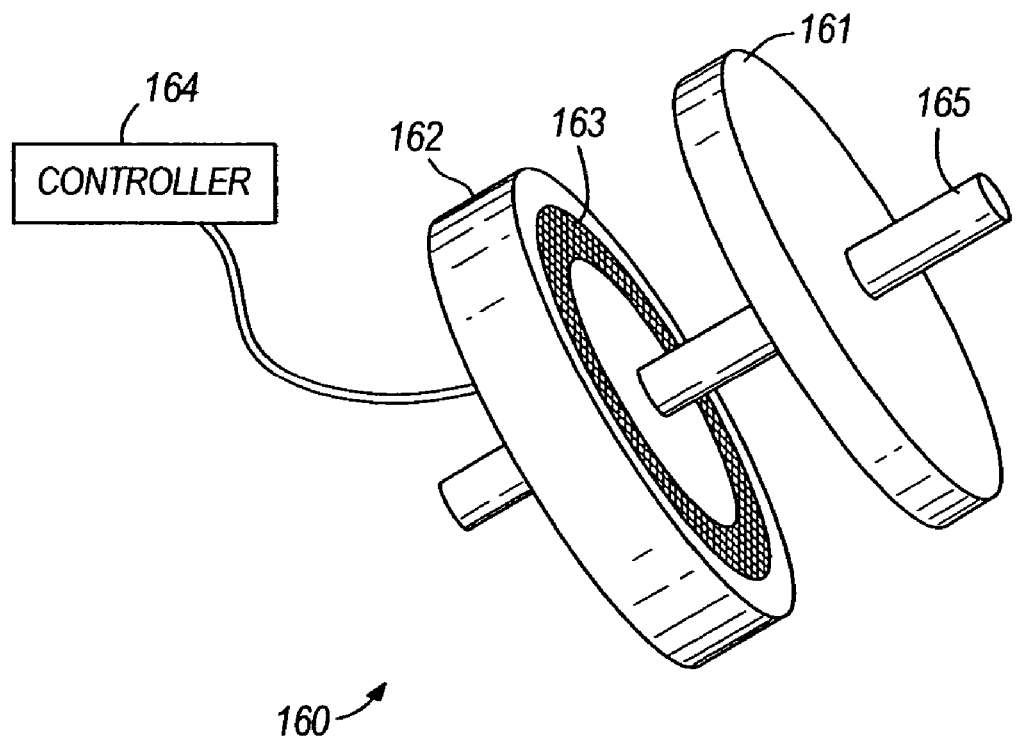
FIG. 18 illustrates a cylindrically-shaped residual magnetic device according to one embodiment of the invention.

As shown in FIG. 18, in some embodiments, a residual magnetic axial latch or retainer 160 can have a toroidal or cylindrical configuration. The residual magnetic axial latch 160 can include an armature 161, a core housing 162, a coil 163, and a controller 164. The residual magnetic axial latch 160 can also include a shaft 165 that passes through the armature 162 and the core housing 164.

Figure 19:
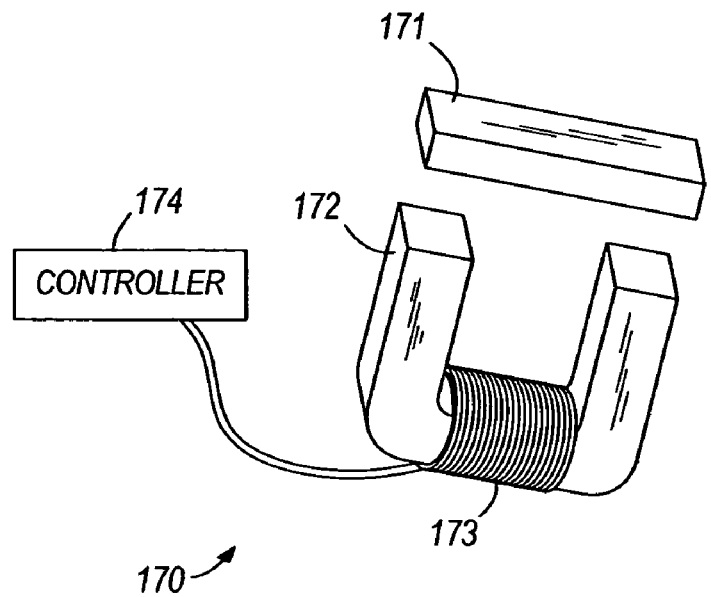
FIG. 19 illustrates a U-shaped residual magnetic device according to one embodiment of the invention.

Residual magnetic axial latches can also have a U-shaped configuration. FIG. 19 illustrates a residual magnetic axial latch 170 having a U-shaped configuration that includes an armature 171, a core housing 172, a coil 173, and a controller 174. The coil 173 of the U-shaped residual magnetic axial latch 170 can be wrapped around the base of the core housing 172, rather than being positioned within a yoke or a recess of the cylindrically-shaped core housing 162 of the cylindrically-shaped axial latch 160.

The constructions, properties, and operations of the armatures 161 and 171, the core housings 162 and 172, the coils 163 and 173, and the controllers 164 and 165 of the residual magnetic axial latches 160 and 170 can be similar to the core housing 20, the coil 22, and the armature 18 described in detail with respect to the steering column lock 12.

Figure 20:
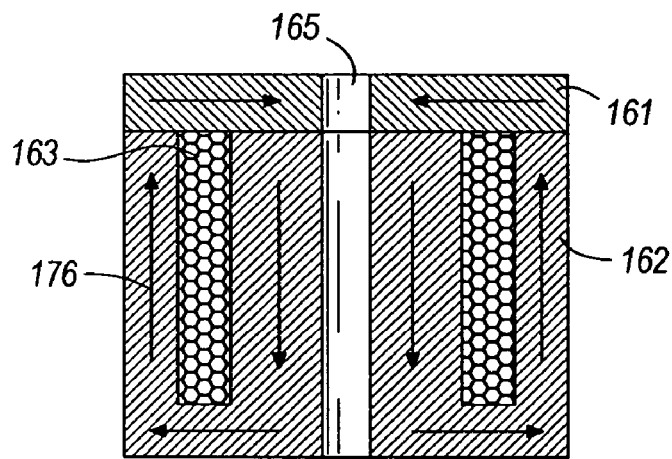
FIG. 20 is a cross-sectional view of the cylindrical-shaped residual magnetic device of FIG. 18 and the resulting magnetic field according to one embodiment of the invention.

As shown in FIG. 20, the cylindrically-shaped armature 161 and the cylindrically-shaped core housing 162 can allow a component, such as the shaft 165, to pass through the armature 161 and the core housing 162. The cylindrical shape of the armature 161 and the core housing 162 can create a generally cylindrically-shaped magnetic field 176 configured to engage the cylindrically-shaped armature 161 with the cylindrically-shaped core housing 162.

Figure 21:
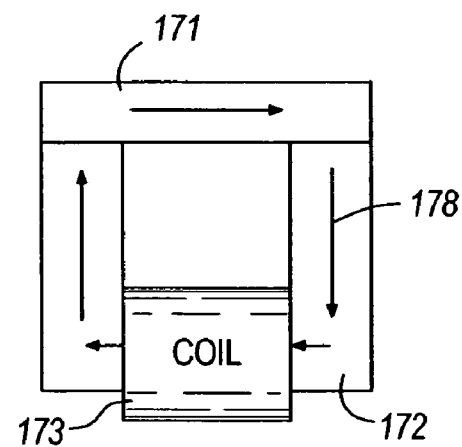
FIG. 21 is a cross-sectional view of the U-shaped residual magnetic device of FIG. 19 and the resulting magnetic field according to one embodiment of the invention.

Alternatively, as shown in FIG. 21, the U-shaped configuration of the residual magnetic axial latch 170 can create a generally flatter, rectangular-shaped magnetic field 178 configured to engage the linear or rod-shaped armature 171 with the top of the U-shaped core housing 172.

The cylindrically-shaped configuration and the U-shaped configurations can include an armature with a surface area greater than the interfacing surface area of a corresponding core housing. In some embodiments the armature 171 can be longer or wider than the width and length of the core housing 172. For example, a door opening can include a long linear armature that is longer than a corresponding core housing. The armature 171 or the armature 161 can also have a different general shape than the core housing 172 or the core housing 162. For example, the cylindrically-shaped armature 161 can be paired with the U-shaped core housing 172 for particular residual magnetic devices.

In the cylindrical configurations and the U-shaped configurations, the controller 164 or the controller 174 can sense that the moveable element is generally near or in contact with the stationary element. The controller 164 or the controller 174 can pulse a magnetization current to the coil 163 or the coil 173 to latch the armature 161 to the core housing 162 or the armature 171 to the core housing 172 in order to hold the moveable element to the stationary element. With the residual magnetic axial latch 160 or the residual magnetic axial latch 170 latched the moveable elements generally cannot be moved with respect to the stationary elements.

To release the latch, a remote access switch or release mechanism can be provided. Once the switch or mechanism is activated, the controller 164 or the controller 174 can provide a demagnetization current to the coil 163 or the coil 173 in order to unlatch the armature 161 from the core housing 162 or the armature 171 from the core housing 172. When the residual magnetic axial latch 160 or the residual magnetic axial latch 170 is unlatched, the moveable elements can again be moved with respect to the stationary elements.

Figure 22:
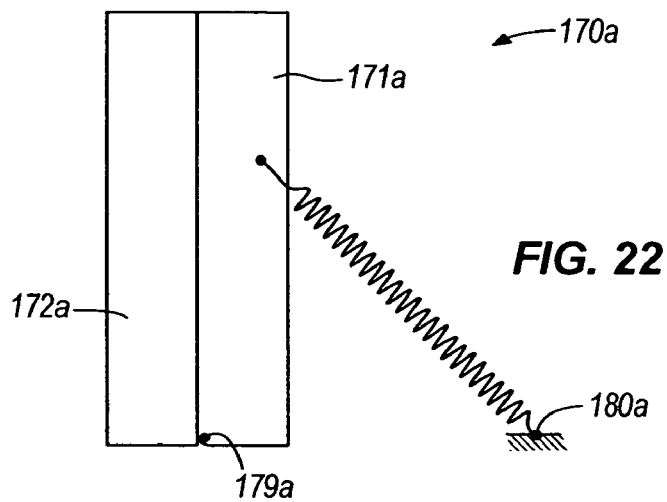
FIG. 22 illustrates a pivoting residual magnetic axial latch in an engaged state according to one embodiment of the invention.

In some embodiments, the armatures 161 and 171 can pivot away and toward the core housings 162 and 172. As shown in FIG. 22, a residual magnetic axial latch 170a can include an armature 171a that can pivot on a pivot point 179a away from and toward a core housing 172a. FIG. 22 illustrates the armature 171a engaged with the core housing 172a.

Figure 23:
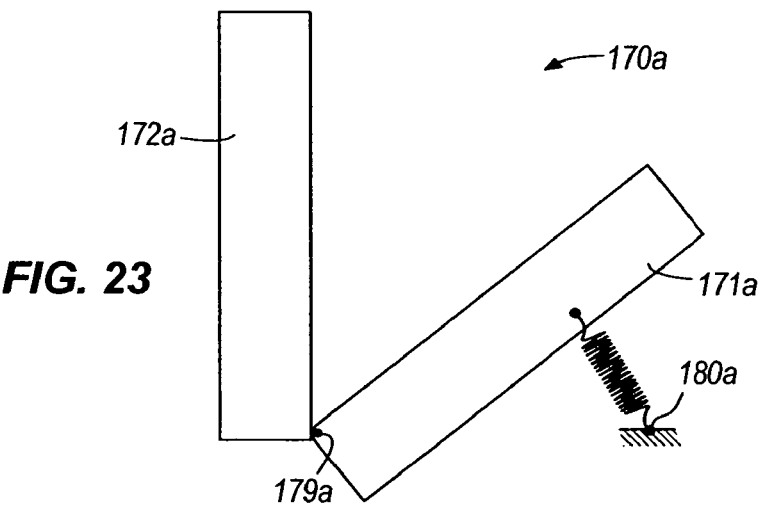
FIG. 23 illustrates the pivoting residual magnetic axial latch of FIG. 22 in a disengaged state.

FIG. 23 illustrates the armature 171a disengaged from the core housing 172a and pivoted away from the core housing 172a about the pivot point 179a. In some embodiments, a biasing member 180a forces the armature 171a to pivot away from the core housing 172a. The biasing member 180a can include one or more compression springs, tension springs, elastomeric members, wedges, and/or foams.

Figure 24:
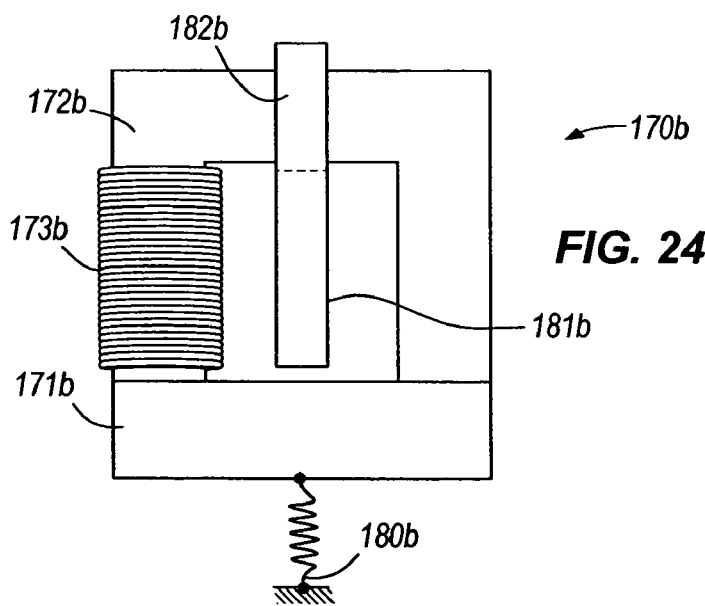
FIG. 24 illustrates a pivoting residual magnetic axial latch in an engaged state according to one embodiment of the invention.
Figure 25:
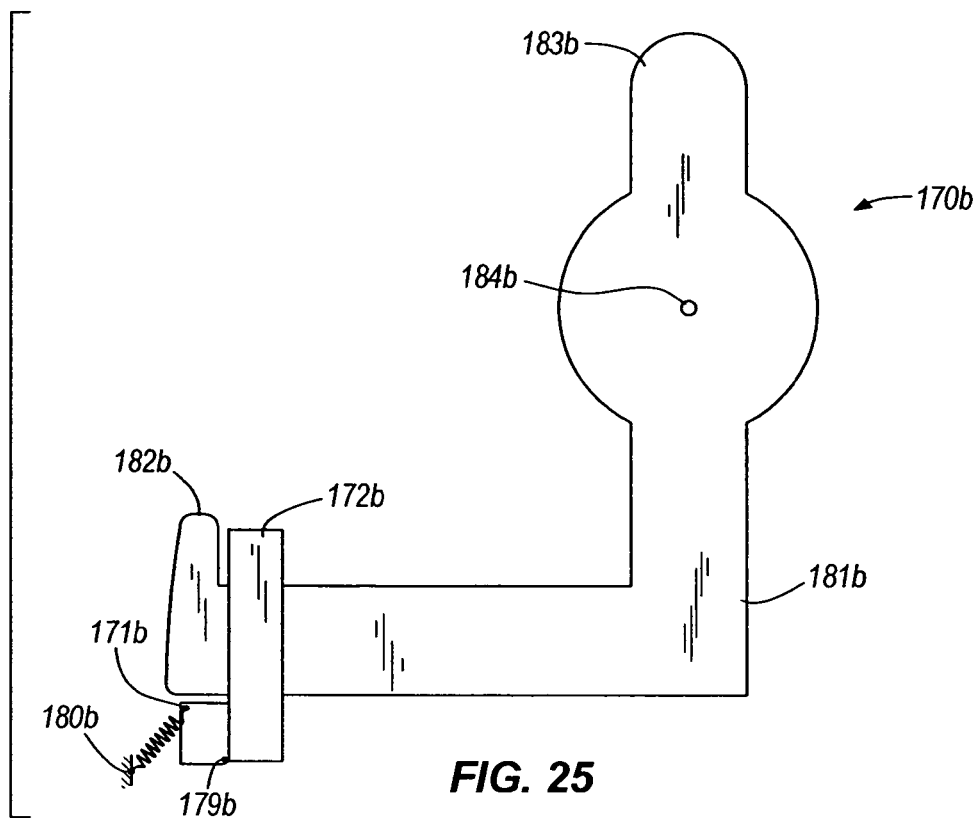
FIG. 25 illustrates the pivoting residual magnetic axial latch of FIG. 24 in an engaged state.

FIG. 24 illustrates a residual magnetic axial latch 170b according to one embodiment of the invention. The residual magnetic axial latch 170b can include an armature 171b, a core housing 172b, a coil 173b, a biasing member 180b, and a latch 181b with a latch protrusion 182b. FIG. 25 illustrates a side view of the residual magnetic axial latch 170b. As shown in FIG. 25, the latch 181b can include an input mechanism 183b. A force can be applied to the input mechanism 183b to rotate the latch 181b about a latch pivot point 184b. In some embodiments, the input mechanism 183b can be coupled to a lid, a door handle, or another moveable element (not shown). A manual force can be applied to the input mechanism 183b by moving the lid, the door handle, or the moveable element.

To unlatch the residual magnetic axial latch 170b, the latch 181b can be rotated. In some embodiments, the rotational path of the latch 181b moves the latch protrusion 182b down and through the middle of the U-shaped core housing 172b. When the core housing 172b is engaged with the armature 171b, however, the latch 181b cannot be rotated since the rotational path of the latch 181b is inhibited by the position of the armature 171b. In some embodiments, with the armature 171b engaged with the core housing 172b, the latch 181b cannot be rotated in order to clear the latch protrusion 182b from the U-shaped core housing 172b.

To unlatch the residual magnetic axial latch 170b, the armature 171b can be disengaged from the core housing 172b and pivoted about a pivot point 179b to allow the latch 181b to rotate and swing the latch protrusion 182b out of contact with the core housing 171b. In some embodiments, the biasing member 180b can force the armature 171b to pivot out of contact with the core housing 172b. The biasing member 180b can include one or more compression springs, tension springs, elastomeric members, wedges, and/or foams.

Figure 26:
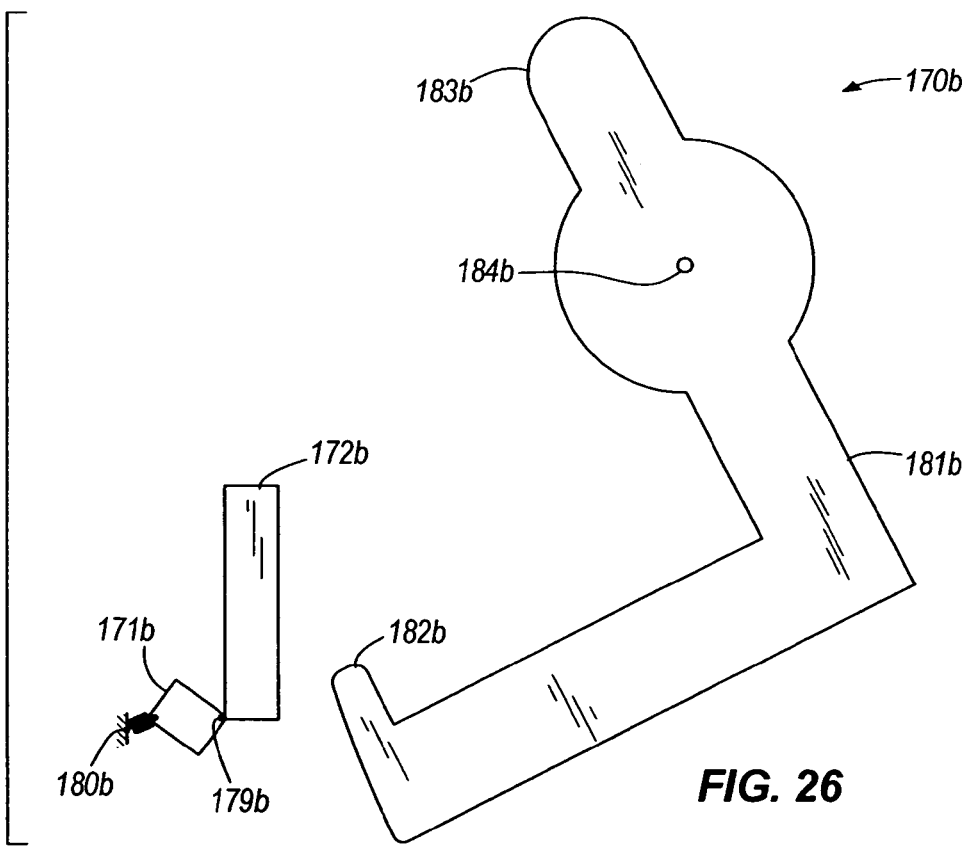
FIG. 26 illustrates the pivoting residual magnetic axial latch of FIG. 24 in a disengaged state.

FIG. 26 illustrates the residual magnetic axial latch 170b with the latch 181b unlatched from the core housing 172b. In some embodiments, with the latch 181b unlatched from the core housing 172b, a door, lid, or other moveable element can be moved and an entry, compartment, or other stationary element can be accessed, such as a building, a glove compartment, or a vehicle trunk.

Figure 27:
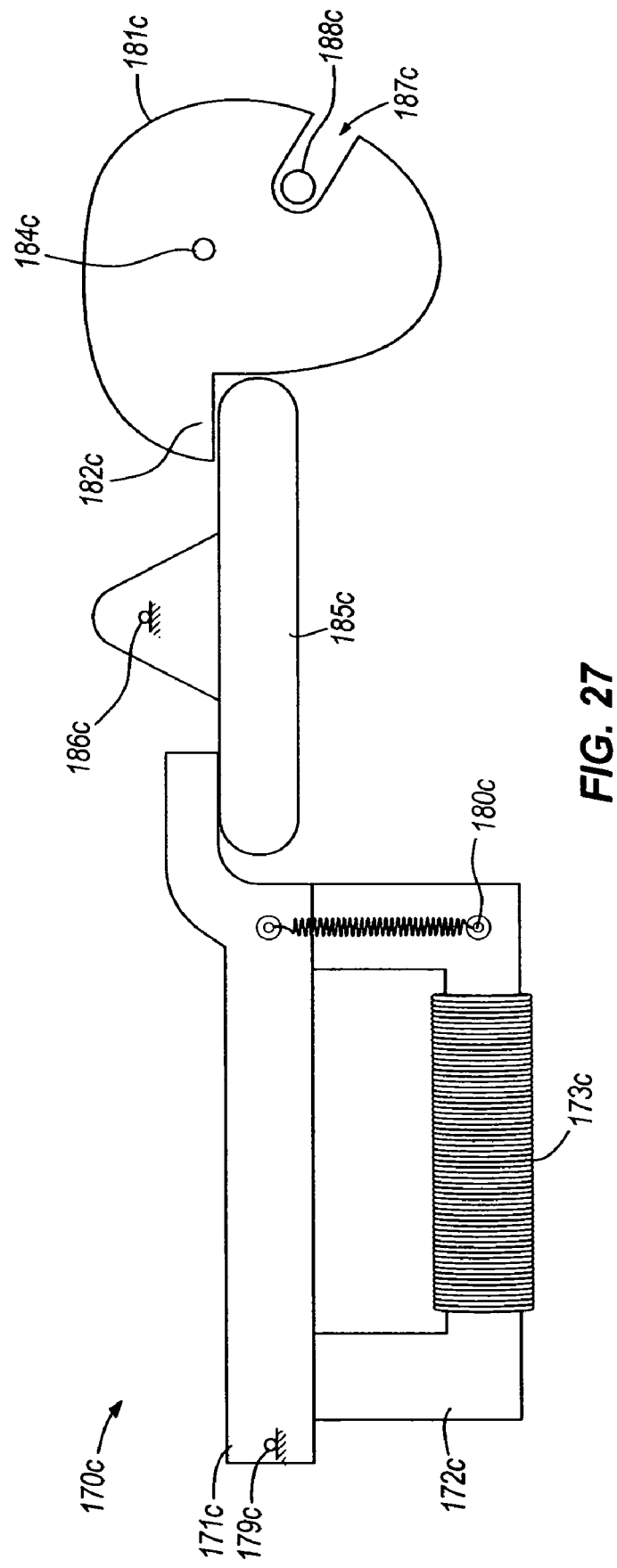
FIG. 27 illustrates a non-integrated pivoting residual magnetic axial latch in an engaged state according to one embodiment of the invention.

FIG. 27 illustrates a residual magnetic axial latch 170c according to another embodiment of the invention. As shown in FIG. 27, the residual magnetic axial latch 170c can include an armature 171c, a core housing 172c, and a coil 173c. In some embodiments, the armature 171c can pivot on a pivot point 179c. The residual magnetic axial latch 170c can also include a biasing member 180c, a rotor latch 181c with a latch protrusion 182c that rotate on a pivot point 184c, and a linkage system or mechanism 185c. In some embodiments, the linkage mechanism 185c can include a toggle link that connects the armature 171c and the core housing 172c with the rotor latch 181c. The linkage mechanism 185c can transfer movement of the rotor latch 181c to the armature 171c. The linkage mechanism 185c can pivot on a pivot point 186c.

FIG. 27 illustrates the residual magnetic axial latch 170c in an engaged state with the armature 171c engaged with the core housing 172c with a residual magnetic force. In some embodiments, the rotor latch 181c includes a release portion 187c that can accept a striker pin or bar 188c. The striker bar 188c can be coupled to a door, a lid, another moveable element, or a stationary element. In an engaged state, the rotor latch 181c can be retained in a locked state that prevents the striker bar 188c from being released and a moveable element from being moved.

To release the striker bar 188c from the release portion 187c, the rotor latch 181c can be rotated. When the rotor latch 181c rotates, the latch protrusion 182c can force the linkage mechanism 185c to rotate or pivot. When the linkage mechanism 185c rotates or moves, the linkage mechanism 185c can force the armature 171c to move. When the armature 171c is engaged with the core housing 172c, the armature 171c cannot move. Therefore, the linkage mechanism 185c and the rotor latch 181c also cannot rotate or pivot.

Figure 28:
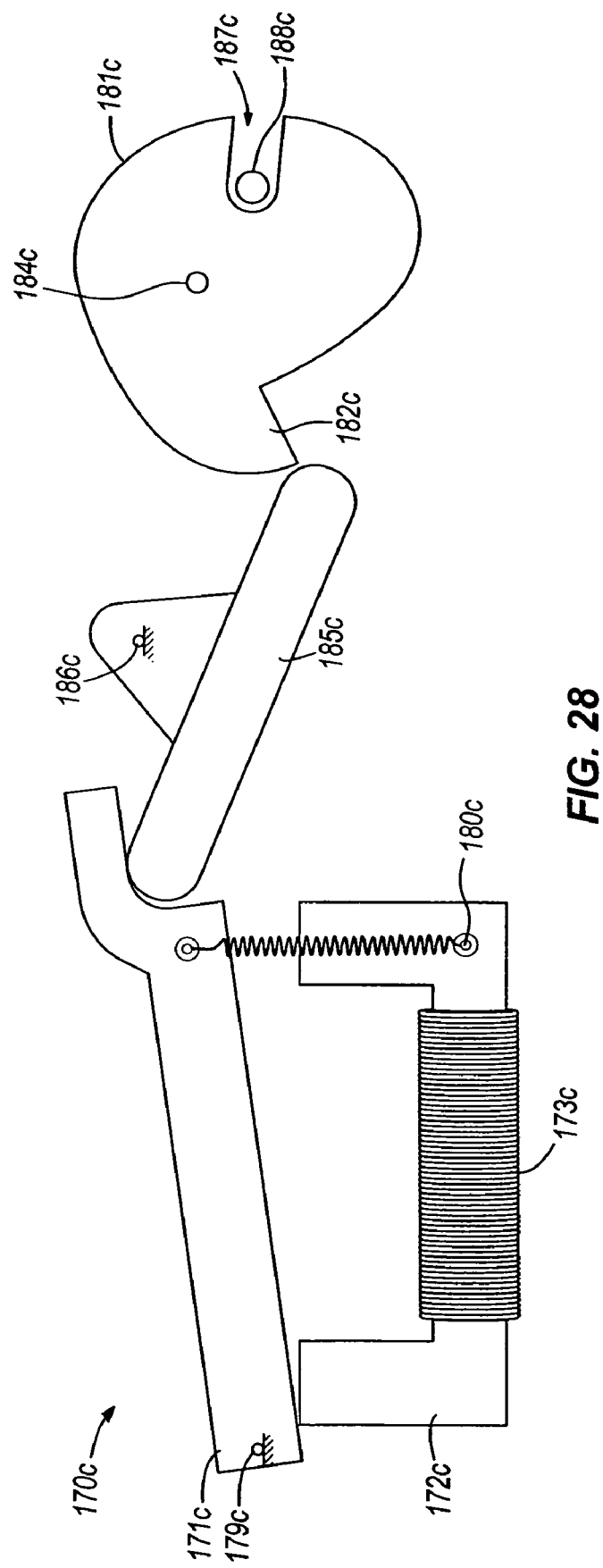
FIG. 28 illustrates the non-integrated pivoting residual magnetic axial latch of FIG. 27 in a disengaged state.

As shown in FIG. 28, the armature 171c can be disengaged from the core housing 172c and the armature 171c can pivot about the pivot point 179c. The armature 171c can pivot and allow the linkage mechanism 185c and the rotor latch 181c to rotate. The striker bar 188c can apply a tension force to the rotor latch 181c that, when the rotor latch 181c is allowed to move, can force the rotor latch 181c to rotate to an open position. The open position of the rotor latch 181c can release the striker bar 188c, and the moveable element coupled to the striker bar 188c can be moved.

In some embodiments, after the striker bar 188c is released, the residual magnetic axial latch 170c can be reset. The armature 171c can be reengaged with the core housing 172c by supplying a magnetization current to the coil 173c. In some embodiments, the biasing member 180c can force the armature 171c to pivot toward the core housing 172c. The biasing member 180c can include one or more compression springs, tension springs, elastomeric members, wedges, and/or foams.

Figure 29:
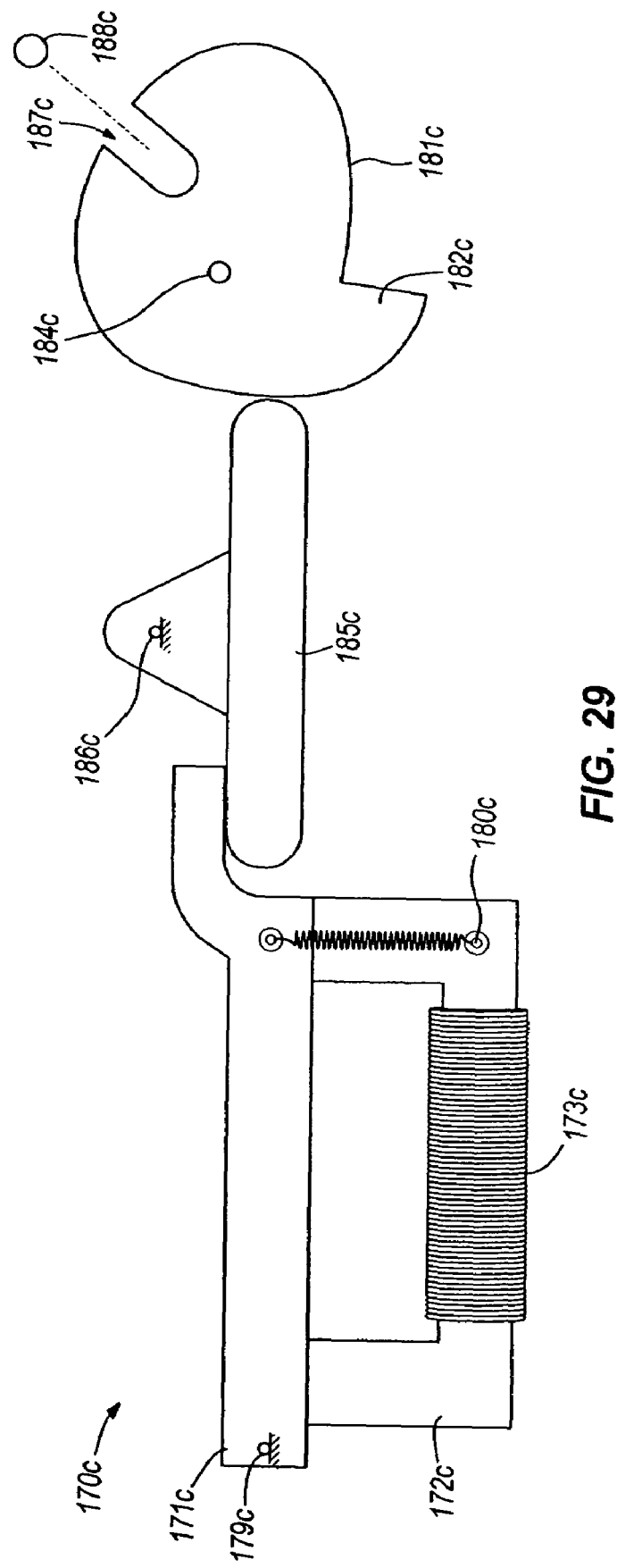
FIG. 29 illustrates the non-integrated pivoting residual magnetic axial latch of FIG. 27 in an engaged state.

FIG. 29 illustrates the residual magnetic axial latch 170c reset. With the residual magnetic axial latch 170c reset, the rotor latch 181c can accept the striker bar 188c. When the rotor latch 181c accepts the striker bar 188c, the force of the striker bar 188c can rotate the rotor latch 181c back to a closed position, as shown in FIG. 27. In some embodiments, the toggle link of the linkage mechanism 185c can freely swing open until the rotor latch 181c rotates into the closed position shown in FIG. 27. In some embodiments, the latch protrusion 182c can stop rotation of the rotor latch 181c at an open position.

Figure 30:
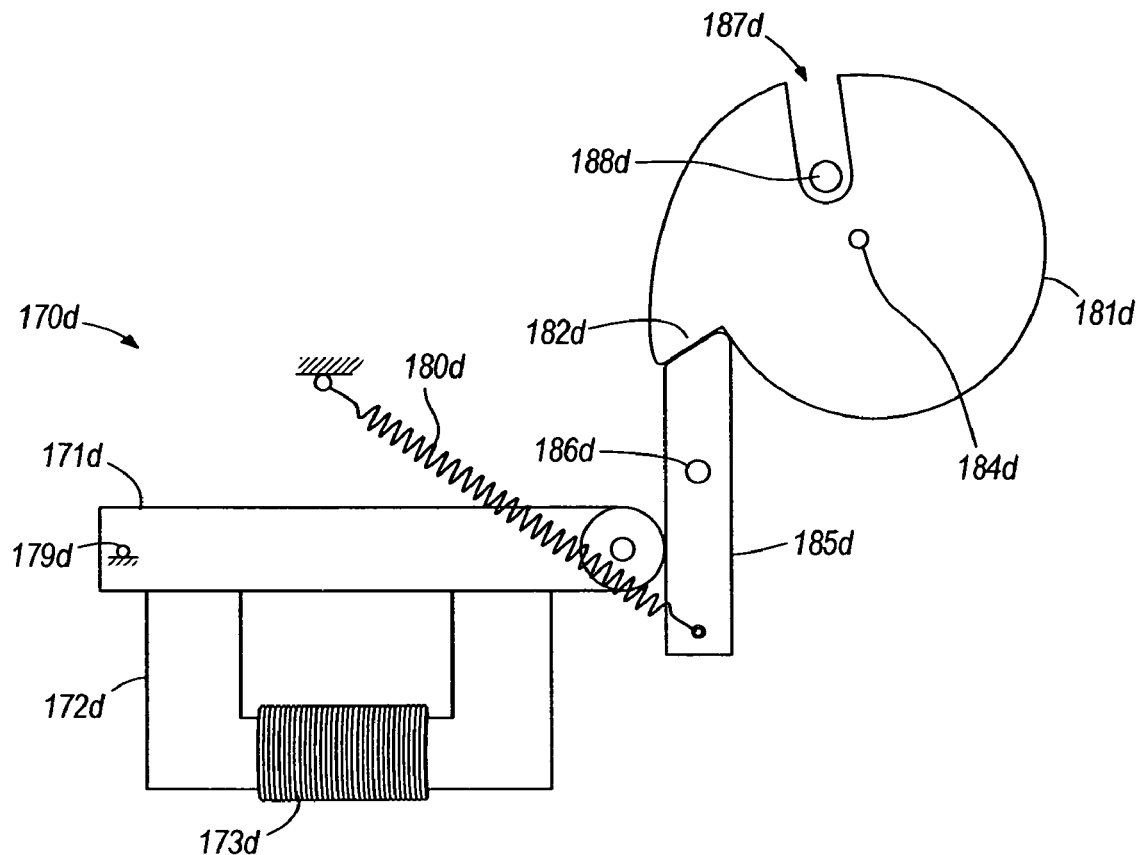
FIG. 30 illustrates a non-integrated pivoting residual magnetic axial latch in an engaged state according to another embodiment of the invention.

FIG. 30 illustrates a residual magnetic axial latch 170d according to another embodiment of the invention. As shown in FIG. 30, the residual magnetic axial latch 170d can include an armature 171d, a core housing 172d, and a coil 173d. In some embodiments, the armature 171d can rotate on a pivot point 179d. The residual magnetic axial latch 170d can also include a biasing member 180d, a rotor latch 181d with a latch protrusion 182d that rotate on a pivot point 184d, and a linkage mechanism 185d. In some embodiments, the linkage mechanism 185d includes a pawl that links the armature 171d and the core housing 172d with the rotor latch 181d. The linkage mechanism 185d can pivot on a pivot point 186d.

FIG. 30 illustrates the residual magnetic axial latch 170d in an engaged state with the armature 171d engaged with the core housing 172d with a residual magnetic force. In some embodiments, the rotor latch 181d includes a release portion 187d that can accept a striker pin or bar 188d. The striker bar 188d can be coupled to a moveable element, such as a door handle, a lid, or a stationary element. In an engaged state, the rotor latch 181d can be retained in a locked state that prevents the striker bar 188d from being released and, therefore, prevents the moveable element from moving.

To release the striker bar 188d from the release portion 187d, the rotor latch 181d can be rotated. When the rotor latch 181d rotates, the attempted rotation of the latch protrusion 182d can force the linkage mechanism 185d to rotate or pivot. The linkage mechanism 185d can rotate about pivot point 186d. As the linkage mechanism 185d rotates, the linkage mechanism 185d can attempt to force the armature 171d to pivot about the pivot point 179d and move away from the core housing 172d. When the armature 171d is engaged with the core housing 172d, however, the armature 171d cannot pivot and, therefore, the linkage mechanism 185d and the rotor latch 181d also cannot rotate.

Figure 31:
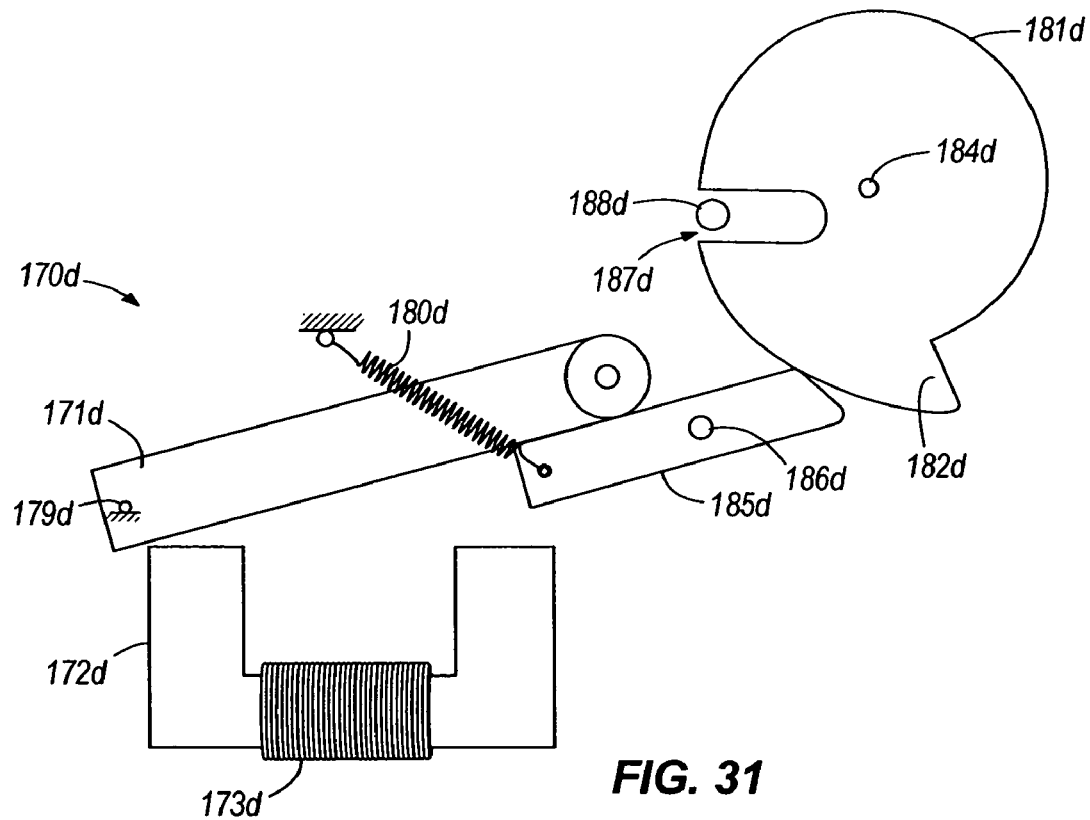
FIG. 31 illustrates the non-integrated pivoting residual magnetic axial latch of FIG. 30 in a disengaged state.

As shown in FIG. 31, the armature 171d can be disengaged from the core housing 172d and can pivot about the pivot point 179d. The armature 171d can pivot to allow the linkage mechanism 185d and the rotor latch 181d to rotate. The rotor latch 181d can be rotated to an open position in order to release the striker bar 188d.

In some embodiments, after the rotor latch 181d is opened and the striker bar 188d is released, the residual magnetic axial latch 170d can be reset. The armature 171d can be engaged with the core housing 172d by supplying a magnetization current to the coil 173d. In some embodiments, the biasing member 180d can force the linkage mechanism 185d to rotate to a reset position. The rotation of the linkage mechanism 185d can force the armature 171d to pivot toward the core housing 172d. The biasing member 180d can include one or more compression springs, tension springs, elastomeric members, wedges, and/or foams.

Figure 32:
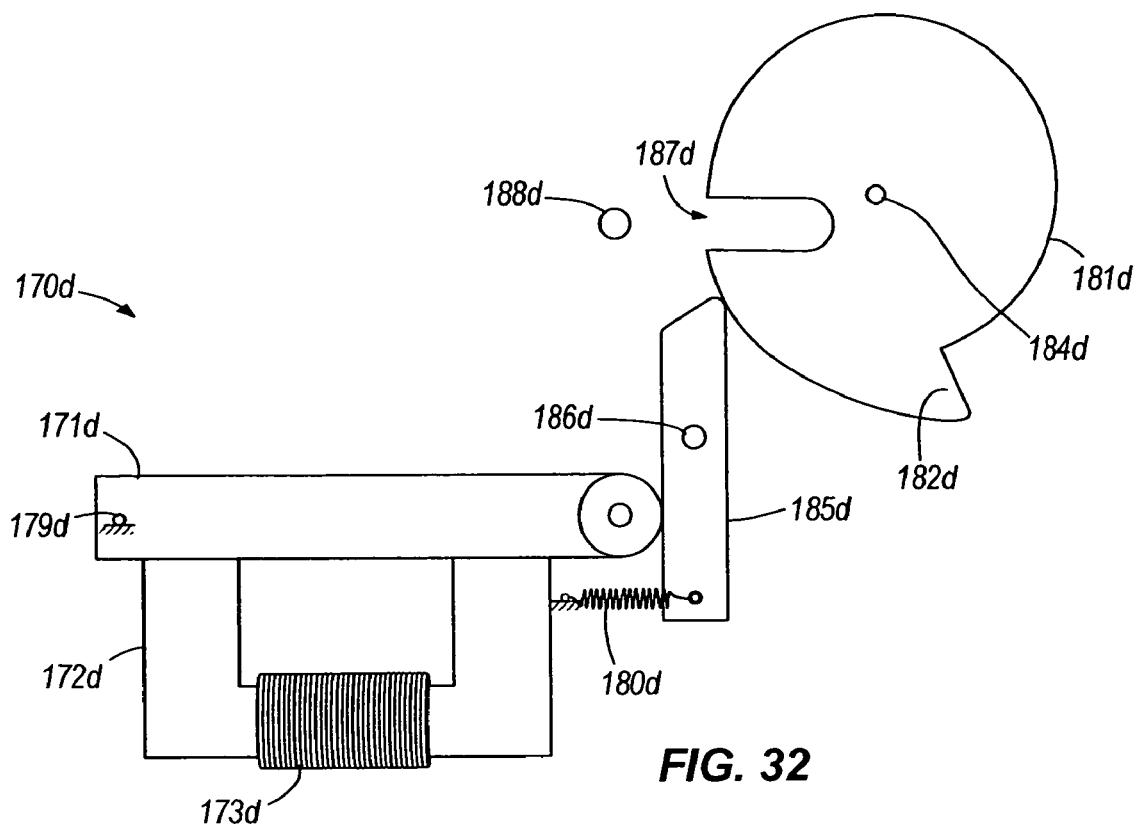
FIG. 32 illustrates the non-integrated pivoting residual magnetic axial latch of FIG. 30 in an engaged state.

FIG. 32 illustrates the residual magnetic axial latch 170d reset. By resetting the residual magnetic axial latch 170d, the rotor latch 181d can be in an open position such that the rotor latch 181d can accept the striker bar 188d. In some embodiments, the force of accepting the striker bar 188d can force the rotor latch 181d to rotate back to a closed position. The latch protrusion 182d can stop rotation of the rotor latch 181d at a closed position.

Figure 33:
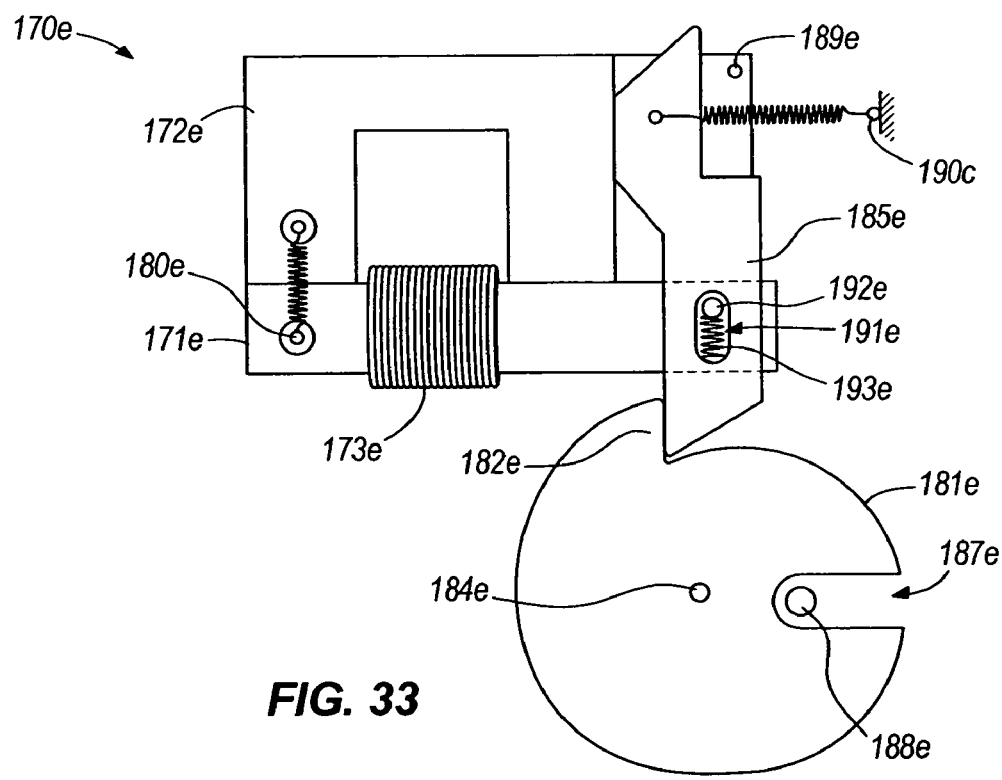
FIG. 33 illustrates another non-integrated pivoting residual magnetic axial latch in an engaged state according to an embodiment of the invention.

FIG. 33 illustrates another residual magnetic axial latch 170e according to one embodiment of the invention. As shown in FIG. 33, the residual magnetic axial latch 170e can include an armature 171e, a core housing 172e, and a coil 173e. The residual magnetic axial latch 170e can also include a biasing member 180e, a rotor latch 181e with a latch protrusion 182e that rotates on a pivot point 184e, and a linkage mechanism 185e. In some embodiments, the rotor latch 181e includes a release portion 187e that can accept a striker pin or bar 188e. In an engaged state, the rotor latch 181e can be retained in a locked state that prevents the striker bar 188e from being released.

The linkage mechanism 185e can connect the core housing 172e with the rotor latch 181e. The linkage mechanism 185e can include a pin slot 191e that accepts a pin 192e. The pin 192e can be coupled to the armature 171e. The pin slot 191e can also include a pin biasing member 193e that forces the pin slot 191e to remain in contact with the pin 192e. The pin biasing member 193e can include one or more compression springs, tension springs, elastomeric members, wedges, and/or foams.

In some embodiments, the armature 171e is mounted substantially stationary and the coil 173e is wrapped around the armature 171e. The core housing 172e can pivot away from and toward the armature 171e about a pivot point 189e. In some embodiments, as the core housing 172e pivots, the linkage mechanism 185e can slide or move about the pin 192e. The linkage mechanism 185e can slide or move and engage or catch the latch protrusion 182e.

FIG. 33 illustrates the residual magnetic axial latch 170e in an engaged state with the core housing 172e engaged with the armature 171e with a residual magnetic force. To release the striker bar 188e from the release portion 187e, the rotor latch 181e can be rotated. When the rotor latch 181e rotates, the latch protrusion 182e forces the linkage mechanism 185e to rotate. When the core housing 172e is engaged with the armature 171e, however, the linkage mechanism 185e cannot slide and/or rotate, and therefore, the rotor latch 181e also cannot rotate.

Figure 34:
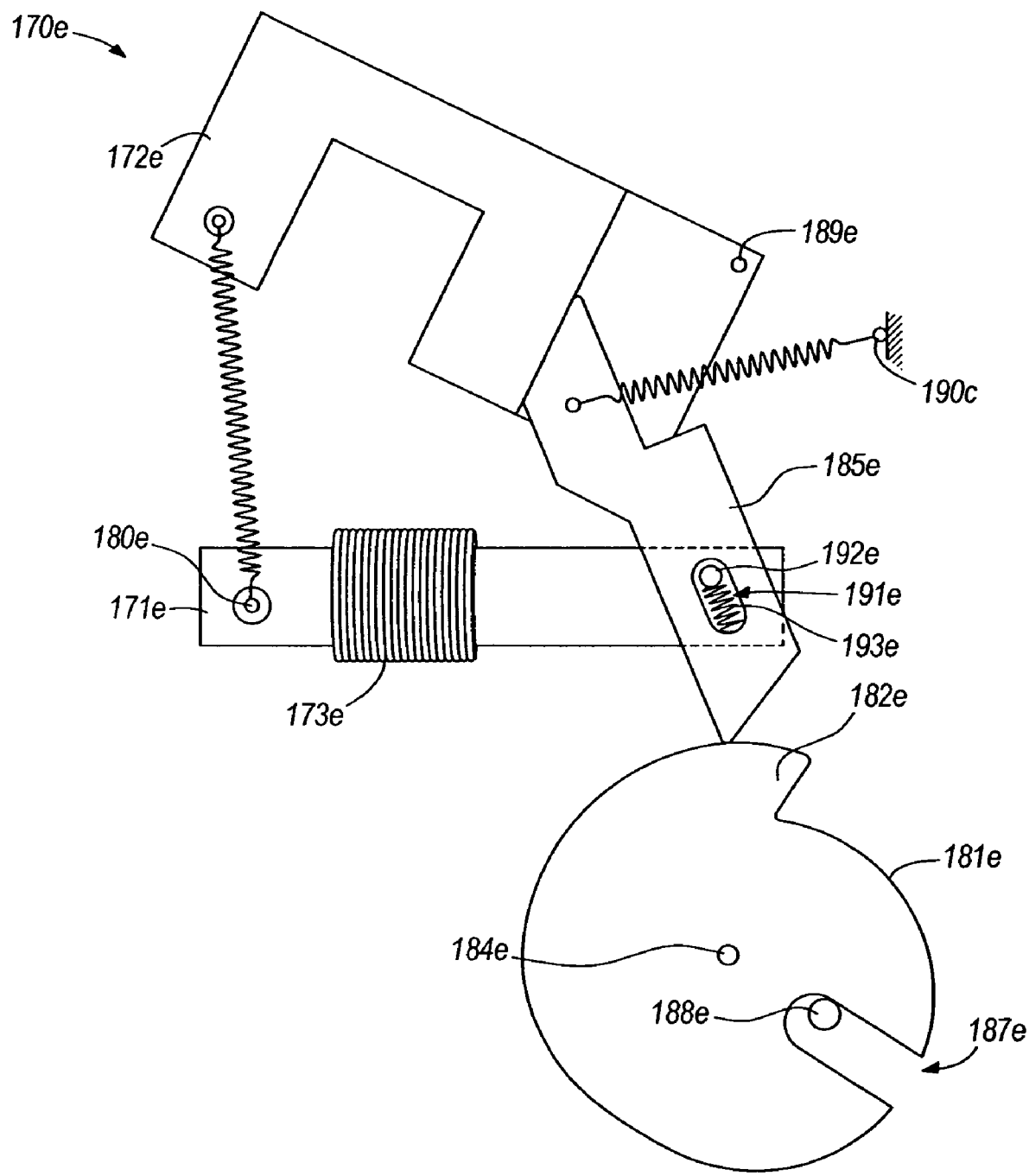
FIG. 34 illustrates the non-integrated pivoting residual magnetic axial latch of FIG. 33 in a disengaged state.

As shown in FIG. 34, with the core housing 172e disengaged from the armature 171e, the core housing 172e can pivot on the pivot point 189e in order to allow the linkage mechanism 185e to move or slide about the pin 192e and to disengage the linkage mechanism 185e from the rotor latch 181e. The rotor latch 181e can then be rotated to an open position in order to release the striker bar 188e.

In some embodiments, after the rotor latch 181e is opened and the striker bar 188e is released, the residual magnetic axial latch 170e can be reset. The core housing 172e can be reengaged with the armature 171e by supplying a magnetization current to the coil 173e. The biasing member 180e can force the core housing 172e to pivot about the pivot point 189e toward the armature 171e. The biasing member 180e can include one or more compression springs, tension springs, elastomeric members, wedges, and/or foams.

Figure 35:
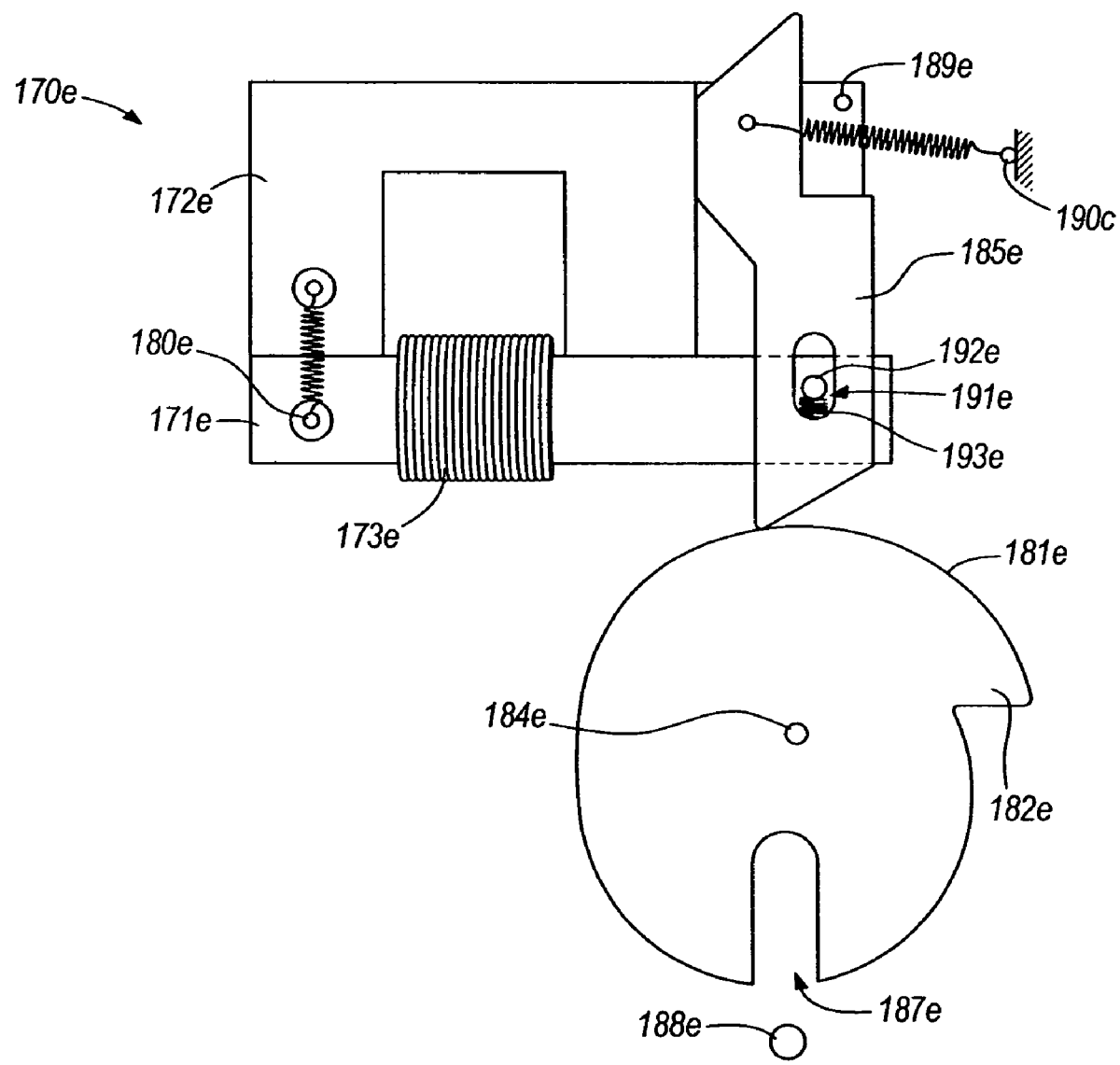
FIG. 35 illustrates the non-integrated pivoting residual magnetic axial latch of the FIG. 33 in an engaged state.

In some embodiments, a biasing member 190e can force the linkage mechanism 185e to slide or move back to a reset position as shown in FIG. 35. The basing member 190e can include one or more compression springs, tension springs, elastomeric members, wedges, and/or foams. FIG. 35 illustrates the residual magnetic axial latch 170e in a reset position. By resetting the residual magnetic axial latch 170e, the rotor latch 181e can accept the striker bar 188e again and can rotate back to a closed position. The latch protrusion 182e can stop rotation of the rotor latch 181e at a closed position against the linkage mechanism 185e.

As described and illustrated with respect to FIGS. 24-35, residual magnetic axial latches can indirectly provide a latching force through a linkage mechanism or system. In some embodiments, residual magnetic axial latches can use residual magnetic forces to engage an armature and a core housing that are non-integrated parts of a latching mechanism, such as a rotor latch. Residual magnetic axial latches can also directly provide a latching force by integrating the residual magnetic components with the latching mechanism. In some embodiments, an integrated residual magnetic axial latch can include a core housing that is coupled to a stationary element and an armature that is coupled to a moveable element. A residual magnetic latching mechanism, such as a rotor latch, can also be integrated with a core housing or an armature to provide an integrated residual magnetic axial latch.

A residual magnetic axial latch can include an armature that moves axially away from a core housing, that pivots away from a core housing, and/or that slides linearly past a core housing.

The residual magnetic devices described above can also provide an infinitely-variable door check system in which a vehicle door can be locked and held at infinite positions while being opened or closed. The core housing and the armature can remain in a generally close relationship while the vehicle door is opening or closing. In some embodiments, a controller can monitor the movement of the vehicle door. When the vehicle door is held generally stationary for a predetermined amount of time or when no force is being applied to the vehicle door, the controller can generate a magnetization pulse in order to create a residual magnetic force between the core housing and armature that locks the door in its current position. The controller can also sense a force or torque applied to the vehicle door. Upon sensing a force or torque, which can indicate that a user wants to open, close, or change the position of the vehicle door, the controller can generate a demagnetization current to reduce or substantially eliminate the residual magnetic force and unlock the position of the vehicle door.

The functionality of the infinitely-variable door check system can also be applied to vehicle seat movement along a seat track. A core housing can be coupled to the seat track and an armature can be coupled to the vehicle seat that moves along the seat track. When a residual magnetic force is present between the core housing and the armature, the vehicle seat can be locked in a position along the seat track. In some embodiments, a controller can sense the lifting of a lever or the pressing of a button by a user and can generate a demagnetization current to reduce or substantially eliminate the residual magnetic force. The demagnetization current can unlock the vehicle seat to allow a user to move the vehicle seat along the seat track. With the seat unlocked, the user can select a position for the vehicle seat. The user can also release a lever, press a button, or hold the vehicle seat in the desired position for a predetermined amount of time causing the controller to transmit a magnetization current. The magnetization current can create a residual magnetic force between the core housing and the armature to lock the vehicle seat in its current position. In addition to a linear seat position adjustment system, seat position adjustment systems can also be used to provide angular infinitely-variable seat positioning. Furthermore, the functionality provided with the seat position adjustment system to adjust the linear and angular position of a seat can also be applied to headrest adjustments.

In another embodiment of the invention, the angular ("tilt") position and/or telescoping position of a steering wheel coupled to a vehicle can be adjusted using an angular infinitely-variable adjustment system. By coupling a core housing to the instrument panel or another stationary component and coupling an armature to the steering column assembly or the steering wheel shaft, or vice versa, the angular and/or telescoping positions of the steering wheel can be adjusted and then locked in an infinite number of positions in order to provide a more customized position for a user.

Residual magnetic braking systems according to several embodiments of the invention can be used to draw toward and/or hold stationary a moving component with respect to a stationary component. Residual magnetic clutch systems can also be designed according to several embodiments of the invention. A clutching device can be considered a special type of brake. A braking device can include a grounded component and a moveable component. When the braking device is activated, the grounded component interacts with the movable component and causes the moveable component to become grounded. Similarly, a clutching device can include a movable component and a stationary component. The stationary component is stationary in the sense that it does not naturally or independently move as the movable component. In comparison to a braking device, the stationary component of a clutching device is not grounded. When the clutch is activated, the movable component interacts with the stationary component and causes the stationary component to move as the moveable element.

Figure 36:
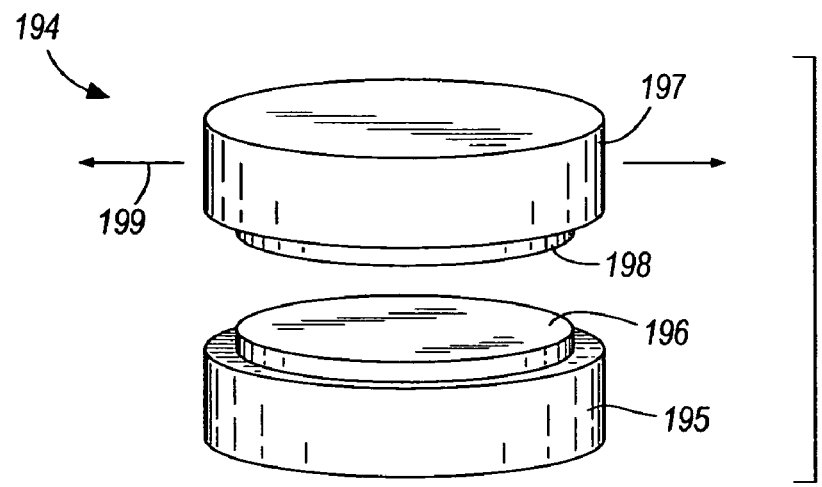
FIG. 36 schematically illustrates a clutch system with a residual magnetic device in a disengaged state according to one embodiment of the invention.

FIG. 36 illustrates a residual magnetic clutch system 194 according to some embodiments of the invention. The clutch system 194 can include a first element 195, a core housing 196, a second element 197, and an armature 198. In some embodiments, the constructions, properties, and operations of the armature 198, the core housing 196, and/or the coil (not shown) are similar to the armature 18, the core housing 20, and the coil 22 described with respect to the steering column lock 12. The clutch system 194 can also include a controller (not shown) as described with respect to the steering column lock 12.

The core housing 196 can be coupled to the first element 195 such that the first element 195 moves with the core housing 196. The armature 198 can be coupled to the second element 197 such that the second element 197 moves with the armature 198. The second element 197 can also be positioned adjacent, or in relatively close proximity to the first element 195. In some embodiments, the second element 197 can move linearly along reference line 199. The second element 197 can move linearly, rotationally, angularly, axially, and/or any combination thereof.

As shown in FIG. 36, without a residual magnetic force between the core housing 196 and the armature 198, the second element 197 moves freely and the first element 195 is stationary. The first element 195 can be moving independently of the second element 197 rather than being generally stationary. As shown in FIG. 37, when a residual magnetic force is generated between the core housing 196 and the armature 198 by supplying a magnetization current to the coil (not shown), the armature 198 can be drawn toward the core housing 196 and the first element 195 can be brought into contact with the second element 197 such that the first element 195 moves with the second element 197. FIGS. 36A and 37A illustrate one embodiment of a freewheeling steering column lock that operates according to the general principles shown and described with respect to FIGS. 36 and 37. In one embodiment, the armature 198a can be coupled to the steering column shaft 197a, and the core housing 196a can be coupled to the steering column 195a and/or the vehicle. In another embodiment, the armature 198a can be coupled to the steering column 195a and/or the vehicle and the core housing 196a can be coupled to the steering column shaft 197a. When a residual magnetic force is present between the armature 198a and the core housing 196a, the steering column shaft 197a rotates with the steering wheel (i.e., the steering column is unlocked). When a residual magnetic force is not present between the armature 198a and the core housing 196a, the steering column shaft 197a and the steering wheel freewheels with respect to the steering column 195a and/or the vehicle (i.e., the steering column is locked). The freewheeling steering column lock can also include pins or other types of alignment components between the armature 198a and the core housing 196a in order to properly align the steering wheel with the steering column.

In some embodiments, the second element 197 can be coupled to a motor and the first element 195 can include a power take off accessory. By generating a residual magnetic force between the core housing 196 and the armature 198, the power take off accessory can be coupled to the motor such that the power take off accessory rotates with an output shaft of the motor. In some embodiments, the first element 195 can include a power take off accessory that can be coupled to an air conditioning system. The air conditioning system (e.g., a compressor and/or a condenser) can operate when the power take off accessory is coupled by the clutch system 194 to the output shaft of the motor. When the residual magnetic force is not present, the power take off accessory is no longer coupled to the output shaft of the motor and the air conditioning system no longer operates.

In other embodiments, the clutch system 194 can include one or more components of door or compartment latches. The first element 195 can include a door handle and the second element 197 can include a door latch. When a residual magnetic force is not present between the core housing 196 and the armature 198, the door handle and the door latch are not coupled. Movement applied to the door handle is not transferred to the door latch and the door cannot be opened. In some embodiments, the door handle and the door latch can be uncoupled when a door is locked. When a residual magnetic force is present between the armature 198 and the core housing 196, the door handle can be coupled to the door latch. Movement of the door handle can then be transferred to the door latch.

The clutch system 194 can include one or more components of steering column locking system or device. The first element 195 can include a steering wheel and the second element 197 can include a steering shaft. When a residual magnetic force is not present between the core housing 196 and the armature 198, the steering wheel and the steering shaft are not coupled. In other embodiments, the steering column shaft can be locked to the steering column housing with a residual magnetic force and can be spring-released to clutch the steering wheel in the correct orientation. Movement applied to the steering wheel is not transferred to the steering shaft. In some embodiments, the steering wheel and the steering shaft can be uncoupled when a steering column is locked. When a residual magnetic force is present between the armature 198 and the core housing 196, the steering wheel can be coupled to the steering wheel. Movement of the steering wheel can then be transferred to the steering shaft.

The roles of the first element 195 and second element 197 can be switched. Without a residual magnetic force, the first element 195 can move while the second element 197 is stationary.

Residual magnetic actuators or, in particular, variable reluctance rotary torque actuators with residual magnetic latches, can be designed according to several embodiments of the invention. A rotary torque actuator can use a residual magnetic force to cause a first element to move with respect to a second object. In some embodiments, the rotary torque actuator can have a solenoid-type shape and the first element (i.e., the moveable object) can have a solenoid-type core that moves within the solenoid-shaped actuator. Variable reluctance rotary torque actuators with residual magnetic latches can be used for a power latch release for vehicular keyless and passive entry systems including door latches, rear compartment or trunk latches, and hood latches. Rotary torque actuators with residual magnetic latches can be used in shock absorbers and other suspension tuning components. Rotary torque actuators with residual magnetic latches can be used in a cinching door latch. A cinching door latch can include a biasing element, such as a spring, that is compressed when a door is opened. A rotary torque actuator with a residual magnetic latch can release the spring to close the door. Rotary torque actuators with residual magnetic latches can be used in steering column locking systems and devices. In some embodiments, a steering column locking system can include a cam or lock bolt that can be moved by a rotary torque actuator with residual magnetic latch into a steering shaft so that a steering wheel cannot be rotated. Rotary torque actuators with residual magnetic latches can be included in pilot control devices and can generate a majority of their load or force from a primary load-bearing device, such as wrap spring clutches, dog clutches, and multi-plate friction clutches or ball and ramp clutches. Components of the rotary torque actuator with the residual magnetic latch can be positioned between a load and a primary load-bearing device to transfer the load of the primary load-bearing device.

Figure 38:
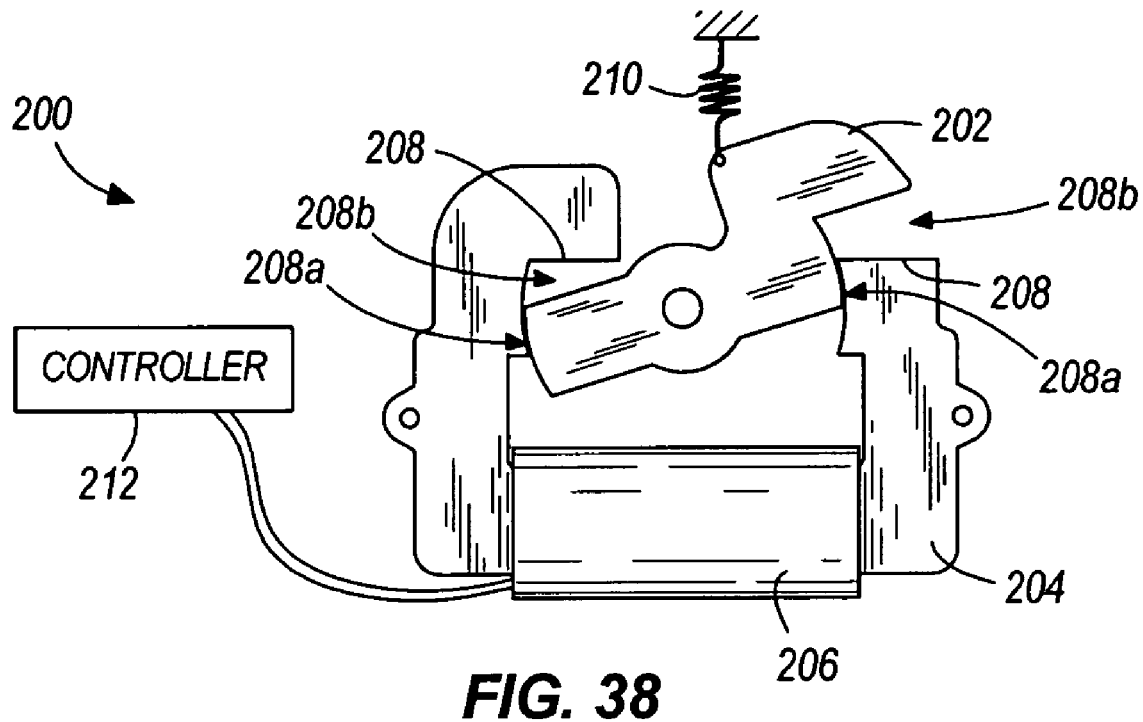
FIG. 38 illustrates a variable reluctance rotary torque actuator with a residual magnetic latch according to one embodiment of the invention.

FIG. 38 illustrates a variable reluctance rotary torque actuator with a residual magnetic latch 200. In some embodiments, the rotary torque actuator with the residual magnetic latch 200 can be used in a door latch systems and/or latch release systems. The rotary torque actuator with residual magnetic latch 200 can include an armature 202, a core housing 204, a coil 206, two core stops 208, a biasing member 210 (e.g., one or more compression springs, tension springs, elastomeric members, wedges, and/or foams), and a controller 212. In some embodiments, the constructions, properties, and operations of the armature 202, the core housing 204, the coil 206, and/or the controller 212 are similar to the armature 18, the core housing 20, the coil 22, and the controller 24 described with respect to the steering column lock 12. In some embodiments, the coil 206 and the core housing 204 can be U-shaped as shown and described above with respect to FIGS. 18-21 illustrating embodiments of residual magnetic axial latches.

Figure 40:
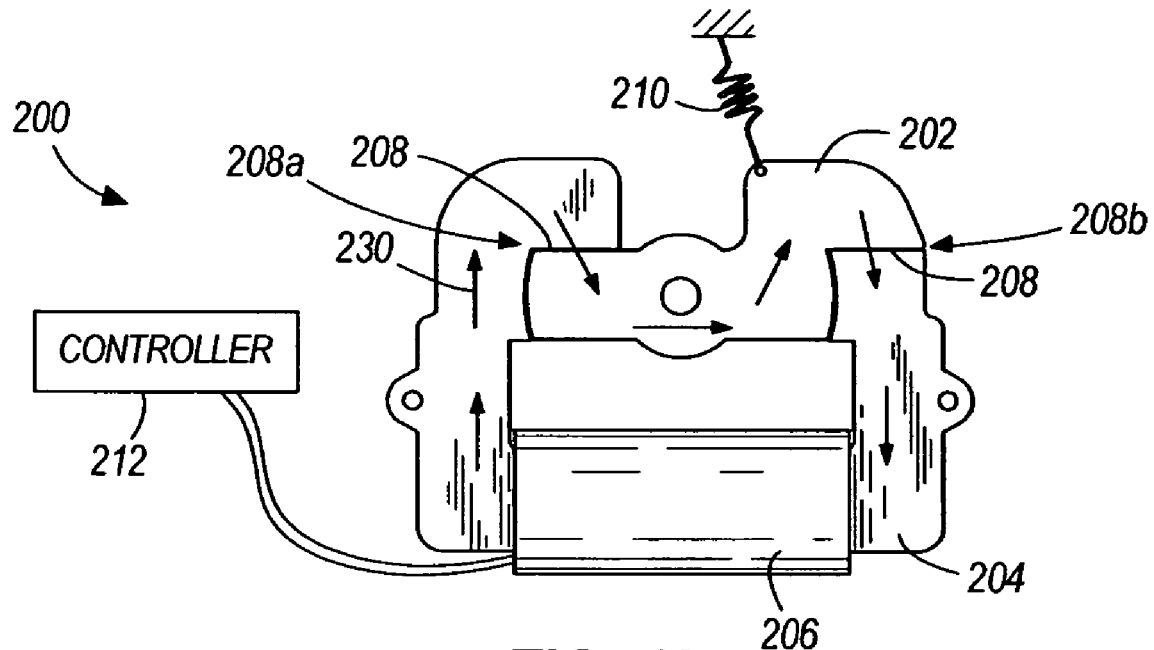
FIG. 40 illustrates the rotary torque actuator of FIG. 38 in an engaged state.

As shown in FIG. 38, when a residual magnetic force is not present, the armature 202 is not engaged with the core housing 204 and the armature 202 does not contact the core stops 208. The biasing member 210 can provide a biasing force that prevents the armature 202 from engaging with the core housing 204 when a residual magnetic force is not present. The rotary torque actuator with residual magnetic latch 200 can substantially integrate two magnetic circuits: a rotary torque actuator circuit and a residual latching circuit. In some embodiments, the two magnetic circuits can use the coil 206 to drive the armature 202 from an open position, as shown in FIG. 38, to a closed residually-latched position, as shown in FIG. 40. The magnetic circuits can use different magnetic air gaps during operation of the rotary torque actuator. For example, the rotary torque actuator magnetic circuit can use a magnetic air gap 208a, and the residual magnetic latch circuit can use a magnetic air gap 208b. The magnetic air gap 208b can be formed when the armature 202 is in the closed position, as shown in FIG. 40. In some embodiments, the magnetic air gap 208a remains constant through the rotational travel of the armature 202, and the magnetic air gap 208b varies from being the largest in size at an open position of the actuator 202 to being the smallest in size at a closed position of the armature 202 when the armature 202 is making contact with the core stops 208. The magnetic air 208a can be approximately 0.002 inches, and the magnetic air gap 208b can be approximately 0.005 inches.

The size of the air gaps 208a and 208b can direct the magnetic flux during operation of the rotary torque actuator. For example, during the rotary actuation operation of the rotary torque actuator, the air gap 208a is the smallest and the least resistant air gap. Therefore, a substantial portion of the circuit's flux capacity flows through the magnetic air gap 208a. Similarly, when the armature 202 is latched, as shown in FIG. 40, the air gap 208b is the smallest air gap. Therefore a substantial portion of the circuit's flux capacity shall flow through the air gap 208b. The armature 202 of the rotary actuator changes the reluctance or permeance of the air gap 208b as it moves, and a mechanical force or torque is generated by the change in reluctance. As the armature 202 approaches the core stops 208, the armature 202 can continue to accelerate as the flux path changes from air gap 208a to air gap 208b, and as the air gap 208b goes small the tractive loads increase the inverse square of the distance.

Figure 39:
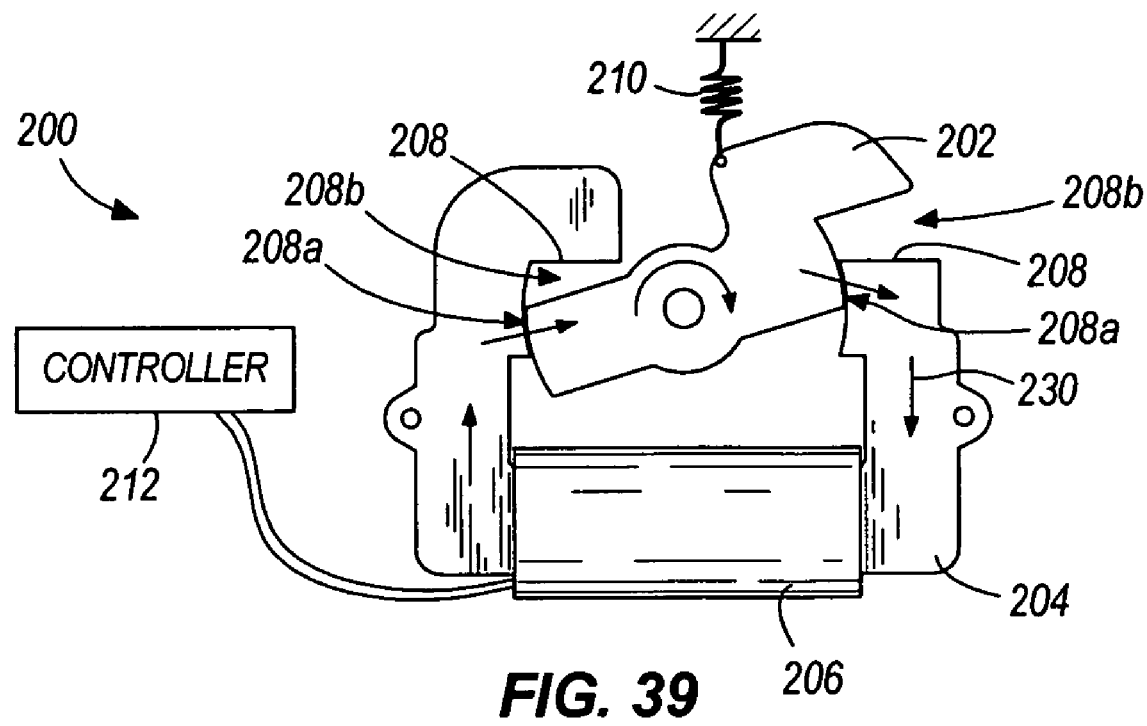
FIG. 39 illustrates the rotary torque actuator of FIG. 38 as the residual magnetic latch is being engaged.

As shown in FIG. 39, when a magnetization current is applied to the coil 206 by the controller 212, the coil 206 creates a magnetic field 230 whose direction and path are indicated by the arrows. It should be understood that the direction of the field is dependent on the direction of the magnetization current applied to the coil 206. The magnetic field 230 can also be generated to flow in the opposite direction as shown in FIG. 39. In some embodiments, the magnetic field 230 follows a path of least resistance (i.e., a path with minimal air gaps). The magnetic field 230 can travel through the material of the core housing 204 and armature 202 with less resistance than it can travel through air. In other words, the magnetic field 230 can switch between two substantially integrated magnetic circuits as the magnetic air gap between the armature 202 and the core housing 204 changes from a large and constant magnetic air gap when the armature 202 is rotating or beginning to rotate (as shown in FIG. 39) to a small magnetic air gap and a substantially closed magnetic path between the armature 202 and the core housing 204 when the armature 202 is no longer rotating (as shown in FIG. 40).

As the magnetic field 230 begins to draw the armature 202 closer to the core stops 208 of the core housing 204, the armature 202 begins to rotate about a pivot and decreases an air gap between the armature 202 and the core stops 208. The armature 202 rotates due to the tangential component of the magnetic field 230 and the reluctance change of the air gap 208a. The movement, speed, and torque of the armature 202 can depend on the magnitude of the magnetization current provided to the coil 206, the permeance of the material used, and the rate at which air gap 208b diminishes prior to making contact with the core stops. When the armature 202 is held stationary by the core stops 208, the residual magnetic force in the armature 202 increases in the form of torque until the material of the armature 202 and core housing 204 magnetically saturates.

The rotation of the armature 202 can be limited by the core stops 208. When the armature 202 is held against the core stops 208, the circuit forms a magnetic closed path conducive to setting an irreversible residual field, and the armature 202 is latched, as shown in FIG. 40. After the armature 202 is latched, the controller 212 can stop applying the magnetization current to the coil 206. The armature 202 remains latched to the core housing 204 at the core stops 208 by the residual magnetic force. The magnetic field 230 can flow through the latch points (i.e., where the armature 202 meets the core stops 208), because the latch points represent the smallest air gap, and thus, offer the least resistance.

Figure 41:
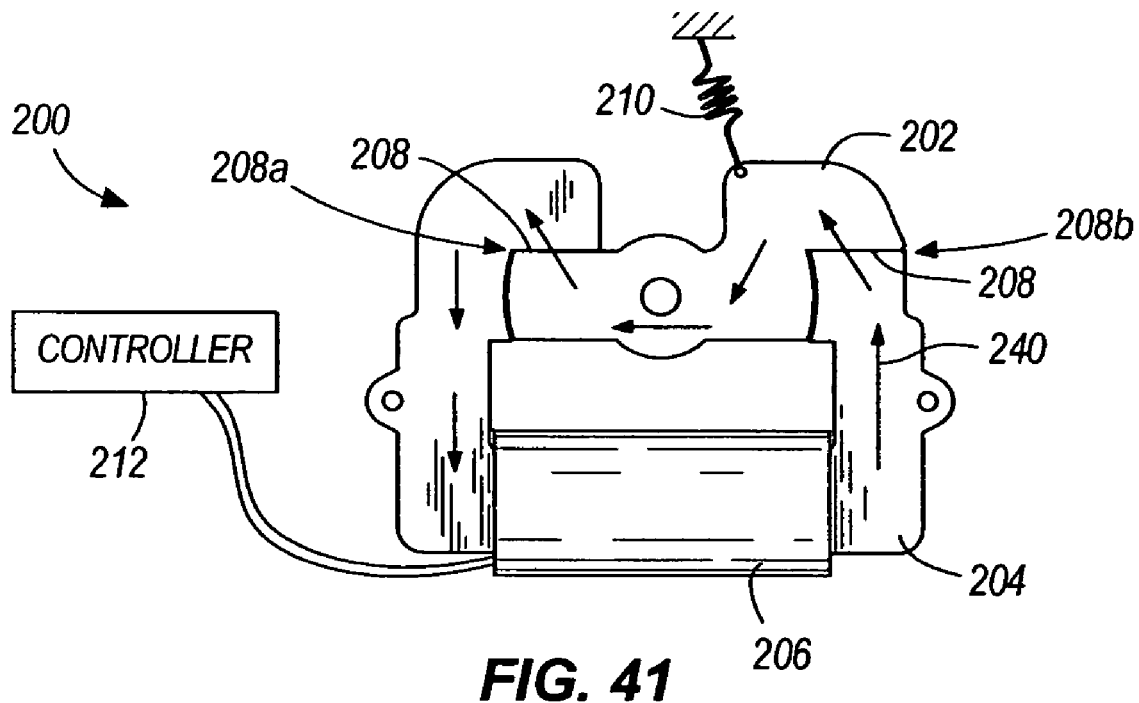
FIG. 41 illustrates the rotary torque actuator of FIG. 40 as the residual magnetic device is being disengaged.

To unlatch the rotary torque actuator and the residual magnetic latch 200, the residual magnetic force can be nullified by reversing the magnetization current supplied to the coil 206 by the controller 212. The demagnetization current reverses the direction of the magnetic field 230 and balances the residual magnetic flux density of the material of the core housing 204 and armature 202. FIG. 41 illustrates the demagnetization current being supplied to the coil 206 and a resulting magnetic field 240. When the residual magnetic flux level is nullified, the armature 202 is again free to rotate back to the open position and disengage from the core housing 204. The biasing member 210 biases the armature 202 to the disengaged position shown in FIG. 38.

In some embodiments, the residual magnetic latching rotary actuator can be used for vehicle or building access. A handle for a door can be coupled to the core housing 204, such that a force applied to the handle can be transferred to the core housing 204. A force transferred to the core housing 204 can be further transferred to the armature 202, when the armature 202 is engaged or latched to the core housing 204.

FIG. 42 illustrates a rotary torque actuator with a residual magnetic latch 300 to which a door handle force is applied, as indicated by arrow 302. FIG. 42 illustrates the residual magnetic latch 300 of the rotary torque actuator in a latched or door-unlocked state where the armature 202 is engaged with the core housing 204. With the armature 202 latched to the core housing 204, the door handle force 302 can cause the core housing 204 and the armature 202 to rotate about a common pivot 303. The rotation of the armature 202 about the pivot 303 can cause the armature 202 to engage a door latch pawl 304 in order to unlock or unlatch the door.

In contrast, FIG. 43 illustrates the rotary torque actuator with the residual magnetic latch 300 in an unlatched or door-locked state where the armature 202 is disengaged from the core housing 204. The door handle force 302 is only transferred to the core housing 204, which rotates on the pivot 303. However, the door handle force 302 is not transferred to the armature 202. Without the rotation of the armature 202, the door latch pawl 304 cannot be engaged to unlock or unlatch the door.

The rotary torque actuator with the residual magnetic latch 300 can be used in passive entry access systems. When the door handle is pulled, an authorization is activated. If entry is authorized, the armature 202 can be latched to the core housing 204 at the core stops 208, and the armature 202 can contact the door pawl latch 304 in order to unlock or open the door.

Rotary torque actuators with residual magnetic latches can be included in latch devices and systems according to several embodiments of the invention. FIG. 44 illustrates a front view of a gear-driven latch system 400. The gear-driven system 400 can include a clutch or pawl 402 and a rotor latch 404. The pawl 402 can rotate about a pivot 406 and the latch 404 can rotate about a pivot 408. In some embodiments, the pawl 402 and the latch 404 can include one or more gear teeth 412 that can interlock to transfer rotation from one gear to the other. The latch 404 can also include an opening 416 that allows a pin or striker bar 418 to move or be released from the latch 404. In some embodiments, the pin or striker bar 418 can be coupled to a door (not shown) or another opening or unlatching mechanism, such as a trunk lid or a hood. Movement of the door handle can attempt to move the pin or striker bar 418 along the phantom path 419 and, consequently, rotate the latch 404. In some embodiments, releasing the pin or striker bar 418 can unlatch a door or another locked or latched device, such as a rear compartment or hood, so that the door, the rear compartment, or the hood can be opened.

Figure 47:
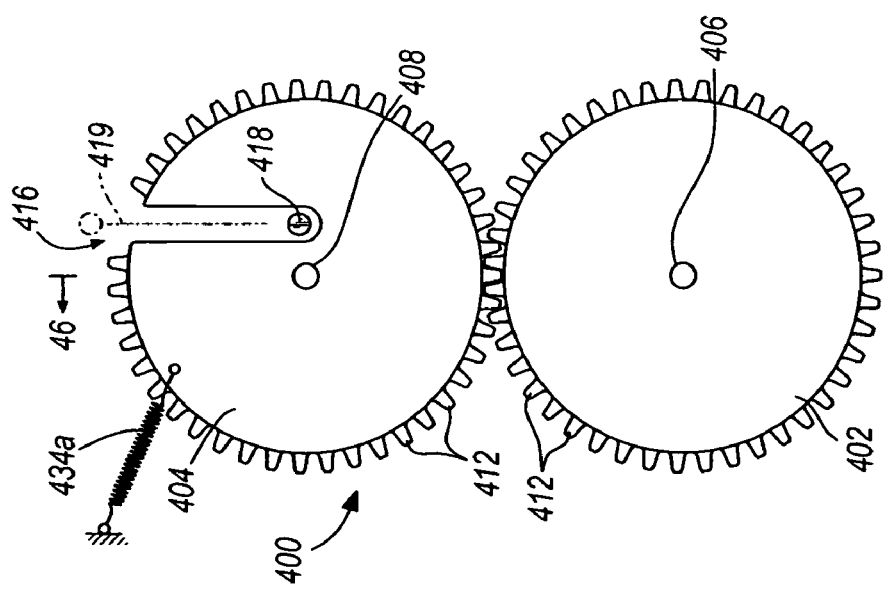
FIG. 47 illustrates a front view of the gear-driven latch system of FIG. 44 with the residual magnetic device in a disengaged state.

When the gear-driven system 400 is in a locked position, as shown in FIG. 44, the pin or striker bar 418 cannot be moved along the phantom path 419 due to the position of the release portion 416. To release the pin or striker bar 418, the latch 404 can be rotated about the pivot 408 until the release portion 416 is aligned with the phantom path 419. As shown in FIG. 47, when the release portion 416 is aligned with the phantom path 419, the pin or striker bar 418 is free to move out of engagement with the latch 404.

Figure 45:
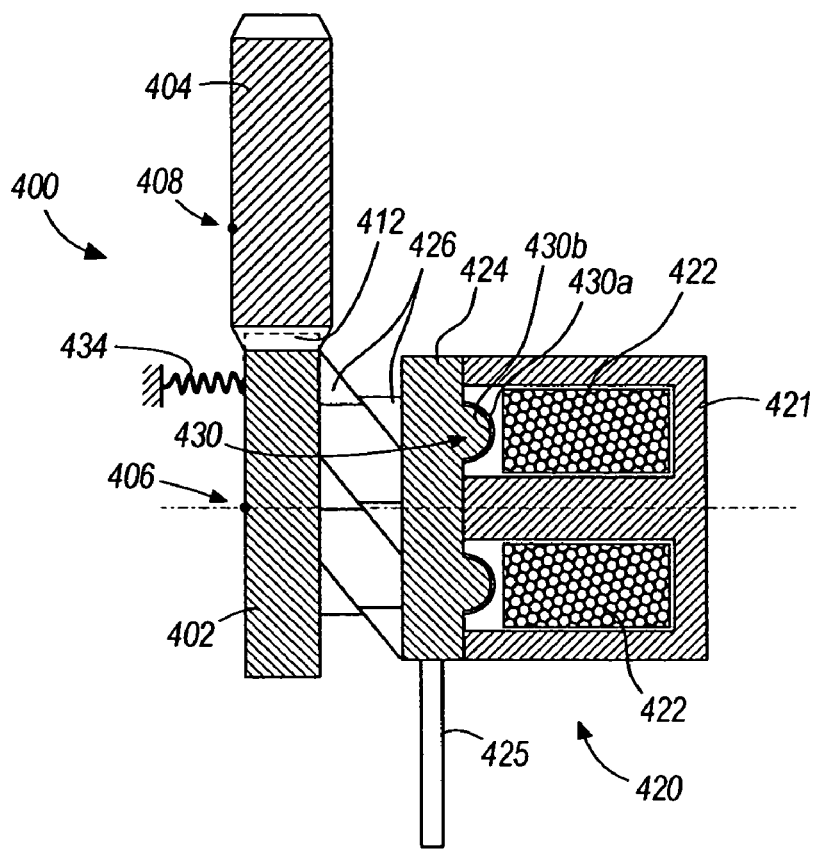
FIG. 45 illustrates a cross-sectional view of the gear-driven latch system of FIG. 44 with the residual magnetic device in an engaged state.

In some embodiments, a residual magnetic rotation blocking device 420, similar to the one described above for the vehicle ignition assembly 80, can regulate the rotation of the pawl 402 and the latch 404. FIG. 45 illustrates a cross-sectional view of the gear-driven system 400 (taken along reference line 45 illustrated in FIG. 44) including the rotation blocking device 420. The rotation blocking device 420 can include a core housing 421, a coil 422, and an armature 424. In some embodiments, the constructions, properties, and operations of the armature 424, the core housing 421, and the coil 422 are similar to the armature 18, the core housing 20, and the coil 22 described with respect to the steering column lock 12. The rotation blocking device 420 can also include a controller as described with respect to the steering column lock 12. The rotation blocking device 420 can also include a lever or actuator 425. The lever 425 can provide a manual release mechanism 47. In other embodiments, the manual release mechanism 47 can include a jack screw (as shown and described with respect to FIG. 5). In still other embodiments, the manual release mechanism 47 can include a cam or a wedge. The cam or wedge can be used with a cable-release configuration.

FIG. 45 illustrates the rotation blocking device 420 in a locked stated. The rotation blocking device 420 is locked by applying a magnetization current to the coil 422 to create a magnetic field that locks the armature 424 to the core housing 421. Once the magnetic force is created and the armature 424 is drawn to the core housing 421, the magnetization current applied to the coil 422 is no longer needed.

In some embodiments, the core housing 421 can be attached to a generally stationary object, such as a vehicle or door frame. When the rotation blocking device 420 is in a locked state, the armature 424 is locked or engaged with the core housing 421, and, thus, cannot move (i.e., rotate) relative to the core housing 421. In some embodiments, the armature 424 and the pawl 402 can include one or more ratchet teeth 426 that can transfer rotation between the pawl 402 and the armature 424 in one direction. When the armature 424 is locked to the core housing 421 and restricted from rotating relative to the core housing 421, the pawl 402 is also restricted from rotating in one direction due to the ratchet teeth 426. Likewise, when the pawl 402 cannot move, the latch 404 also cannot move. Therefore, with the rotation blocking device 420 in a locked position, attempted movement of the pin or striker bar 418 along the phantom path 419 is unsuccessful, because rotation of the latch 404 and the pawl 402 cannot be transferred to the armature 424, which is locked or engaged with the core housing 421.

In some embodiments, the armature 424 and the core housing 421 can also include a detent 430 configuration with one or more female recesses 430a and one or more corresponding male protrusions 430b. The detent configuration 430 can provide an additional locking force. Even if the armature 424 rotationally slips with respect to the core housing 421, an additional axial force is required to overcome the detent configuration 430 and move the male protrusions 430b out of engagement with the female recesses 430a.

Figure 46:
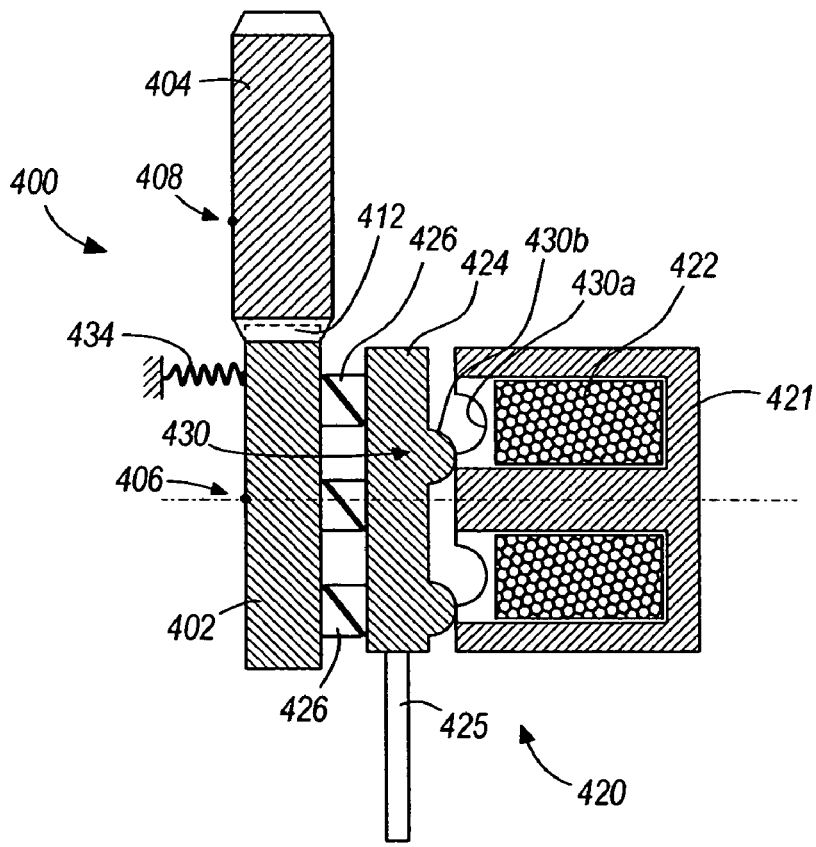
FIG. 46 illustrates a cross-sectional view of the gear-driven latch system of FIG. 44 with the residual magnetic device in a disengaged state.

To unlock the gear-driven system 400, the residual magnetic force holding the armature 424 to the core housing 421 is reversed or nulled by applying a demagnetization current to the coil 422. FIG. 46 illustrates a cross-sectional view of the gear-driven system 400 (taken along reference line 46 illustrated in FIG. 47) including the rotation blocking device 420 in an unlocked state. In an unlocked state, the armature 424 is no longer locked or engaged with the core housing 421 and can rotate relative to the core housing 421. With the armature 424 free to rotate, the pawl 402 and the latch 404 can also rotate. Attempted movement of the pin or striker bar 418 causes the latch 404 to rotate and align the release portion 416 of the latch 404 with the phantom path 419 of the pin or striker bar 418. The pin or striker par 418 can then be released from the latch 404. In some embodiments, after the latch 404 is rotated to reach an open or unlatched position, the residual magnetic field can be regenerated or reset to reengage the armature 424 with the core housing 421. FIG. 47 illustrates a front view of the gear-driven system 400 with the release portion 416 positioned to release the pin or striker bar 418. In some embodiments, releasing the pin 418 unlatches a door.

In some embodiments, after the armature 424 and the core housing 421 are engaged, the rotational blocking device 420 is reset. When the latch 404 is in an open position, the latch 404 can re-receive the pin or striker bar 418. In some embodiments, the force of receiving the pin or striker bar 418 can rotate the latch 404 and the pawl 402 via ratcheting with respect to the armature 424 to a closed or latched position. The ratchet teeth 426 prevent the latch 404 and the pawl 402 from rotating back to an open position while the armature 424 is engaged with the core housing 421. Generally, while the armature 424 is engaged with the core housing 421, the ratchet teeth 426 can allow rotation of the latch 404 and the pawl 402 from an open position to the closed position and can prevent rotation of the latch 404 and the pawl 402 from the closed position to the open position.

In some embodiments, the pawl 402 can be coupled to a biasing member 434. The biasing member 434 can include one or more compression springs, tension springs, elastomeric members, wedges, and/or foams. The biasing member 434 can return the latch 404 to a predetermined position (e.g., the locked position) after the pin or striker bar 418 is released from the latch 404. The force of the biasing member 434 can cause the pawl 402 to rotate and place the latch 404 back in a locked position. In some embodiments, another biasing member 434a can also be used to keep the pawl 402 in contact with the armature 424 such that rotational movement is not lost between the components.

The system 400 shown in FIGS. 44-47 can provide a non-integrated latch system. As described above with respect to residual magnetic axial latches, a latch system can also directly provide a latching force by integrating a latching mechanism with at least one of a core housing and an armature. On the other hand, non-integrated latch systems can include a linkage mechanism or system that transfers a latching or a retaining residual magnetic force between an armature and a core housing to a separate latching mechanism, such as a rotor latch.

Figure 49:
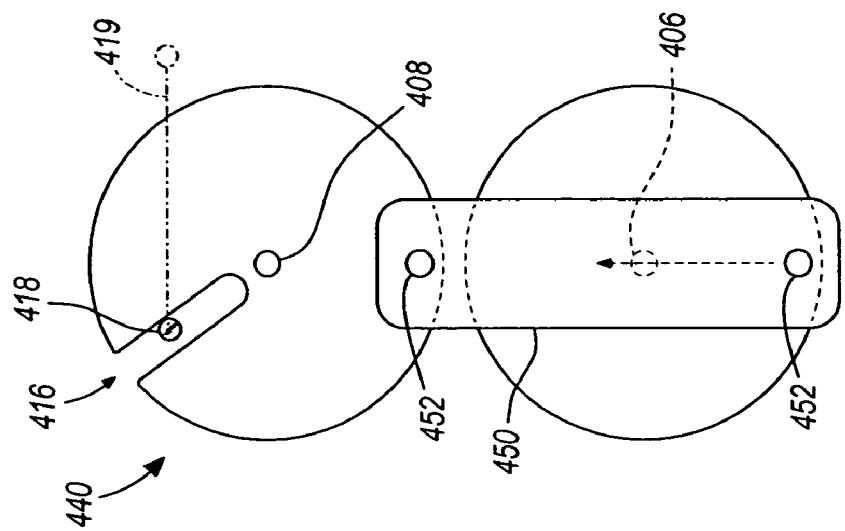
FIG. 49 illustrates the linkage latch system of FIG. 48 with the residual magnetic device in an engaged state.
Figure 48:
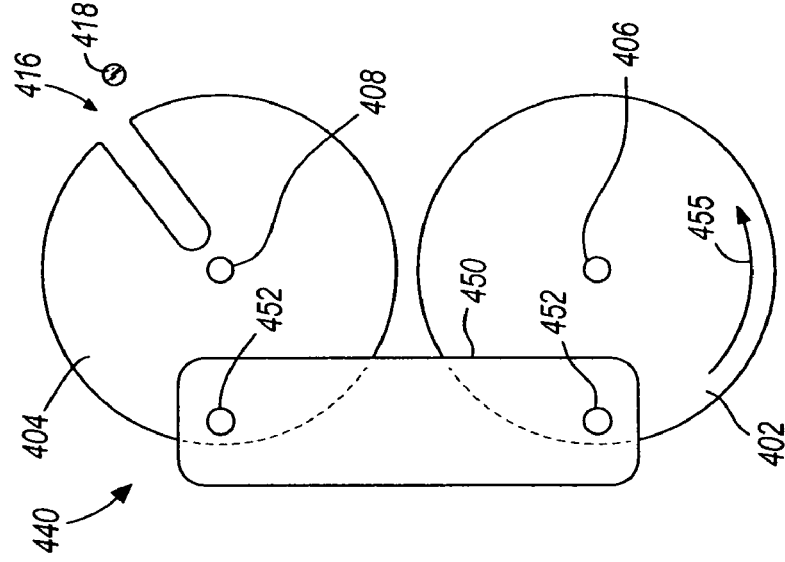
FIG. 48 illustrates a front view of a linkage latch system with a residual magnetic device in a disengaged state according to one embodiment of the invention.

FIG. 48 illustrates a residual magnetic rotation inhibitor in the form of a linkage system 440 that includes the pawl 402 and the latch 404 interconnected with a linkage bar 450. The linkage bar 450 can be connected to the pawl 402 and the latch 404 with one or more fasteners 452. The fasteners 452 can include screws, bolts, rivets, etc. In one embodiment, the pawl 402 can be integrated with the armature of the residual magnetic device. The pawl 402 can be rotated or driven by a force from a striker bar 418 that rotates the latch 404 and the linkage bar 450. The residual magnetic rotation inhibitor is shown in the demagnetized or disengaged state in FIG. 48. When the door, lid, or movable element is closed, the striker bar 418 can drive the latch 404, the linkage bar 450, and the pawl 402. As the striker bar 418 begins to rotate the latch 404, a switch or sensor can indicate movement of the latch 404 and can signal a controller to apply a magnetization current to the coil in the core housing that shares the same pivot as the armature 402. When the link 450 has driven the pawl 402 to the position shown in FIG. 49, the armature's detents can drop into the recesses on the core housing, and power to the coil will time out or the sensor will determine that the event is finished and turn off power to the coil. FIG. 49 illustrates the armature of the pawl 402 magnetically attached to the core housing in an engaged state. A load line 457 of the link 450 is generally through the pivot 406, which adds greatly to the mechanical advantage of the residual magnetic rotary inhibitor device. The detents on the armature of the pawl 402, the link 450, and the latch 404 can all be loaded by a door seal load and a return spring. When the core housing and the armature are demagnetized, the striker bar 418 can be released. It should be understood that the linkage bar 450 can also be connected to the pawl 402 and the latch 404 in a near-over-center condition in order to increase the disengaged and engaged force of the latch 404.

Figure 50:
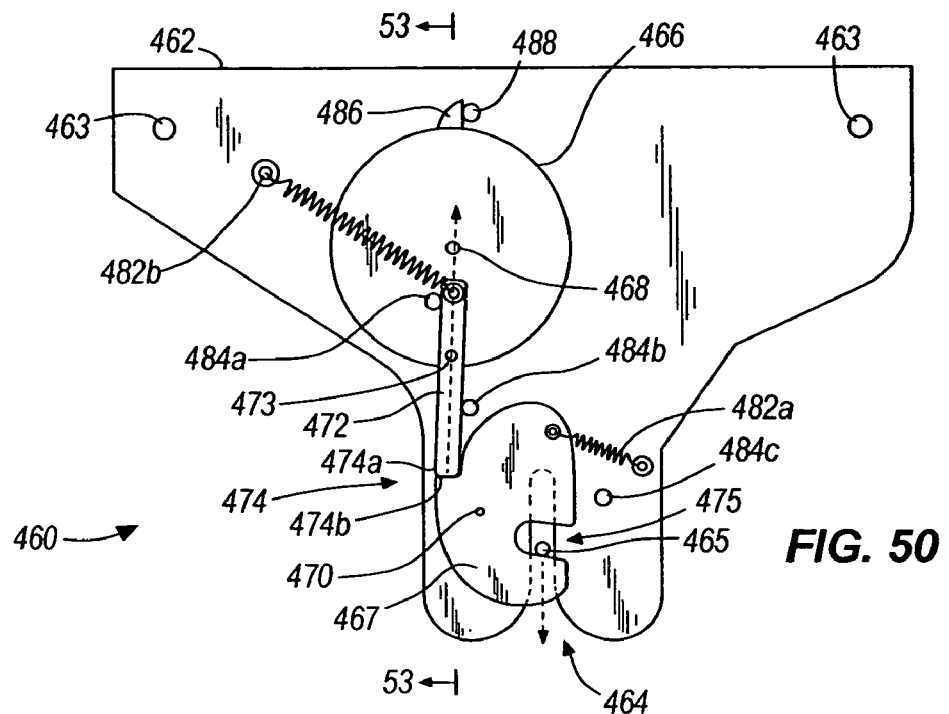
FIG. 50 illustrates a front view of a linkage latch system with a residual magnetic device in an engaged state according to one embodiment of the invention.

FIG. 50 illustrates a front view of a latch system 460 according to another embodiment of the invention. In some embodiments, the latch system 460 can be used to lock or latch a compartment, such as a trunk of a vehicle. The latch system 460 can include a mounting plate 462. The mounting plate 462 can be attached or mounted to a compartment frame or a vehicle frame with one or more fasteners 463. The fasteners 463 can include screws, bolts, rivets, etc. The mounting plate 462 can also include an opening 464 that accepts a pin or striker bar 465. In some embodiments, releasing the pin or striker bar 465 from the opening 464 can unlatch or open a compartment.

The latch system 460 can include an armature 466 and a rotor latch 467. The armature 466 can rotate about a pivot 468 and the rotor latch 467 can rotate about a pivot 470. In some embodiments, the armature 466 can be coupled to the rotor latch 467 by a pawl or ratchet clutch 472. The pawl 472 can be coupled to the armature 466 by a fastener 473, which can include a bolt, a screw, a rivet, etc. In some embodiments, the pawl 472 can also be coupled to the rotor latch 467 by a fastener (not shown). The pawl 472 can also interact with the rotor latch 467 using a ratchet configuration 474. As shown in FIG. 50, the pawl 472 can include a protrusion 474a and can rotate the rotor latch 466 by engaging with a corresponding recess 474b of the rotor latch 467. When the protrusion 474a engages with the recess 474b, the rotation of the rotor latch 467 can be transferred to the pawl 472.

The rotor latch 467 can also include an opening 475 that allows the pin or striker bar 465 to move or be released from the opening 464 of the mounting plate 462. In some embodiments, the mounting plate 462 can be coupled to an opening or unlatching mechanism, such as a trunk lid. When the trunk lid, is opened or pulled away from the trunk frame, the mounting plate 462 can move with the trunk lid, and the pin or striker bar 465 can be released from the opening 464 of the mounting plate 462.

Figure 51:
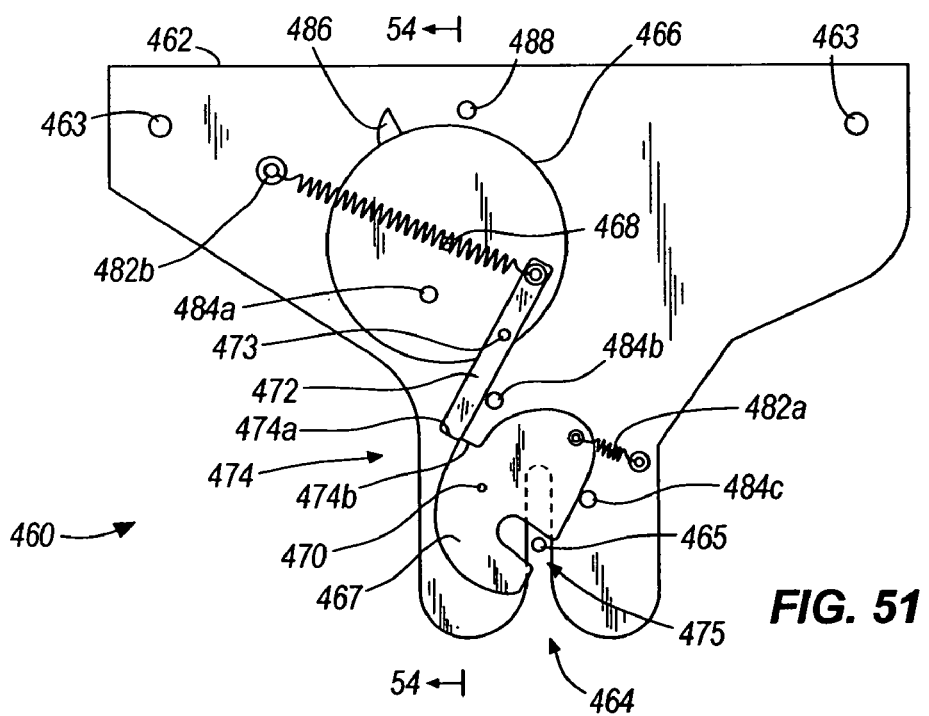
FIG. 51 illustrates a front view of the linkage latch system of FIG. 50 with the residual magnetic device in a disengaged state.

When the latch system 460 is in a locked or latched position, as shown in FIG. 50, the pin or striker bar 465 cannot be released from the opening 464 of the mounting plate 462 due to the position of the opening 475 of the rotor latch 467. To release the pin or striker bar 465, the rotor latch 467 can be rotated about the pivot 470 until the opening 475 is aligned with the opening 464 of the mounting plate 462. When the door is closed and the residual magnetic force is released, the rotor latch 467 can transfer rotation from the pawl 472 to the armature 466. As shown in FIG. 51, when the opening 475 of the rotor latch 467 is aligned with the opening 464 of the mounting plate 462, the pin or striker bar 465 is released from the mounting plate 462. As in the linkage system 440 shown in FIGS. 48-49, the rotational inhibitor of the latch system 460 can be the ground and the reaction point for latch-driven loads (i.e., seal loads, return spring loads, etc.). When the door, lid, or other moveable element is locked, the load can generally pass through the pawl 472 close to the center of the armature 466. Also, the line of force when the device is loaded by latch seal forces can generally pass through the residual magnetic armature pivot 468, thereby increasing the mechanical advantage of the residual magnetic rotational inhibitor allowing the latch system 460 to handle large latch loads without unintentional release.

Figure 53:
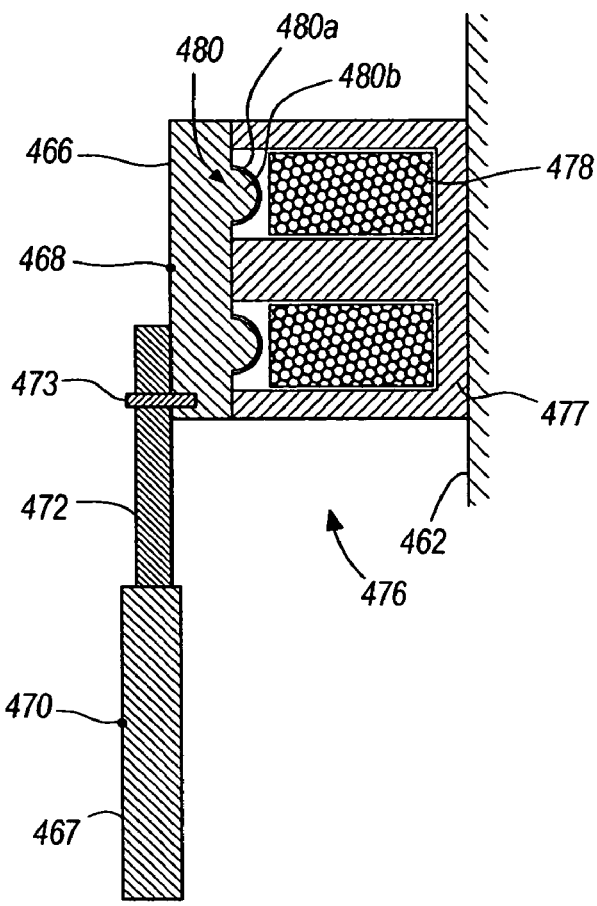
FIG. 53 illustrates a cross-sectional view of the linkage latch system of FIG. 50 with the residual magnetic device in an engaged state.

In some embodiments, the latch system 460 can include a residual magnetic rotation blocking device 476, similar to the one illustrated and described with respect to the gear-driven system 400 and the linkage system 440. FIG. 53 illustrates a cross-sectional view of a portion of the latch system 460 (taken along reference line 53 illustrated in FIG. 50) including the rotation blocking device 476. The rotation blocking device 476 can include a core housing 477, a coil 478, and an armature 466. In some embodiments, the constructions, properties, and operations of the armature 466, the core housing 477, and the coil 478 are similar to the armature 18, the core housing 20, and the coil 22 described with respect to the steering column lock 12. The rotation blocking device 476 can also include a controller as described with respect to the steering column lock 12.

FIG. 53 illustrates the rotation blocking device 476 in a locked stated. The rotation blocking device 476 is locked by applying a magnetization current to the coil 478 to create a magnetic field that locks the armature 466 to the core housing 477. Once the magnetic force is created and the armature 466 is drawn to the core housing 477, the magnetization current applied to the coil 478 is no longer needed.

In some embodiments, the core housing 477 can be attached to the mounting plate 462. When the rotation blocking device 476 is in a locked state, the armature 466 is engaged with the core housing 477, and, thus, cannot rotate relative to the core housing 477. When the armature 466 is engaged with the core housing 477, the pawl 472 coupled to the armature 466 is restricted from rotating. Likewise, when the pawl 472 cannot move, the rotor latch 467 also cannot move. With the rotation blocking device 476 in a locked position, attempted movement of a trunk or compartment lid, to which the mounting plate 462 is attached, is unsuccessful, because rotation of the rotor latch 467 and the pawl 472 cannot be transferred to the armature 466.

In some embodiments, the armature 466 and the core housing 477 can include a detent 480 configuration with one or more female recesses 480*a* and one or more corresponding male protrusions 480*b*. The detent configuration 480 can provide an additional locking force. Even if the armature 466 rotationally slips with respect to the core housing 477, an additional axial force is required to overcome the detent configuration 480 and move the male protrusions 480*b* out of engagement with the female recesses 480*a*.

Figure 54:
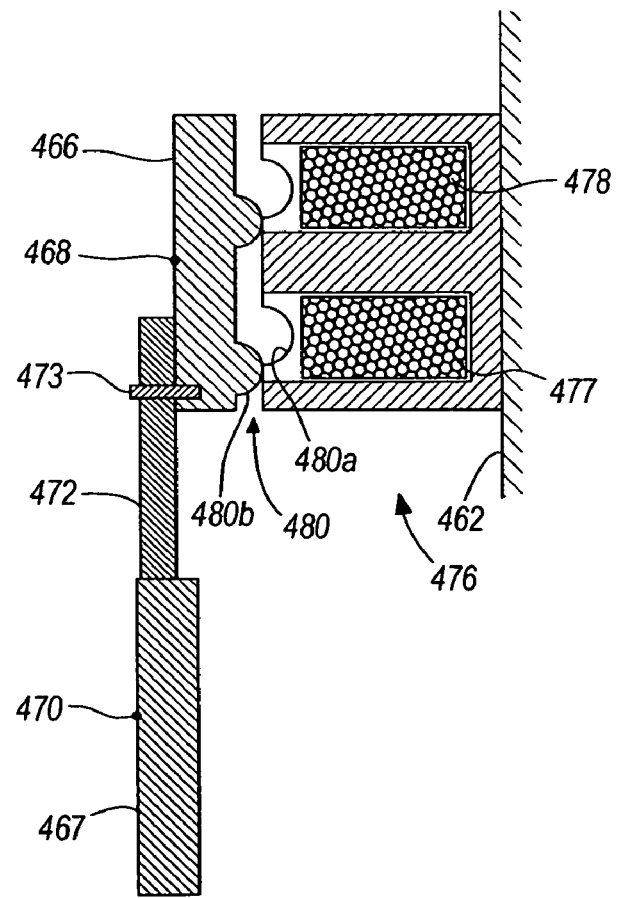
FIG. 54 illustrates a cross-sectional view of the linkage latch system of FIG. 50 with the residual magnetic device in a disengaged state.

To unlock the latch system 460, the residual magnetic force holding the armature 466 to the core housing 477 is reversed or nulled by applying a demagnetization current to the coil 478. FIG. 54 illustrates a cross-sectional view of a portion of the latch system 460 (taken along reference line 54 illustrated in FIG. 51) including the rotation blocking device 476 in an unlocked state. In an unlocked state, the armature 466 is no longer engaged with the core housing 477 and can rotate relative to the core housing 477. With the armature 466 free to rotate, the pawl 472 and the rotor latch 467 can also rotate. Attempted movement of the mounting plate 462 can apply pressure or force (generated by the contact of the pin or striker pin 465 with the opening 475 of the rotor latch 467) to the rotor latch 467 causing the rotor latch 467 to rotate. Rotating the rotor latch 467 can align the opening 475 of the rotor latch 467 with the opening 464 of the mounting plate 462. The pin or striker bar 465 can then be released from the opening 464 and the trunk or compartment lid can be opened. FIG. 51 illustrates a front view of the latch system 460 with the opening 475 of the rotor latch 467 positioned to release the pin or striker bar 465.

Figure 52:
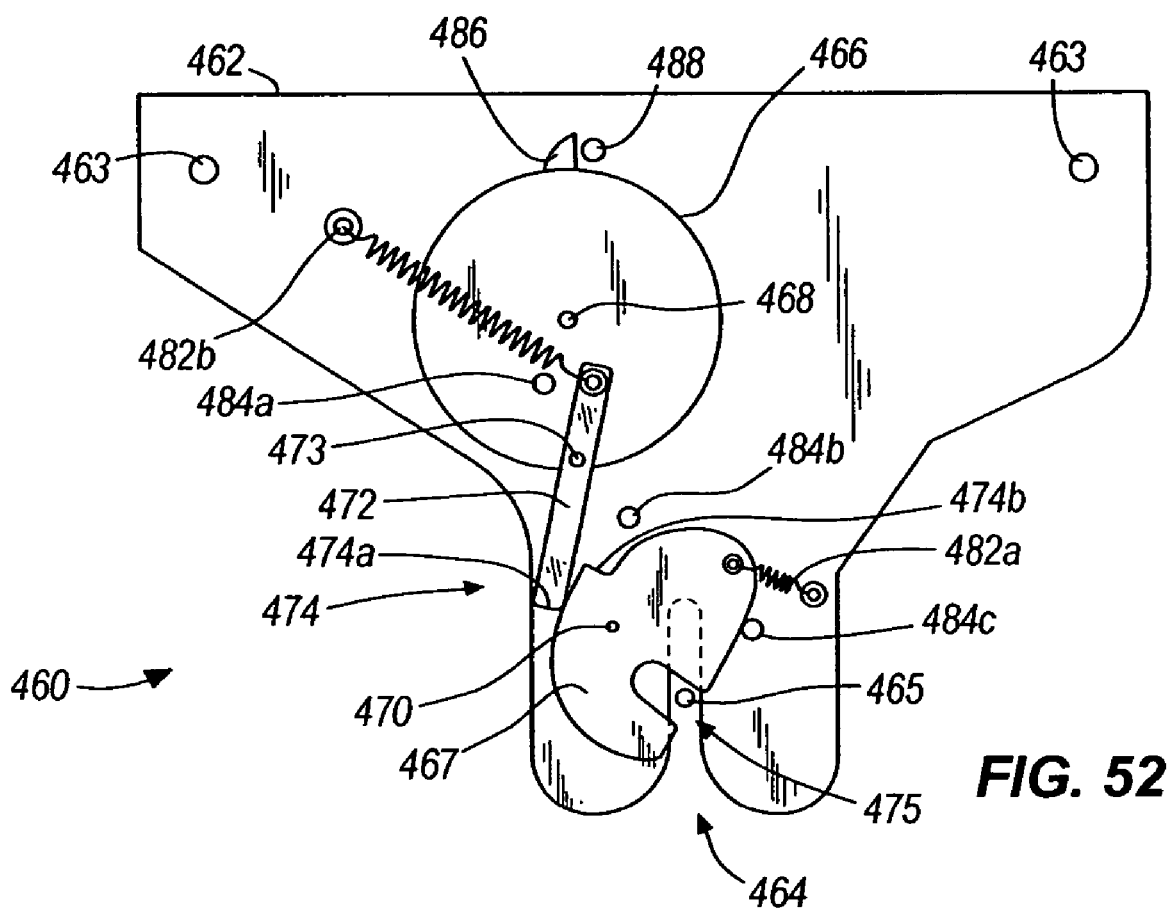
FIG. 52 illustrates a front view of the linkage latch system of FIG. 50 with the residual magnetic device is a reset engaged state.

In some embodiments, the residual magnetic latch system 460 can be immediately reset (i.e., the residual magnetic rotation blocking device 476 can be returned to a locked state) after the rotor latch 467 reaches the open or unlatched position. FIG. 52 illustrates the latch system 460 in a reset state. In some embodiments, when the residual magnetic force is substantially nulled and the rotor latch 467 is opened, a biasing member 482*a* coupled to the rotor latch 467 forces the rotor latch 467 to rotate. As shown in FIGS. 51 and 52, the rotation of the rotor latch 467 caused by the biasing member 482*a* and/or the force of the striker bar 465 can force the protrusion 474*a* of the pawl 472 to disengage with the rotor latch 467. The biasing member 482*a* can include one or more compression springs, tension springs, elastomeric members, wedges, and/or foams. Pin or pawl guide 484*b* causes the pawl 472 to rotate as the pawl 472 is moved by the rotor latch 467. Protrusion 474*a* is disengaged from recess 474*b*.

As shown in FIGS. 50-52, the pawl 472 can be coupled to a biasing member 482*b*. The biasing member 482*b* can include one or more compression springs, tension springs, elastomeric members, wedges, and/or foams. The biasing member 482*b* can return the pawl 472 to a predetermined position (e.g., a reset position) after the protrusion 474*a* is released from the recess 474*b*. In some embodiments, the force of the biasing member 482*a* on the rotor latch 467 is greater than the force of the biasing member 482*b* on the pawl 472, such that protrusion 474*a* of the pawl 472 disengages from the recess 474*b* of the rotor latch 467 and the pawl 472 and the armature 466 return to a reset position. The latch system 460 can include one or more guides 484*a*, 484*b*, and 484*c*. The pawl guides 484*a* and 484*b* can direct the position of the pawl 472, can restrict movement of the pawl 472, and can guide the pawl 472 into a reset position. Similarly, the rotor guide 484*c* can direct and limit the rotation of the rotor latch 467. The armature 466 can include a stop protrusion 486. The stop protrusion 486 can interact or connect with an armature stop 488. When the armature 466 rotates, the armature stop 488 can connect with the stop protrusion 486 and block further rotation of the armature 466. In some embodiments, when the biasing member 482*a* returns the pawl 472 to a reset position, the armature stop 488 can restrict the armature 466 from rotating past or beyond a locked position.

As shown in FIG. 52, in a reset position, the latch system 460 can be ready to receive the striker bar 465 again. In some embodiments, with the pawl 472 and the armature 466 in a reset position, the rotation blocking device 476 is locked by applying a magnetization current to the coil 478 to create a magnetic field that locks the armature 466 to the core housing 477. Receiving the striker bar 465 can force the rotor latch 467 to rotate and re-engage with the pawl 472, which is held stationary by the residual magnetic force locking the armature 466 to the core housing. Once the rotor latch 467 is re-engaged with the pawl 472, the rotor latch 467 can be prohibited from rotating back to an open position and the latch system 460 can be locked or latched as described and illustrated above with respect to FIG. 50.

Figure 55:
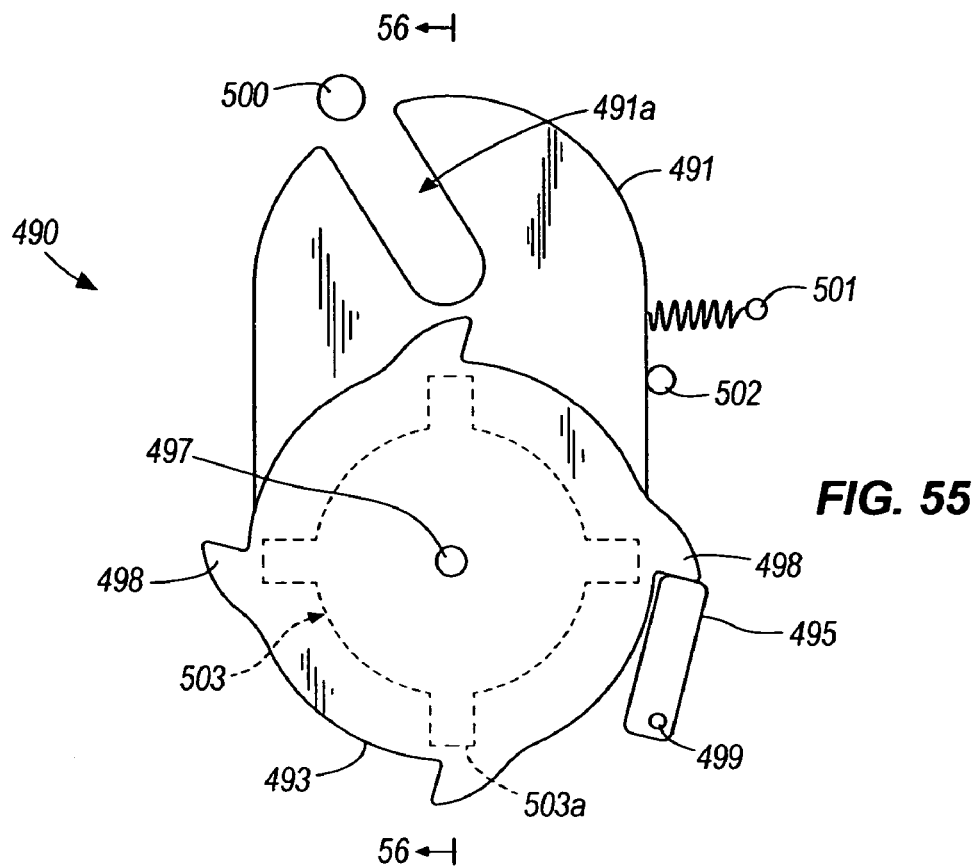
FIG. 55 illustrates a front view of an integrated latch system with a residual magnetic device.
Figure 56:
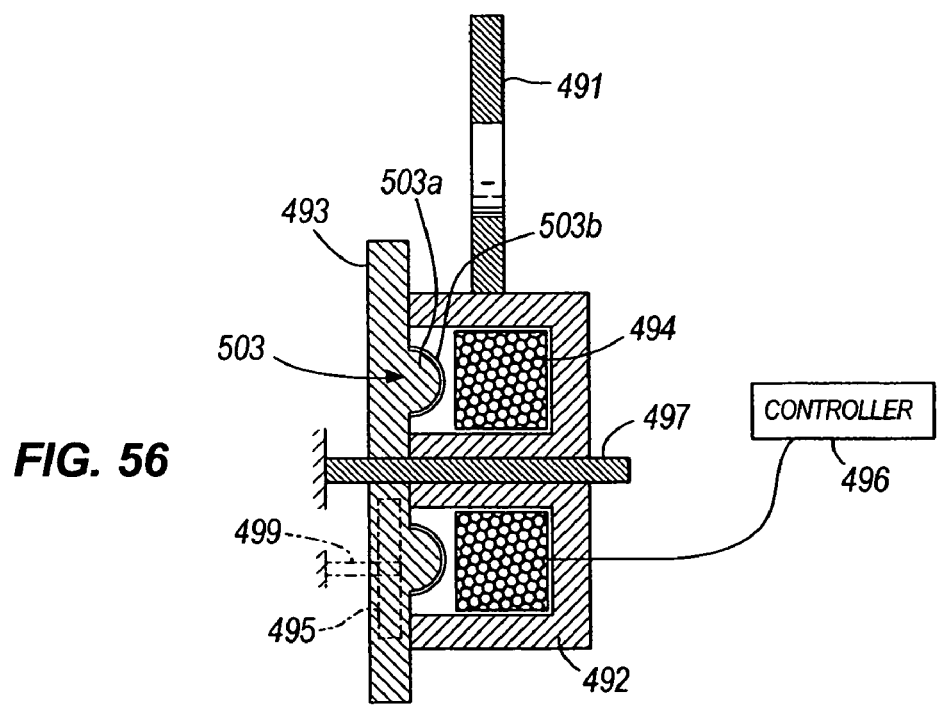
FIG. 56 illustrates a cross-sectional view of the latch system of FIG. 55.

FIGS. 55 and 56 illustrate another residual magnetic latch system 490 according to one embodiment of the invention. FIG. 55 illustrates a front view of the system 490, and FIG. 56 illustrates a cross-sectional view of the system 490 taken across reference line 56 illustrated in FIG. 55. In some embodiments, the latch system 490 is used to lock and unlock a rear door or window hatch of a vehicle. The latch system 490 can also be used in other applications to lock and unlock a moveable element, such as a door, lid, hood, etc.

As shown in FIGS. 55 and 56, the system 490 can include a rotor latch 491, a core housing 492, an armature 493, a coil 494, and a pawl 495. The system 490 can also include a controller 496. In some embodiments, the constructions, properties, and operations of the armature 493, the core housing 492, the coil 494, and the controller 496 are similar to the armature 18, the core housing 20, the coil 22, and the controller 24 described with respect to the steering column lock 12.

As shown in FIG. 56, the rotor latch 491 and core housing 492 can be an integrated component. The integrated rotor latch 491 and core housing 492 and the armature 493 can rotate about a rotor shaft 497. The armature 493 can include one or more pawl stops 498, which can be engaged by the pawl 495. The pawl 495 can also rotate about a pawl shaft 499.

FIGS. 55 and 56 illustrate the latch system 490 in an open position. In an open position, the rotor latch 491 can receive a pin or striker bar 500 into a release portion 491*a* of the rotor latch 491. In some embodiments, the striker bar 500 can be attached to a moveable element, such as a rear hatch of a vehicle, and the latch system 490 can be attached to a stationary element, such as a trunk or vehicle frame. In an open position, the armature 493 can engage with the core housing 492. As described above, the controller 496 can supply a magnetizing current to the coil 494 until the core housing 492 is engaged with the armature 493.

In some embodiments, when the armature 493 is engaged with the core housing 492 and the moveable element (e.g., the hatch) is closed and moved toward the stationary element, the striker bar 500 is received by the release portion 491*a* of the rotor latch 491. The force of the striker bar 500 on the rotor latch 491 can rotate the rotor latch 491 and the armature 493 in a counter clockwise direction (as shown in FIG. 55). The rotor latch 491 and the armature 493 can rotate until the pawl 495 engages one of the pawl protrusions 498 of the armature 493. The force of the pawl 495 against the pawl protrusion 498 can keep the armature 493 and the rotor latch 491 that is integrated with the core housing 492 from rotating clockwise and releasing the striker bar 500. With the rotor latch 491 in a latched position, the striker bar 500 cannot be released from the release portion 491a of the rotor latch 491.

To release the striker bar 500 from the release portion 491a, the controller 496 can demagnetize the armature 493 and the core housing 492. Once the core housing 492 can rotate independently from the armature 493, the rotor latch 491 and core housing 492 can rotate back to the initial open position releasing the striker bar 500. In some embodiments, the system 490 can include a biasing member 501 that can force the rotor 491 back to an open position. The biasing member 501 can include one or more compression springs, tension springs, elastomeric members, wedges, and/or foams. The system 490 can include a rotor guide 502 that can prevent the rotor 491 from rotating past the open position.

Once the rotor 491 rotates back to the open position, the controller 496 can set the residual magnetic load. Once the residual magnetic load is set, the core housing 492 can engage the armature 493 and the rotor 491 can receive the striker bar 500 into the release portion 491a again.

In some embodiments, the system 490 can include a detent configuration 503. The detent configuration 503 can include one or more male protrusions 503a on armature 493 or the rotor latch 491 that are associated with each pawl stop 498. The core housing 492 can include corresponding female recesses 503b that interconnect with the male protrusions 503a. The detent configuration 503 can ensure that when the rotor latch 491 is released and rotated back to an open position, the rotor latch 491 lines up with the armature 493 so that the next pawl stop 498 of the armature 493 will be caught by the next rotation of the armature 493 by a predetermined angle. The number of protrusions 503a positioned on the armature 493 or the rotor latch 491 can be determined by the angular displacement or rotation of the rotor latch 491 from an open position to a latched position. As shown in FIG. 55, the pawl stops 498 can be positioned every 90° on the armature 493, such that the rotor latch 491 rotates 90° to move from an open position to a closed position. If, for example, the rotor displacement or rotation were 60°, the armature 493 could include six pawl stops 498 positioned every 60°.

The pawl 495 included in the system 490 can include other clutch systems. For example, a strut configuration, a sprag configuration, a roller ramp configuration, etc., can be used in addition to or in place of the pawl 495 and pawl stop 498 configuration as illustrated and described above.

Residual pilot control devices can be designed according to several embodiments of the invention. In some embodiments, residual magnetic pilot control devices can generate a majority of their load or force from a primary load-bearing device, such as wrap spring clutches, dog clutches, and multi-plate friction clutches or ball and ramp clutches. Residual magnetic pilot control devices can control the state of the primary load-bearing device (i.e., on, off, or modulate), while not contributing significantly to the overall load-bearing capacity of the system. Residual magnetic pilot control devices can be used in applications that require relatively low weight and relatively small size with high latch and locking loads, such as door check systems, seat and steering wheel adjustment systems, etc. Residual magnetic pilot control devices can also be used to load steering column locks, rear compartment or trunk latches, door latches, and hood latches. Furthermore, residual magnetic pilot control devices can also be used in vehicle brakes, vehicle clutches, or industrial clutches.

Figure 57:
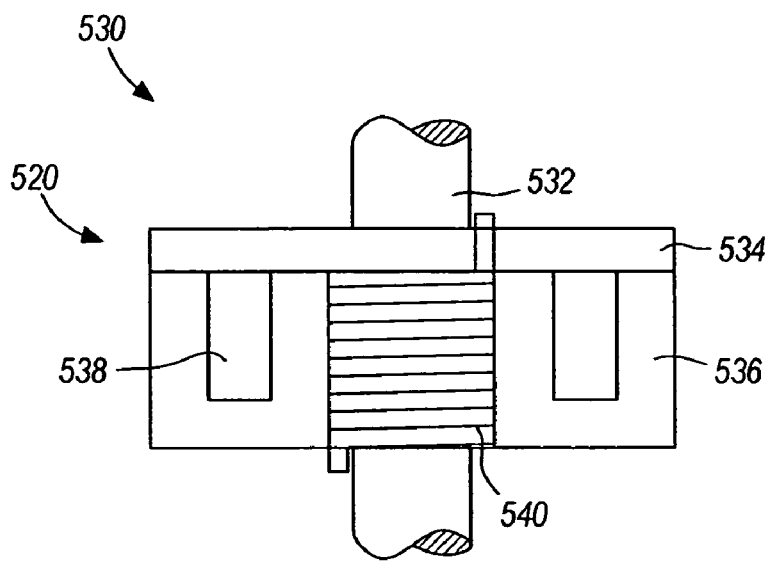
FIG. 57 illustrates a wrap spring device with a residual magnetic device according to one embodiment of the invention.

FIG. 57 illustrates one embodiment of a residual magnetic device as a residual magnetic pilot control device 520 coupled to a wrap spring device 530. The wrap spring device 530 can include a shaft 532, an armature 534, a core housing 536, a coil 538, and one or more wrap springs 540. In some embodiments, the constructions, properties, and operations of the armature 534, the core housing 536, and the coil 538 are similar to the armature 18, the core housing 20, and the coil 22 described with respect to steering column lock 12. The pilot control device 520 can also include a controller similar to the controller 24 described with respect to the steering column lock 12.

The wrap spring 540 can be used to brake or clutch the shaft 532. In some embodiments, the wrap spring device 530 can control the tightness of the multi-turn wrap spring 540 around the shaft 532. The tighter the wrap spring 540 around the shaft 532, the higher the brake/clutch torque capacity. The number of turns of the wrap spring 540 can also influence the torque capacity of the wrap spring device 530.

Figure 58:
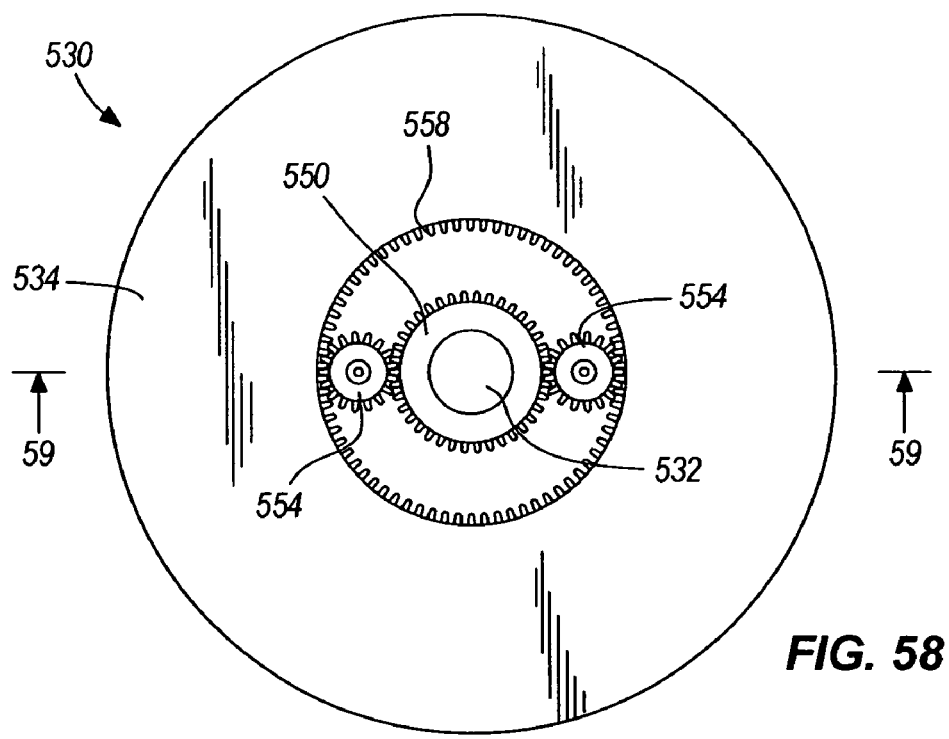
FIG. 58 illustrates a front view of the wrap spring device of FIG. 57.

FIG. 58 illustrates a top or front view of the wrap spring device 530. The shaft 532 can pass through a sun gear 550 such that the rotation of the shaft 532 can be transferred to the sun gear 550. The shaft 532 can also include gear teeth or grooves in addition to or instead of the sun gear 550. The sun gear 550 can connect with one or more planetary gears 554 and can cause the planetary gears 554 to rotate between the sun gear 550 and an inner edge 558 of the armature 534. The inner edge 558 of the armature 534 can include gear teeth that engage the planetary gears 554.

Figure 59:
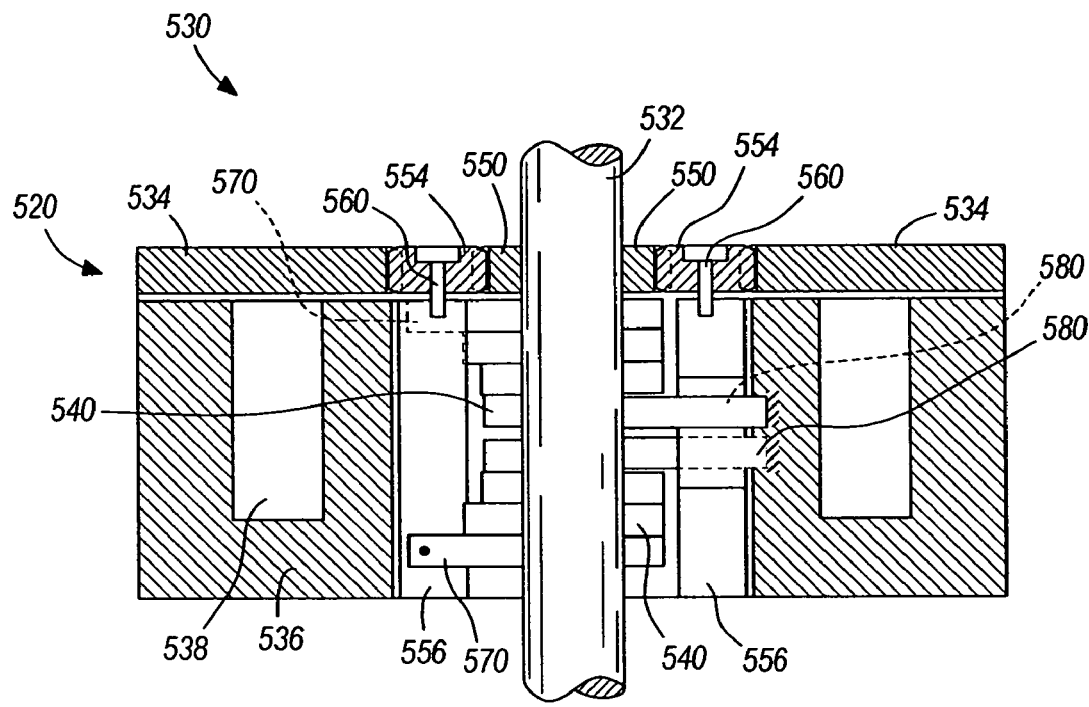
FIG. 59 illustrates a cross-sectional view of the wrap spring device of FIG. 57.

FIG. 59 is a cross-sectional view of the wrap spring device 530 (taken along reference line 59 illustrated in FIG. 58) according to one embodiment of the invention. The wrap spring device 530 shown in FIG. 59 includes the sun gear 550, the planetary gears 554, one or more spring carriers 556, and the wrap springs 540. As shown in FIG. 59, each planetary gear 554 can include a pinion 560 that can engage one of the spring carriers 556 to transfer the rotation of the planetary gear 554 to the spring carrier 556. Each wrap spring 540 can include a tightening end 570 and a grounding end 580. The grounding end 580 of the wrap spring 540 can be attached to a stationary or grounded component, such as the core housing 536 or a vehicle chassis (not shown). The tightening end 570 can be attached to one of the spring carriers 556. When the tightening end 570 is rotated by rotating the spring carrier 556, the wrap spring 540 can tighten around the shaft 532. The opposite end of the spring 540 (i.e., the grounding end 580) is affixed to a stationary reference position that keeps the entire spring 540 from rotating with the shaft 532, rather than tightening around the shaft 532. In some embodiments the spring device 530 can include two wrap springs 540. One spring 540 can tighten when the shaft 532 rotates in one direction, and the other spring 540 can tighten when the shaft 532 rotates in the opposite direction.

When a residual magnetic force is created, the armature 534 can be drawn toward the core housing 536. The rotation of the shaft 532 is transferred through the sun gear 550 to the planetary gears 556. The planetary gears 554 rotate between the sun gear 550 and the inner edge 558 of the armature 534. The rotation of the planetary gears 554 is transferred to the spring carriers 556 through the pinions 560 and to the tightening ends 570 of the wrap springs 540. The rotating planetary gears 554 and the spring carriers 556 tighten the wrap springs 540 around the shaft 532. The planetary gears 554 can regulate the rate of the tightening of the wrap springs 540. The rotation of the shaft 532 can be faster or slower than the rotation of the planetary gears 554, such that the rotation of the shaft 532 may not be directly transferred to the wrap springs 540. The size of the planetary gears 554 can be adjusted to vary the tightening rate for of the wrap springs 540.

The winding of the wrap springs 540 around the shaft 532 can increase the torque capacity of the wrap spring device 530 as an external torque through the shaft 532 is increased. A maximum torque capacity of the wrap spring device 530 can be determined by the friction coefficient of the wrap springs 540 against the shaft 532, the number of turns of the wrap springs 540, and/or the external torque exerted on the wrap springs 540.

The residual magnetic pilot device 520 can also be used to release the tightened wrap springs 540 of the wrap spring device 530. When a residual magnetic force is not present between the armature 534 and the core housing 536, no rotational motion is transferred to the spring carriers 556. The pinions 560 are allowed to rotated 360 degrees around the sun gear 550. The spring carriers 556 rotate freely, releasing the tension of the wrap springs 540. The wrap springs 540 can include a clearance fit so that the shaft 532 can rotate freely when the residual magnetic force is not present. For example, the outer diameter of the shaft 532 can be smaller than the inner diameter of the wrap springs 540.

In some embodiments, the pinions 560 of the planetary gears 554 maintain contact with the spring carriers 556 when a residual magnetic force is not present between the armature 534 and the core housing 536. The latching and unlatching of the armature 534 to the core housing 536 by the creation and elimination of a residual magnetic force can be performed to change the tightening rate of the wrap springs 540. When the armature 534 is unlatched from the core housing 536 (i.e., when no residual magnetic force is present between the armature 534 and the core housing 536), the rotation of the shaft 532 can be transferred through the sun gear 550 to the planetary gears 554 and from the planetary gears 554 to the armature 534. The rotation can cause the shaft 532, the sun gear 550, the planetary gears 554, and the armature 534 to rotate together at the same rate. When the armature 534 is latched to the core housing 536 (i.e., when a residual magnetic force is present between the armature 534 and the core housing 536), the armature 534 can be stationary and the planetary gears 554 can rotate independently between the sun gear 550 and the inner edge 558 of the armature 534. The size of the planetary gears 554 can cause the planetary gears 554 to independently rotate at a different rate than the shaft 532. This independent rotation can tighten the wrap springs 540 at a different rate than the rotation of the shaft 532.

Figure 60:
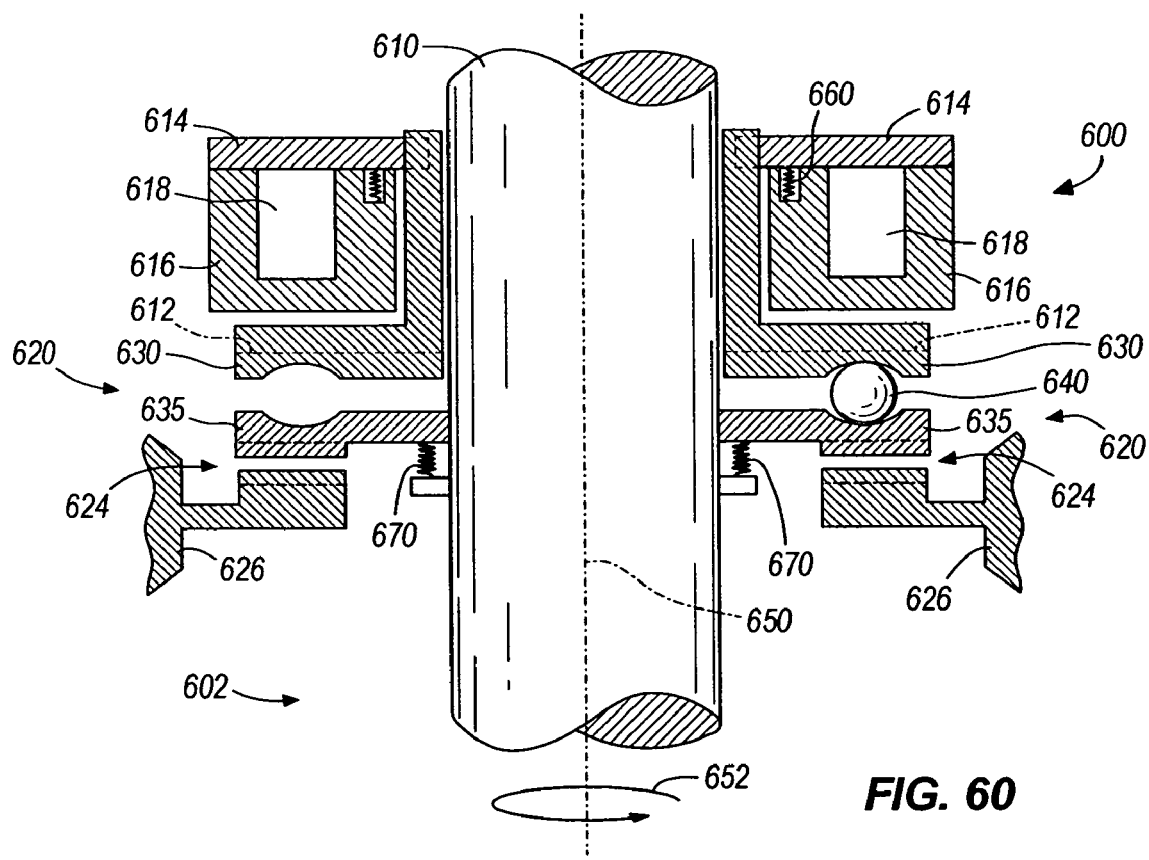
FIG. 60 illustrates a cross-sectional view of a cam clutch/brake device with a residual magnetic device according to one embodiment of the invention.

FIG. 60 illustrates a residual magnetic pilot control device 600 coupled to a cam clutch/brake device 602 according to another embodiment of the invention. The cam clutch/brake device 602 can use a rotary input to clamp a dog clutch or a multi-plate friction pack. The higher the rotary input force into the cam clutch/brake device 602, the higher the clamp load. The operation of the cam clutch/brake device 602 can be considered parasitic, because it uses external energy to drive a clamp load. Examples of a parasitic operation can include a valve train of an internal combustion engine and a human driver for a steering column lock. The residual magnetic pilot control device 600 can act as an actuator such that it can connect an external power source to the cam clutch/brake device 600 in order to turn on (connect) and turn off (disconnect) a power source to the cam clutch/brake device 600.

The cam clutch/brake device 602 and the residual magnetic pilot control device 600, shown in FIG. 60, can include a shaft 610, a drive sleeve 612, an armature 614, a core housing 616, a coil 618, a ball and ramp actuator 620, a clutch/brake device 624, and an external device 626. In some embodiments, the constructions, properties, and operations of the armature 614, the core housing 616, the coil, and/or the controller (not shown) are similar to the armature 18, the core housing 20, the coil 22, and the controller 24 described with respect to the steering column lock 12.

In some embodiments, the states of the shaft 610 (i.e., whether the shaft is stationary or rotating) and the external device 626 can be synchronized when the clutch/brake device 624 is engaged. The external device 626 can include a rotor latch and a striker rod or pin, a gear-driven system, a power take-off accessory, a braking system with brake pads, etc. The clutch/brake device 624 can include a dog clutch, a multi-plate friction clutch pack, or other suitable braking or clutching devices.

The ball and ramp actuator 620 can include a top ramp ring 630 coupled to the drive sleeve 612, a bottom ramp ring 635, and a rolling member or ball 640 located between the top ramp ring 630 and the bottom ramp ring 635. The opposed faces of the top ramp ring 630 and the bottom ramp ring 635 can include variable depth grooves in which the ball 640 can travel. The grooves can be constructed such that rotation of one of the ramp rings 630 and 635 can cause the ball 640 to travel along the grooves of the rings 630 and 635 in order to increase or decrease the distance between the ramp rings 630 and 635.

In one embodiment, the shaft 610 can rotate about an axis 650 in a direction indicated by arrow 652. The bottom ramp ring 635 can be attached to the shaft 610 such that the bottom ramp ring 635 can rotate with the shaft 610. The top ramp ring 630 can be coupled to the drive sleeve 612, which can be coupled to the armature 614. The top ramp ring 630 and drive sleeve 612 can move axially with the armature 614. The top ramp ring 630 generally does not rotate with the shaft 610. The armature 614 can be connected to the core housing 616 by one or more biasing members 660, such as one or more compression springs, tension springs, elastomeric members, wedges, and/or foams, which can allow the armature 614 to move axially with respect to the core housing 616. In some embodiments, the core housing 616 can be stationary with respect to the shaft 610 and the armature 614.

As described above, a controller (not shown) can control the state of the residual magnetic pilot control device 600 by applying a current to the coil 618 to create or nullify the residual magnetic force. When a residual magnetic force is not present between the armature 614 and the core housing 616, the armature 614 and the drive sleeve 612 can move axially substantially freely. As the shaft 610 rotates, the bottom ramp ring 635 can also rotate. The bottom ramp ring 635 can cause the ball 640 to travel along the variable depth grooves of the top ramp ring 630 and the bottom ramp ring 635. As the ball 640 travels, variations in groove depth increase and decrease the distance between the top ramp ring 630 and the bottom ramp ring 635. The variations in groove depth can be compensated by axial movement of the drive sleeve 612 allowed by the biasing member 660. In some embodiments, the axial movement of the drive sleeve 612 allows the bottom ramp ring 635 to maintain a generally stationary axial position on the shaft 610.

When a residual magnetic force is present between the armature 614 and the core housing 616, the armature 614 can be locked to the core housing 616 and the drive sleeve 612 and cannot move axially. As the shaft 610 and the bottom ramp ring 635 rotate the ball 640 travels along the variable depth grooves of the top ramp ring 630 and bottom ramp ring 635. The drive sleeve 612 can be held axially stationary such that it cannot compensate for the variable depth grooves. As a result, the variable depth grooves between the top ramp ring 630 and the bottom ramp ring 635 are compensated by axial movement of the bottom ramp ring 635 allowed by a biasing support member 670. The biasing support member 670 can allow the bottom ramp ring 635 to change its axial position with respect to the shaft 610, and consequently, engage or load the clutch/brake device 624. In some embodiments, one part of the clutch/brake device 624 can be coupled to the bottom ramp ring 635. When one part of the bottom ramp ring 635 changes axial positions, that part of the clutch/brake device 624 can be brought into contact with another part of the clutch/brake device 624.

In some embodiments, the clutch/brake device 624 can include a clutch that transfers the state of the shaft 610 to the external device 626. The clutch/brake device 624 can also include a brake that transfers the state of the external device 626 (i.e., a stationary state) to the shaft 610. It should also be understood that the shaft 610 can be initially stationary. Engaging the clutch/brake device 624 can initiate rotation of the shaft 610 in addition to or rather than stopping or transferring rotation.

Figure 61:
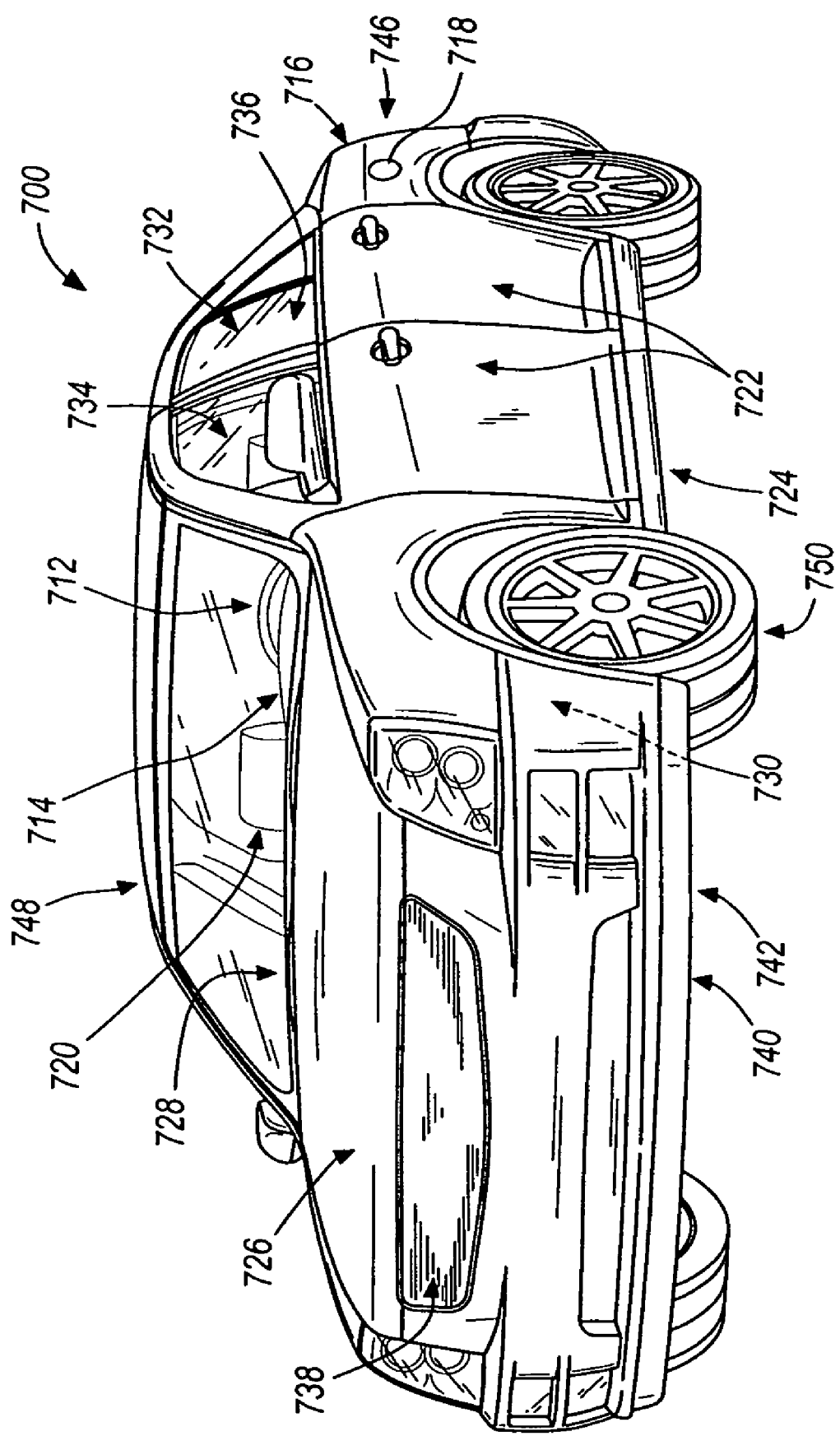
FIG. 61 is a perspective view of a vehicle that can include one or more embodiments of the residual magnetic devices of FIGS. 1-60.

FIG. 61 includes a vehicle 700 that can include one or more embodiments of the residual magnetic devices of FIGS. 1-60. For example, the vehicle 700 can include a residual magnetic steering column lock 712, a residual magnetic ignition rotational inhibitor 714, one or more residual magnetic rear compartment latches 716 (e.g., a power lock/unlock latch, a power release latch), a residual magnetic fuel filler door latch and/or cap lock 718, one or more types of residual magnetic seat mechanisms 720 (e.g., seat position adjuster, seat angle recliner, headrest adjuster), one or more residual magnetic side door latch locking elements 722 (e.g., a power lock/unlock latch, a power release E-latch, a passive entry latch with dual inputs), a residual magnetic door check 724 (e.g., a step less door check and/or a programmable end stop), one or more residual magnetic hood latch releases 726 (e.g., a power release latch, an active hood system release), one or more residual magnetic storage compartment latches 728 (e.g., a glove box compartment latch, a console latch, a pop glass latch), one or more residual magnetic devices for vehicle pedals 730 (e.g., parking brake pedal lock or accelerator pedal lock), residual magnetic window lifts 732, residual magnetic seat belt retractor lock devices 734, residual magnetic programmable window devices 736 (e.g., upper position locks, programmable end stops), a residual magnetic fan and/or air conditioning clutch devices 738, a residual magnetic transmission device 740 (e.g., transmission shift interlock, BTSI lock, automatic transmission clutch actuator), residual magnetic suspension devices 742 (e.g., solely residual magnetic devices or a hybrid of hydraulic fluid and residual magnetic devices for shock absorber valves or sway bar locks), residual magnetic spare tire lifts 746 (e.g., cable locks), residual magnetic retractable roof systems 748 (e.g., open/closed position latches), a residual magnetic brake pad lock for a parking brake function 750, etc. Residual magnetic devices can be used in storage compartments in commercial vehicles (e.g., power release latches). Residual magnetic devices can be used in recreational vehicles (motorcycles, all terrain vehicles, snowmobiles, etc.) in steering column/handlebar locks or parking brake locks. Residual magnetic devices can be used in lawn and garden vehicles in power take off clutch devices or parking brake locks. Residual magnetic devices can be used in tractor trailers in emergency brake devices.

Figure 62:
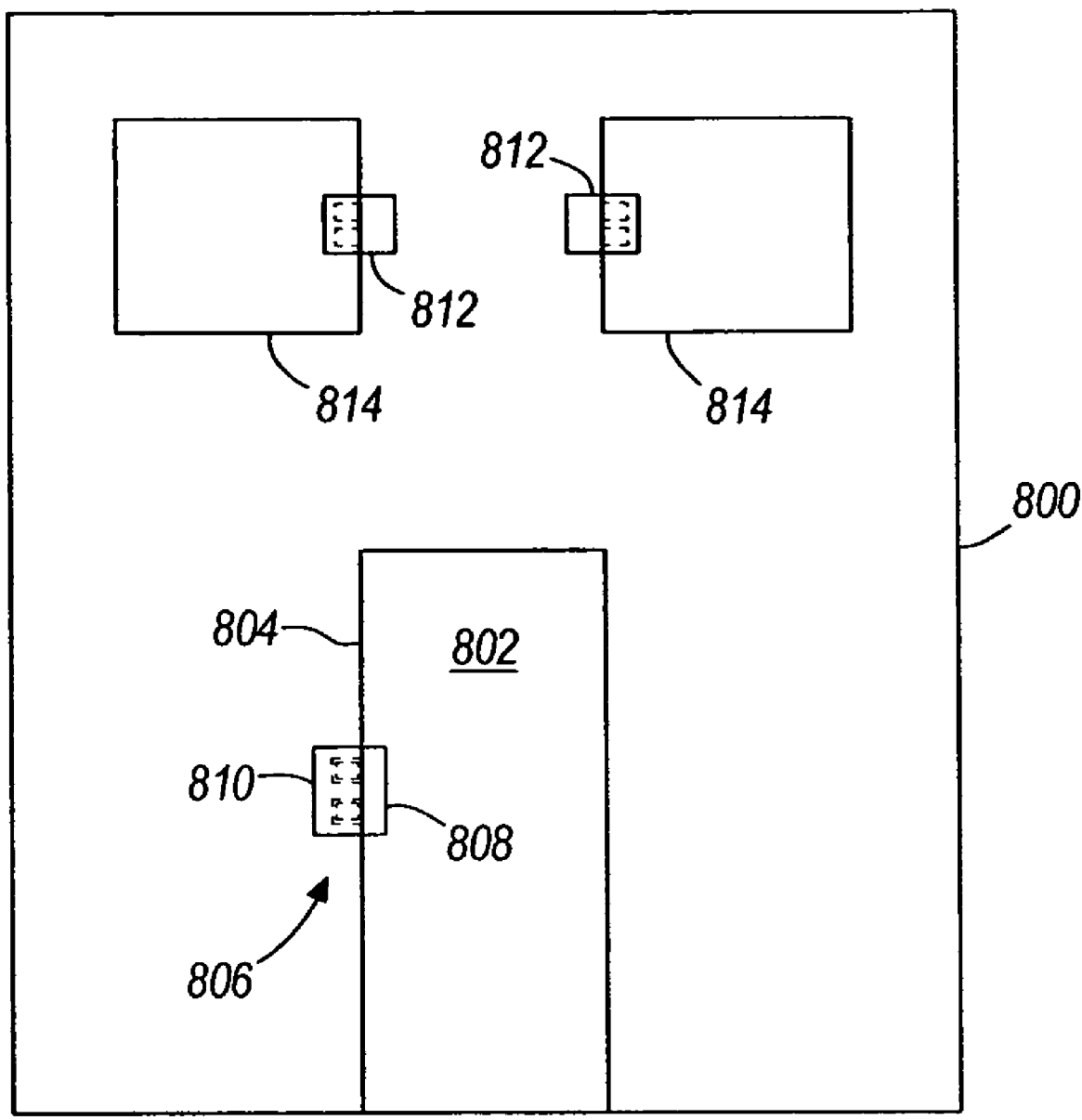
FIG. 62 is a schematic view of a building including doors and/or windows locked with one or more embodiments of the residual magnetic devices of FIGS. 1-60.

FIG. 62 includes a commercial or residential building 800 with a door 802, a door frame 804, and a residual magnetic door lock 806. The residual magnetic door lock 806 can include an armature 808 coupled to the door 802 and a core housing 810 coupled to the door frame 804, or vice versa. Residual magnetic window lock devices 812 can also be used to lock windows 814 in the building 800. The doors 802 and/or the windows 814 can be interior or exterior doors and/or windows. Residual magnetic devices can be used on interior or exterior doors 802 in hotels, apartment buildings, condominiums, etc. Residual magnetic devices can be used on security gates around or vaults in residential or commercial buildings.

Residual magnetic devices can be used in industrial components, such as industrial ball or roller bearings (e.g., locking bearings), industrial fasteners (e.g., power engage/disengage fasteners), industrial clutches (e.g., conveyors, machinery, etc.), and industrial brakes (e.g., material handling, machinery, etc.).

Embodiments of the invention can use residual magnetic technology to provide shear brakes and shear clutches. Shear brakes and shear clutches can allow the core housing and the armature to move or slide along a plane of contact. In addition, shear brakes and shear clutches can allow the core housing and the armature to move (i.e., rotate, translate, or a combination thereof) independently of one another when a residual magnetic force is not present and can force the core housing and the armature to move dependently as a shear clutch or to not move dependently as a shear brake when the residual magnetic force is present.

Embodiments of the invention can also use residual magnetic technology to provide detent brakes and detent clutches. Detent brakes and detent clutches can include one or more detents or blocking mechanisms that separate the core housing from the armature by a fixed distance. When the core housing and the armature are separated by a fixed distance, the core housing and the armature are allowed to move (e.g., rotate, translate, or a combination thereof) independently. Likewise, when the core housing and the armature are not separated by a fixed distance (e.g., protrusions are aligned with recesses) they move dependently as a detent clutch or do not move dependently as a detent brake. The detents or blocking mechanisms force the core housing and the armature to move axially away from one another before they can move independently of one another. For example, the rotational blocking device 78 illustrated and described with respect to FIGS. 8 and 9, includes detents that position and hold the core housing in relation to the armature. To release the core housing from the armature in order to allow the core housing and the armature to move independently, an axial force is required to disengage the detents. In some embodiments, a shear force is also created as the protrusions and recesses move or slide along a plane of contact to disengage. Furthermore, a shear force can also be created once the detents are disengaged since the disengaged protrusions continue to create a plane of contact between the core housing and the armature as the armature and/or the core housing rotates. Embodiments of the invention can also provide infinitely separated brakes and clutches where the core housing and the armature move without substantially contacting.

Various additional features and advantages of the invention are set forth in the following claims.

The invention claimed is:

1. A method of preventing actuation of an ignition switch in a vehicle, the method comprising:

forming a substantially closed magnetic path between an armature and a core housing in order to create an irreversible residual magnetic force; and substantially preventing actuation of the ignition switch due to the irreversible residual magnetic force.

2. The method of claim 1 and further comprising creating the irreversible residual magnetic force between the armature and the core housing by providing a magnetization current to a coil.

3. The method of claim 2 and further comprising misaligning magnetic domains in at least one of the armature and the core housing in order to null the irreversible residual magnetic force by at least one of providing a demagnetization current to the coil and increasing an air gap between the armature and the core housing.

4. The method of claim 3 and further comprising restoring the irreversible residual magnetic force by providing the magnetization current again to the coil.

5. The method of claim 1 and further comprising creating the irreversible residual magnetic force in order to substantially prevent a shear force from causing movement between the armature and the core housing.

6. The method of claim 1 and further comprising creating the irreversible residual magnetic force in order to substantially prevent a force from overcoming at least one detent between the armature and the core housing.

7. The method of claim 1 and further comprising coupling the core housing to a substantially grounded element.

8. The method of claim 1 and further comprising creating the irreversible residual magnetic force in order to substantially prevent rotational movement of the ignition switch.

9. The method of claim 1 and further comprising creating the irreversible residual magnetic force in order to substantially prevent translational movement of the ignition switch.

10. The method of claim 1 and further comprising creating a magnetic air gap of less than approximately 0.005 inches between the core housing and the armature when the irreversible residual magnetic force is present.

11. The method of claim 1 and further comprising providing a core housing with a first cross-sectional area of an inner core being substantially equal to a second cross-sectional area of an outer core of the core housing, which is substantially equal to a third cross-sectional area of the armature, which is substantially equal to a fourth cross-sectional area of a yoke of the core housing.

12. The method of claim 1 and further comprising constructing at least one of the armature and the core housing of at least one of SAE 1002 steel, SAE 1018 steel, SAE 1044 steel, SAE 1060 steel, SAE 1075 steel, and SAE 52100 steel.

13. The method of claim 1 and further comprising constructing at least one of the armature and the core housing of chromium steel.

14. The method of claim 1 and further comprising determining whether the irreversible residual magnetic force is present between the core housing and the armature.

15. The method of claim 1 and further comprising magnetically saturating substantially all portions of the core housing and the armature at substantially the same time.

16. The method of claim 1 and further comprising substantially nulling the irreversible residual magnetic force between the core housing and the armature.

17. The method of claim 16 and further comprising substantially nulling the irreversible residual magnetic force by providing a demagnetization current with a substantially constant value due to the core housing and the armature being substantially magnetically saturated when the irreversible residual magnetic force is created.

18. The method of claim 1 and further comprising providing an input device including at least one of a key and a passive ignition start knob.

19. The method of claim 1 and further comprising substantially preventing a start rotation of the ignition switch when the irreversible residual magnetic force is present to prevent the vehicle from starting.

20. The method of claim 1 and further comprising substantially preventing a return rotation of the ignition switch when the irreversible residual magnetic force is present to provide a park interlock function.

21. The method of claim 1 and further comprising forcing the armature to move axially away from the core housing when the irreversible residual magnetic force is substantially nulled.

22. The method of claim 21 and further comprising providing at least one of a compression spring, a tension spring, an elastomeric member, a wedge, and a foam in order to force the armature to move axially.

23. The method of claim 1 and further comprising providing an axial force between the armature and the core housing to engage a detent configuration.

24. The method of claim 23 and further comprising providing at least one of a compression spring, a tension spring, an elastomeric member, a wedge, and a foam in order to provide the axial force to engage the detent configuration.

25. The method of claim 1 and further comprising limiting an input torque that can be applied with a break-away device coupled to an input device.

26. The method of claim 25 and further comprising at least one of shearing and releasing the break-away device when the input torque is less than a first maximum torque held between the armature and the core housing but greater than a second maximum torque that can be generated by an operator's hand.

27. The method of claim 1 and further comprising physically increasing an air gap between the armature and the core housing to substantially null the irreversible residual magnetic force.

28. The method of claim 27 and further comprising increasing the air gap by rotating a screw between the armature and the core housing.

29. The method of claim 27 and further comprising increasing the air gap by moving at least one of a cam, a wedge, and a lever arm between the armature and the core housing.

30. An ignition actuation blocking device for use in a vehicle having an ignition assembly, the ignition assembly including an input device and an ignition switch, the ignition actuation blocking device comprising:
a core housing coupled to one of the vehicle and the ignition switch;
an armature coupled to one of the vehicle and the ignition switch; and
a coil adjacent to the core housing, the coil receiving a magnetization current to create a substantially closed magnetic path between the armature and the core housing in order to create an irreversible residual magnetic force and to prevent actuation of the ignition switch.

31. The ignition actuation blocking device of claim 30 and further comprising a controller that provides a magnetization current to the coil to create a substantially closed magnetic path between the armature and the core housing in order to create the irreversible residual magnetic force.

32. The ignition actuation blocking device of claim 30 wherein magnetic domains become misaligning in at least one of the armature and the core housing in order to null the irreversible residual magnetic force by at least one of a controller providing a demagnetization current to the coil and a release mechanism increasing an air gap between the armature and the core housing.

33. The ignition actuation blocking device of claim 32 wherein the controller restores the irreversible residual magnetic force by providing the magnetization current again to the coil.

34. The ignition actuation blocking device of claim 30 wherein the irreversible residual magnetic force substantially prevents a shear force from causing movement between the armature and the core housing.

35. The ignition actuation blocking device of claim 30 wherein the irreversible residual magnetic force substantially prevents a force from overcoming at least one detent between the armature and the core housing.

36. The ignition actuation blocking device of claim 30 wherein the core housing is coupled to a substantially grounded element.

37. The ignition actuation blocking device of claim 30 wherein the irreversible residual magnetic force substantially prevents rotational movement of a driver coupled to the input device.

38. The ignition actuation blocking device of claim 30 wherein the irreversible residual magnetic force substantially prevents translational movement of a driver coupled to the input device.

39. The ignition actuation blocking device of claim 30 wherein a magnetic air gap exists between the core housing and the armature when the irreversible residual magnetic force is created, and wherein the magnetic air gap is less than approximately 0.005 inches.

40. The ignition actuation blocking device of claim 30 wherein a first cross-sectional area of an inner core of the core housing is substantially equal to a second cross-sectional area of an outer core of the core housing, which is substantially equal to a third cross-sectional area of the armature, which is substantially equal to a fourth cross-sectional area of a yoke of the core housing.

41. The ignition actuation blocking device of claim 30 wherein at least one of the armature and the core housing are constructed of at least one of SAE 1002 steel, SAE 1018 steel, SAE 1044 steel, SAE 1060 steel, SAE 1075 steel, and SAB 52100 steel.

42. The ignition actuation blocking device of claim 30 wherein at least one of the armature and the core housing are constructed of chromium steel.

43. The ignition actuation blocking device of claim 30 wherein the controller determines whether the irreversible residual magnetic force is present between the core housing and the armature.

44. The ignition actuation blocking device of claim 30 wherein substantially all portions of the core housing and the armature magnetically saturate at substantially the same time.

45. The ignition actuation blocking device of claim 30 wherein the demagnetization current is a substantially constant value due to the core housing and the armature being magnetically saturated when the irreversible residual magnetic force is created.

46. The ignition actuation blocking device of claim 30 wherein the input device includes at least one of a key and a passive ignition start knob.

47. The ignition actuation blocking device of claim 30 wherein the irreversible residual magnetic force substantially prevents a start rotation of the ignition switch to prevent the vehicle from starting.

48. The ignition actuation blocking device of claim 30 wherein the irreversible residual magnetic force substantially prevents a return rotation of the ignition switch to provide a park interlock function.

49. The ignition actuation blocking device of claim 30 wherein the core housing and the armature include a detent configuration that forces the armature to move axially away from the core housing before rotating.

50. The ignition actuation blocking device of claim 49 wherein at least one of the core housing and the armature includes at least one female recess and at least one of the core housing and the armature includes a detent that mates with the at least one female recess.

51. The ignition actuation blocking device of claim 50 wherein the at least one female recess includes at least one of an off recess, an accessory recess, and a run recess.

52. The ignition actuation blocking device of claim 49 and further comprising a biasing member coupled between the armature and the core housing, the biasing member providing an axial force to engage the detent configuration.

53. The ignition actuation blocking device of claim 52 wherein the biasing member includes at least one of a compression spring, a tension spring, an elastomeric member, a wedge, and a foam.

54. The ignition actuation blocking device of claim 30 and further comprising a break-away device that limits an input torque that can be applied to a driver coupled to the input device.

55. The ignition actuation blocking device of claim 54 wherein the break-away device at least one of shears and releases when the input torque is less than a first maximum torque held between the armature and the core housing but greater than a second maximum torque that can be generated by an operator's hand.

56. The ignition actuation blocking device of claim 30 and further comprising a biasing member that biases the armature apart from the core housing after a demagnetization current has substantially nulled the irreversible residual magnetic force.

57. The ignition actuation blocking device of claim 56 wherein the biasing member includes at least one of a compression spring, a tension spring, an elastomeric member, a wedge, and a foam.

58. The ignition actuation blocking device of claim 30 and further comprising a screw between the armature and the core housing that can be rotated to physically increase an air gap between the armature and the core housing and substantially null the irreversible residual magnetic force.

59. The ignition actuation blocking device of claim 30 and further comprising at least one of a cam, a wedge, and a lever arm between the armature and the core housing that can be moved to physically increase an air gap between the armature and the core housing and substantially the irreversible residual magnetic force.

* * * * *